United States Patent
Asai

(10) Patent No.: US 7,394,473 B2
(45) Date of Patent: Jul. 1, 2008

(54) BROWSER AND PROGRAM CONTAINING MULTI-MEDIUM CONTENT

(75) Inventor: Atsushi Asai, Kanagawa (JP)

(73) Assignee: Sony Corporation, Tokyo (JP)

( * ) Notice: Subject to any disclaimer, the term of this patent is extended or adjusted under 35 U.S.C. 154(b) by 286 days.

(21) Appl. No.: 10/508,884

(22) PCT Filed: Feb. 4, 2003

(86) PCT No.: PCT/JP03/01094

§ 371 (c)(1),
(2), (4) Date: Sep. 23, 2004

(87) PCT Pub. No.: WO03/081436

PCT Pub. Date: Oct. 2, 2003

(65) Prior Publication Data

US 2005/0165887 A1    Jul. 28, 2005

(30) Foreign Application Priority Data

Mar. 26, 2002    (JP) ............................... 2002-084764
Jun. 21, 2002    (JP) ............................... 2002-180926

(51) Int. Cl.
*G06F 15/00*    (2006.01)
*G06F 17/00*    (2006.01)

(52) U.S. Cl. .................. 345/679; 715/201; 715/202; 715/203; 715/204; 715/211; 345/653

(58) Field of Classification Search ............... 715/500.1, 715/502; 345/679, 653
See application file for complete search history.

(56) References Cited

U.S. PATENT DOCUMENTS 6,289,299 B1 * 9/2001 Daniel et al. .................. 703/21
6,693,652 B1 * 2/2004 Barrus et al. ................. 715/838
6,788,300 B2 * 9/2004 Ramaswami et al. ......... 345/420
2002/0010571 A1 * 1/2002 Daniel et al. .................. 703/21
2002/0093538 A1 * 7/2002 Carlin ......................... 345/778
2002/0109683 A1 * 8/2002 Ramaswami et al. ......... 345/420
2003/0031260 A1 * 2/2003 Tabatabai et al. ......... 375/240.25
2003/0110297 A1 * 6/2003 Tabatabai et al. ........... 709/246

OTHER PUBLICATIONS

Core Web3D; Publisher: Prentice Hall PTR; Pub Date: Sep. 14, 2000; Chapter 10.*
Core Web3D; Publisher: Prentice Hall PTR; Pub Date: Sep. 14, 2000; Chapter 10, p. 16.*
Yasuhiro Sekine, "Flash Web Design Book Ver. 5J first edition", Kabushiki Kaisha Shoeisha, Jan. 20, 2001, pp. 26-35, 125 to 144, 218-to 223.
Shinji Simojo, "UNIX Multimedia Kotohajime Multi-media-Scenario Kitjutsu Gengo SMIL", UNIX Magazine, Jul. 1, 1998, vol. 13, No. 7, pp. 40 to 45.
Takao Fukuda, "Rich-Contents no Sakusei ni Torikumu SMIL o Tsukatte Doga o Control Contents Kanri mo Juyo no Yoso ni", Nikkei Internet Technology, Oct. 22, 2001, No. 52, pp. 40-45.
Konishi, "WinHEC 98", Monthly ASCII, May 1, 1998, vol. 22, No. 5 (Whole No. 251), pp. 232 to 235.

* cited by examiner

*Primary Examiner*—Doug Hutton
*Assistant Examiner*—Nathan Hillery
(74) *Attorney, Agent, or Firm*—Finnegan, Henderson, Farabow, Garrett & Dunner, L.L.P.

(57) ABSTRACT

The present invention relates to a program containing a browser capable of dealing with highly functional multimedia content in a straightforward manner, and a multimedia content. A reception terminal 113 accesses a server on a network 112 corresponding to an input URL. The server 124 distributes distribution software 243 to the reception terminal 113 via the network 112, the distribution software 243 being constituted of browser software 251 having specifications to be satisfied in order for a component to receive predetermined services, and a multimedia content 252 having a predetermined configuration. The reception terminal 113 displays the distributed multimedia content 252 on the distributed browser. The present invention is applicable to personal computers, digital electronic home appliances and the like.

16 Claims, 62 Drawing Sheets

FIG.30

```
                                                         511-1
<?xml version="1.0" encoding="UTF-8"?>
<content name="welcome">      ··· a
 <scene name="startup">       ··· b
  <script>
  <![CDATA[
  // This is ECMAScript Code button1.focus();

function spin() {
  porsche.spin();
} function stopSpin() {
  porsche.stopSpin();
}
  ]]>
  </script>
  <component class="com.sony.slight.SSpotLight">   ··· c
   <property name="id">                            ··· d
    <string>sSpotLight1</string>                   ··· e
   </property>
   <property name="position">
    <object class="javax.vecmath.Vector3d">
     <constructor>
      <arg name="x">
       <double>1.1</double>
      </arg>
      <arg name="y">
       <double>0.0</double>
      </arg>
      <arg name="z">
       <double>0.5</double>
      </arg>
     </constructor>
```

FIG.31

```
                                            ┌511-2
  </object>
 </property>
 <property name="color">
  <object class="javax.vecmath.Color3f">
   <constructor>
    <arg name="x">
     <float>1.0</float>
    </arg>
    <arg name="y">
     <float>0.7058824</float>
    </arg>
    <arg name="z">
     <float>0.7058824</float>
    </arg>
   </constructor>
  </object>
 </property>
 <property name="shared">
  <boolean>false</boolean>
 </property>
 <property name="active">
  <boolean>false</boolean>
 </property>
 <property name="initiallyActive">
  <boolean>true</boolean>
 </property>
 <property name="direction">
  <object class="javax.vecmath.Vector3f">
   <constructor>
    <arg name="x">
     <float>-1.0</float>
    </arg>
    <arg name="y">
     <float>-0.6</float>
    </arg>
    <arg name="z">
```

```
      <float>-0.7</float>
     </arg>
    </constructor>
   </object>
  </property>
  <property name="attenuation">
   <object class="javax.vecmath.Point3f">
    <constructor>
     <arg name="x">
      <float>1.0</float>
     </arg>
     <arg name="y">
      <float>0.5</float>
     </arg>
     <arg name="z">
      <float>0.0</float>
     </arg>
    </constructor>
   </object>
  </property>
  <property name="concentration">
   <float>0.8</float>
  </property>
  <property name="spreadAngle">
   <float>0.6</float>
  </property>
 </component>
 <component class="com.sony.dlight.SDirectionalLight">
  <property name="id">
   <string>sDirectionalLight1</string>
  </property>
  <property name="color">
   <object class="javax.vecmath.Color3f">
    <constructor>
     <arg name="x">
      <float>1.0</float>
```

```xml
    </arg>
    <arg name="y">
      <float>1.0</float>
    </arg>
    <arg name="z">
      <float>1.0</float>
    </arg>
   </constructor>
  </object>
 </property>
 <property name="shared">
  <boolean>false</boolean>
 </property>
 <property name="active">
  <boolean>false</boolean>
 </property>
 <property name="initiallyActive">
  <boolean>true</boolean>
 </property>
 <property name="direction">
  <object class="javax.vecmath.Vector3f">
   <constructor>
    <arg name="x">
      <float>1.0</float>
    </arg>
    <arg name="y">
      <float>0.0</float>
    </arg>
    <arg name="z">
      <float>-1.0</float>
    </arg>
   </constructor>
  </object>
 </property>
</component>
<component class="com.sony.picture.SPicture">
```

```xml
<property name="id">
 <string>picture1</string>
</property>
<property name="position">
 <object class="javax.vecmath.Vector3d">
  <constructor>
   <arg name="x">
    <double>-0.8</double>
   </arg>
   <arg name="y">
    <double>0.12000000000000001</double>
   </arg>
   <arg name="z">
    <double>-0.3</double>
   </arg>
  </constructor>
 </object>
</property>
<property name="width">
 <double>1.0</double>
</property>
<property name="height">
 <double>0.56</double>
</property>
<property name="scale">
 <double>2.2</double>
</property>
<property name="shared">
 <boolean>false</boolean>
</property>
<property name="active">
 <boolean>false</boolean>
</property>
<property name="initiallyActive">
 <boolean>true</boolean>
</property>
```

FIG.35

```
                                                        511-6
 <property name="filepath">
  <object class="com.sony.sunday.util.SResourcePath">
   <constructor>
    <arg name="path">
     <string>/startup/background1.JPG</string>
    </arg>
   </constructor>
  </object>
 </property>
 <property name="renderingOrder">
  <int>0</int>
 </property>
 <property name="rotation">
  <object class="javax.vecmath.AxisAngle4d">
   <constructor>
    <arg name="x">
     <double>0.0</double>
    </arg>
    <arg name="y">
     <double>0.9913287246227138</double>
    </arg>
    <arg name="z">
     <double>0.0</double>
    </arg>
    <arg name="angle">
     <double>0.85</double>
    </arg>
   </constructor>
  </object>
 </property>
 <property name="frameTextureFilepath">
  <object class="com.sony.sunday.util.SResourcePath">
   <constructor>
    <arg name="path">
     <string></string>
    </arg>
```

```xml
      </constructor>
     </object>
   </property>
   <property name="frameTextureRepeatTime">
    <double>5.0</double>
   </property>
   <property name="frameMargin">
    <double>0.04</double>
   </property>
   <property name="frameTransparency">
    <float>0.0</float>
   </property>
   <property name="frameMaterial">
    <object class="com.sony.sunday.util.SMaterial">
     <constructor>
      <arg name="ambientColor">
       <object class="javax.vecmath.Color3f">
        <constructor>
         <arg name="x">
          <float>0.0</float>
         </arg>
         <arg name="y">
          <float>0.2</float>
         </arg>
         <arg name="z">
          <float>0.2</float>
         </arg>
        </constructor>
       </object>
      </arg>
      <arg name="emissiveColor">
       <object class="javax.vecmath.Color3f">
        <constructor>
         <arg name="x">
          <float>0.0</float>
         </arg>
```

FIG.37

```
                                          ╔511-8
    <arg name="y">
      <float>0.0</float>
    </arg>
    <arg name="z">
      <float>0.0</float>
    </arg>
   </constructor>
  </object>
 </arg>
 <arg name="diffuseColor">
  <object class="javax.vecmath.Color3f">
   <constructor>
    <arg name="x">
      <float>0.0</float>
    </arg>
    <arg name="y">
      <float>0.8</float>
    </arg>
    <arg name="z">
      <float>0.8</float>
    </arg>
   </constructor>
  </object>
 </arg>
 <arg name="specularColor">
  <object class="javax.vecmath.Color3f">
   <constructor>
    <arg name="x">
      <float>0.0</float>
    </arg>
    <arg name="y">
      <float>0.8</float>
    </arg>
    <arg name="z">
      <float>0.8</float>
    </arg>
```

FIG.38

```
                                                        ┌511-9
        </constructor>
       </object>
      </arg>
      <arg name="shininess">
       <float>64.0</float>
      </arg>
     </constructor>
    </object>
   </property>
   <property name="depth">
    <double>0.02</double>
   </property>
   <property name="showFrame">
    <boolean>true</boolean>
   </property>
  </component>
  <component class="com.sony.pushbutton.SPushButton">
   <property name="id">
    <string>button1</string>
   </property>
   <property name="position">
    <object class="javax.vecmath.Vector3d">
     <constructor>
      <arg name="x">
       <double>1.2</double>
      </arg>
      <arg name="y">
       <double>0.38</double>
      </arg>
      <arg name="z">
       <double>-0.2</double>
      </arg>
     </constructor>
    </object>
   </property>
   <property name="scale">
```

```xml
    <double>0.8</double>
  </property>
  <property name="shared">
    <boolean>false</boolean>
  </property>
  <property name="active">
    <boolean>false</boolean>
  </property>
  <property name="initiallyActive">
    <boolean>true</boolean>
  </property>
  <property name="filepath">
    <object class="com.sony.sunday.util.SResourcePath">
      <constructor>
        <arg name="path">
          <string>/startup/buttonNormal.sob</string>
        </arg>
      </constructor>
    </object>
  </property>
  <property name="renderingOrder">
    <int>0</int>
  </property>
  <property name="rotation">
    <object class="javax.vecmath.AxisAngle4d">
      <constructor>
        <arg name="x">
          <double>0.0</double>
        </arg>
        <arg name="y">
          <double>1.0</double>
        </arg>
        <arg name="z">
          <double>0.0</double>
        </arg>
        <arg name="angle">
```

FIG.40

```
                                                    ┌511-11
        <double>0.0</double>
      </arg>
    </constructor>
  </object>
</property>
<property name="onfocus">
  <string></string>
</property>
<property name="onblur">
  <string></string>
</property>
<property name="onkeydown">
  <string></string>
</property>
<property name="onkeyup">
  <string></string>
</property>
<property name="navup">
  <string></string>
</property>
<property name="navdown">
  <string>button2</string>
</property>
<property name="navleft">
  <string></string>
</property>
<property name="navright">
  <string></string>
</property>
<property name="focusMaterial">
  <object class="com.sony.sunday.util.SMaterial">
    <constructor>
      <arg name="ambientColor">
        <object class="javax.vecmath.Color3f">
          <constructor>
            <arg name="x">
```

FIG.41

```
                                        511-12
        <float>0.3</float>
      </arg>
      <arg name="y">
        <float>0.3</float>
      </arg>
      <arg name="z">
        <float>0.0</float>
      </arg>
    </constructor>
  </object>
</arg>
<arg name="emissiveColor">
  <object class="javax.vecmath.Color3f">
    <constructor>
      <arg name="x">
        <float>0.1</float>
      </arg>
      <arg name="y">
        <float>0.1</float>
      </arg>
      <arg name="z">
        <float>0.0</float>
      </arg>
    </constructor>
  </object>
</arg>
<arg name="diffuseColor">
  <object class="javax.vecmath.Color3f">
    <constructor>
      <arg name="x">
        <float>0.8</float>
      </arg>
      <arg name="y">
        <float>0.8</float>
      </arg>
      <arg name="z">
```

FIG.42

```
                                                        ┌511-13
       <float>0.0</float>
      </arg>
     </constructor>
    </object>
   </arg>
   <arg name="specularColor">
    <object class="javax.vecmath.Color3f">
     <constructor>
      <arg name="x">
       <float>1.0</float>
      </arg>
      <arg name="y">
       <float>1.0</float>
      </arg>
      <arg name="z">
       <float>0.0</float>
      </arg>
     </constructor>
    </object>
   </arg>
   <arg name="shininess">
    <float>128.0</float>
   </arg>
  </constructor>
 </object>
</property>
<property name="normalGeometryLabel">
 <string>Default</string>
</property>
<property name="selectedGeometryLabel">
 <string>Default_Selected</string>
</property>
<property name="onpressed">
 <string>spin();</string>
</property>
</component>
```

FIG.43

```
                                                     ╭511-14
<component class="com.sony.pushbutton.SPushButton">
  <property name="id">
    <string>button2</string>
  </property>
  <property name="position">
    <object class="javax.vecmath.Vector3d">
      <constructor>
        <arg name="x">
          <double>1.2</double>
        </arg>
        <arg name="y">
          <double>0.0</double>
        </arg>
        <arg name="z">
          <double>-0.2</double>
        </arg>
      </constructor>
    </object>
  </property>
  <property name="scale">
    <double>0.8</double>
  </property>
  <property name="shared">
    <boolean>false</boolean>
  </property>
  <property name="active">
    <boolean>false</boolean>
  </property>
  <property name="initiallyActive">
    <boolean>true</boolean>
  </property>
  <property name="filepath">
    <object class="com.sony.sunday.util.SResourcePath">
      <constructor>
        <arg name="path">
          <string>/startup/buttonNormal.sob</string>
```

FIG.44

```
                                                    511-15
    </arg>
   </constructor>
  </object>
 </property>
 <property name="renderingOrder">
  <int>0</int>
 </property>
 <property name="rotation">
  <object class="javax.vecmath.AxisAngle4d">
   <constructor>
    <arg name="x">
     <double>0.0</double>
    </arg>
    <arg name="y">
     <double>1.0</double>
    </arg>
    <arg name="z">
     <double>0.0</double>
    </arg>
    <arg name="angle">
     <double>0.0</double>
    </arg>
   </constructor>
  </object>
 </property>
 <property name="onfocus">
  <string></string>
 </property>
 <property name="onblur">
  <string></string>
 </property>
 <property name="onkeydown">
  <string></string>
 </property>
 <property name="onkeyup">
  <string></string>
```

FIG.45

```
                                                          ┌511-16
  </property>
  <property name="navup">
   <string>button1</string>
  </property>
  <property name="navdown">
   <string></string>
  </property>
  <property name="navleft">
   <string></string>
  </property>
  <property name="navright">
   <string></string>
  </property>
  <property name="focusMaterial">
   <object class="com.sony.sunday.util.SMaterial">
    <constructor>
     <arg name="ambientColor">
      <object class="javax.vecmath.Color3f">
       <constructor>
        <arg name="x">
         <float>0.3</float>
        </arg>
        <arg name="y">
         <float>0.3</float>
        </arg>
        <arg name="z">
         <float>0.0</float>
        </arg>
       </constructor>
      </object>
     </arg>
     <arg name="emissiveColor">
      <object class="javax.vecmath.Color3f">
       <constructor>
        <arg name="x">
         <float>0.1</float>
```

FIG.46

```xml
                                        511-17
       </arg>
       <arg name="y">
        <float>0.1</float>
       </arg>
       <arg name="z">
        <float>0.0</float>
       </arg>
      </constructor>
     </object>
    </arg>
    <arg name="diffuseColor">
     <object class="javax.vecmath.Color3f">
      <constructor>
       <arg name="x">
        <float>0.8</float>
       </arg>
       <arg name="y">
        <float>0.8</float>
       </arg>
       <arg name="z">
        <float>0.0</float>
       </arg>
      </constructor>
     </object>
    </arg>
    <arg name="specularColor">
     <object class="javax.vecmath.Color3f">
      <constructor>
       <arg name="x">
        <float>1.0</float>
       </arg>
       <arg name="y">
        <float>1.0</float>
       </arg>
       <arg name="z">
        <float>0.0</float>
```

FIG.47

```
                                                        511-18
  </arg>
   </constructor>
  </object>
 </arg>
 <arg name="shininess">
  <float>128.0</float>
 </arg>
</constructor>
</object>
</property>
<property name="normalGeometryLabel">
 <string>Default</string>
</property>
<property name="selectedGeometryLabel">
 <string>Default_Selected</string>
</property>
<property name="onpressed">
 <string>stopSpin();</string>
</property>
</component>
<component class="com.sony.label.SLabel">
 <property name="id">
  <string>label1</string>
 </property>
 <property name="position">
  <object class="javax.vecmath.Vector3d">
   <constructor>
    <arg name="x">
     <double>0.9200000000000002</double>
    </arg>
    <arg name="y">
     <double>0.2799999999999999</double>
    </arg>
    <arg name="z">
     <double>0.3</double>
    </arg>
```

FIG.48

```
                                                    511-19
    </constructor>
   </object>
  </property>
  <property name="font">
   <object class="java.awt.Font">
    <constructor>
     <arg name="name">
      <string>Arial</string>
     </arg>
     <arg name="style">
      <int>1</int>
     </arg>
     <arg name="size">
      <int>36</int>
     </arg>
    </constructor>
   </object>
  </property>
  <property name="color">
   <object class="javax.vecmath.Color3f">
    <constructor>
     <arg name="x">
      <float>1.0</float>
     </arg>
     <arg name="y">
      <float>1.0</float>
     </arg>
     <arg name="z">
      <float>1.0</float>
     </arg>
    </constructor>
   </object>
  </property>
  <property name="text">
   <string>Spin</string>
  </property>
```

FIG.49

```
                                                  ┌511-20
    <property name="scale">
     <double>1.0</double>
    </property>
    <property name="shared">
     <boolean>false</boolean>
    </property>
    <property name="active">
     <boolean>false</boolean>
    </property>
    <property name="initiallyActive">
     <boolean>true</boolean>
    </property>
    <property name="renderingOrder">
     <int>0</int>
    </property>
    <property name="rotation">
     <object class="javax.vecmath.AxisAngle4d">
      <constructor>
       <arg name="x">
        <double>0.0</double>
       </arg>
       <arg name="y">
        <double>1.0</double>
       </arg>
       <arg name="z">
        <double>0.0</double>
       </arg>
       <arg name="angle">
        <double>0.0</double>
       </arg>
      </constructor>
     </object>
    </property>
   </component>
   <component class="com.sony.label.SLabel">
    <property name="id">
```

FIG.50

```
                                              ┌511-21
   <string>label2</string>
  </property>
  <property name="position">
   <object class="javax.vecmath.Vector3d">
    <constructor>
     <arg name="x">
      <double>0.94</double>
     </arg>
     <arg name="y">
      <double>-0.05999999999999993</double>
     </arg>
     <arg name="z">
      <double>0.3</double>
     </arg>
    </constructor>
   </object>
  </property>
  <property name="font">
   <object class="java.awt.Font">
    <constructor>
     <arg name="name">
      <string>Arial</string>
     </arg>
     <arg name="style">
      <int>1</int>
     </arg>
     <arg name="size">
      <int>36</int>
     </arg>
    </constructor>
   </object>
  </property>
  <property name="color">
   <object class="javax.vecmath.Color3f">
    <constructor>
     <arg name="x">
```

FIG.51

```
                                                    ┌511-22
     <float>1.0</float>
    </arg>
    <arg name="y">
     <float>1.0</float>
    </arg>
    <arg name="z">
     <float>1.0</float>
    </arg>
   </constructor>
  </object>
 </property>
 <property name="text">
  <string>Stop</string>
 </property>
 <property name="scale">
  <double>1.0</double>
 </property>
 <property name="shared">
  <boolean>false</boolean>
 </property>
 <property name="active">
  <boolean>false</boolean>
 </property>
 <property name="initiallyActive">
  <boolean>true</boolean>
 </property>
 <property name="renderingOrder">
  <int>0</int>
 </property>
 <property name="rotation">
  <object class="javax.vecmath.AxisAngle4d">
   <constructor>
    <arg name="x">
     <double>0.0</double>
    </arg>
    <arg name="y">
```

```xml
      <float>1.0</float>
     </arg>
     <arg name="y">
      <float>1.0</float>
     </arg>
     <arg name="z">
      <float>1.0</float>
     </arg>
    </constructor>
   </object>
  </property>
  <property name="text">
   <string>Stop</string>
  </property>
  <property name="scale">
   <double>1.0</double>
  </property>
  <property name="shared">
   <boolean>false</boolean>
  </property>
  <property name="active">
   <boolean>false</boolean>
  </property>
  <property name="initiallyActive">
   <boolean>true</boolean>
  </property>
  <property name="renderingOrder">
   <int>0</int>
  </property>
  <property name="rotation">
   <object class="javax.vecmath.AxisAngle4d">
    <constructor>
     <arg name="x">
      <double>0.0</double>
     </arg>
     <arg name="y">
```

FIG.53

```
                                                        ┌511-24
   ┌─────────────────────────────────────────────────────┴──┐
   │      <double>1.0</double>                              │
   │    </arg>                                              │
   │    <arg name="z">                                      │
   │      <double>0.0</double>                              │
   │    </arg>                                              │
   │    <arg name="angle">                                  │
   │      <double>0.0</double>                              │
   │    </arg>                                              │
   │   </constructor>                                       │
   │  </object>                                             │
   │ </property>                                            │
   │</component>                                            │
   │<component class="com.sony.label.SLabel">               │
   │ <property name="id">                                   │
   │  <string>title</string>                                │
   │ </property>                                            │
   │ <property name="position">                             │
   │  <object class="javax.vecmath.Vector3d">               │
   │   <constructor>                                        │
   │    <arg name="x">                                      │
   │      <double>-1.0000000000000004</double>              │
   │    </arg>                                              │
   │    <arg name="y">                                      │
   │      <double>0.6600000000000001</double>               │
   │    </arg>                                              │
   │    <arg name="z">                                      │
   │      <double>0.3</double>                              │
   │    </arg>                                              │
   │   </constructor>                                       │
   │  </object>                                             │
   │ </property>                                            │
   │ <property name="font">                                 │
   │  <object class="java.awt.Font">                        │
   │   <constructor>                                        │
   │    <arg name="name">                                   │
   │      <string>Comic Sans MS</string>                    │
   └────────────────────────────────────────────────────────┘
```

```
     </arg>
     <arg name="style">
      <int>1</int>
     </arg>
     <arg name="size">
      <int>36</int>
     </arg>
    </constructor>
   </object>
  </property>
  <property name="color">
   <object class="javax.vecmath.Color3f">
    <constructor>
     <arg name="x">
      <float>0.6</float>
     </arg>
     <arg name="y">
      <float>0.8</float>
     </arg>
     <arg name="z">
      <float>0.0</float>
     </arg>
    </constructor>
   </object>
  </property>
  <property name="text">
   <string>Welcome to the Sunday World !!</string>
  </property>
  <property name="scale">
   <double>1.0</double>
  </property>
  <property name="shared">
   <boolean>false</boolean>
  </property>
  <property name="active">
   <boolean>false</boolean>
```

FIG.55

```
                                                       ┌511-26
  </property>
  <property name="initiallyActive">
   <boolean>true</boolean>
  </property>
  <property name="renderingOrder">
   <int>0</int>
  </property>
  <property name="rotation">
   <object class="javax.vecmath.AxisAngle4d">
    <constructor>
     <arg name="x">
      <double>0.0</double>
     </arg>
     <arg name="y">
      <double>1.0</double>
     </arg>
     <arg name="z">
      <double>0.0</double>
     </arg>
     <arg name="angle">
      <double>0.0</double>
     </arg>
    </constructor>
   </object>
  </property>
 </component>
 <component class="com.sony.shape.S3DShape">
  <property name="id">
   <string>porsche</string>
  </property>
  <property name="position">
   <object class="javax.vecmath.Vector3d">
    <constructor>
     <arg name="x">
      <double>1.3400000000000003</double>
     </arg>
```

```xml
    <arg name="y">
      <double>-0.7599999999999998</double>
    </arg>
    <arg name="z">
      <double>0.7600000000000001</double>
    </arg>
   </constructor>
  </object>
 </property>
 <property name="width">
  <double>1.0</double>
 </property>
 <property name="height">
  <double>1.0</double>
 </property>
 <property name="scale">
  <double>0.55</double>
 </property>
 <property name="shared">
  <boolean>false</boolean>
 </property>
 <property name="active">
  <boolean>false</boolean>
 </property>
 <property name="initiallyActive">
  <boolean>true</boolean>
 </property>
 <property name="filepath">
  <object class="com.sony.sunday.util.SResourcePath">
   <constructor>
    <arg name="path">
     <string>/startup/formulaOne.sob</string>
    </arg>
   </constructor>
  </object>
 </property>
```

FIG.57

```
                                                    ┌511-28
  <property name="renderingOrder">
   <int>0</int>
  </property>
  <property name="rotation">
   <object class="javax.vecmath.AxisAngle4d">
    <constructor>
     <arg name="x">
      <double>0.023045814612553756</double>
     </arg>
     <arg name="y">
      <double>-0.9993246794860199</double>
     </arg>
     <arg name="z">
      <double>-0.028619493339460032</double>
     </arg>
     <arg name="angle">
      <double>1.9958596229553223</double>
     </arg>
    </constructor>
   </object>
  </property>
  <property name="depth">
   <double>1.0</double>
  </property>
 </component>
 <component class="com.sony.colorbg.SColorBackground">
  <property name="id">
   <string>sColorBackground1</string>
  </property>
  <property name="color">
   <object class="javax.vecmath.Color3f">
    <constructor>
     <arg name="x">
      <float>0.10980392</float>
     </arg>
     <arg name="y">
```

FIG.58

```
                                                    ╭511-29
        <float>0.11764706</float>
      </arg>
      <arg name="z">
        <float>0.11764706</float>
      </arg>
    </constructor>
  </object>
 </property>
 <property name="shared">
  <boolean>false</boolean>
 </property>
 <property name="active">
  <boolean>false</boolean>
 </property>
 <property name="initiallyActive">
  <boolean>true</boolean>
 </property>
</component>
<component class="com.sony.alight.SAmbientLight">
 <property name="id">
  <string>aLight</string>
 </property>
 <property name="color">
  <object class="javax.vecmath.Color3f">
    <constructor>
      <arg name="x">
        <float>1.0</float>
      </arg>
      <arg name="y">
        <float>1.0</float>
      </arg>
      <arg name="z">
        <float>1.0</float>
      </arg>
    </constructor>
  </object>
```

```
   </property>
   <property name="shared">
    <boolean>false</boolean>
   </property>
   <property name="active">
    <boolean>false</boolean>
   </property>
   <property name="initiallyActive">
    <boolean>true</boolean>
   </property>
 </component>
 <component class="com.sony.slight.SSpotLight">
   <property name="id">
    <string>sSpotLight1_1</string>
   </property>
   <property name="position">
    <object class="javax.vecmath.Vector3d">
     <constructor>
      <arg name="x">
       <double>-0.5400000000000006</double>
      </arg>
      <arg name="y">
       <double>-0.03999999999999998</double>
      </arg>
      <arg name="z">
       <double>0.7</double>
      </arg>
     </constructor>
    </object>
   </property>
   <property name="color">
    <object class="javax.vecmath.Color3f">
     <constructor>
      <arg name="x">
       <float>0.7019608</float>
      </arg>
```

FIG.60

```xml
                                                        511-31
        <arg name="y">
          <float>1.0</float>
        </arg>
        <arg name="z">
          <float>1.0</float>
        </arg>
      </constructor>
    </object>
  </property>
  <property name="shared">
    <boolean>false</boolean>
  </property>
  <property name="active">
    <boolean>false</boolean>
  </property>
  <property name="initiallyActive">
    <boolean>true</boolean>
  </property>
  <property name="direction">
    <object class="javax.vecmath.Vector3f">
      <constructor>
        <arg name="x">
          <float>1.0</float>
        </arg>
        <arg name="y">
          <float>-0.6</float>
        </arg>
        <arg name="z">
          <float>-0.7</float>
        </arg>
      </constructor>
    </object>
  </property>
  <property name="attenuation">
    <object class="javax.vecmath.Point3f">
      <constructor>
```

FIG.61

```
                                        511-32
    <arg name="x">
     <float>1.0</float>
    </arg>
    <arg name="y">
     <float>0.5</float>
    </arg>
    <arg name="z">
     <float>0.0</float>
    </arg>
   </constructor>
  </object>
 </property>
 <property name="concentration">
  <float>0.8</float>
 </property>
 <property name="spreadAngle">
  <float>0.6</float>
 </property>
</component>
</scene>
</content>
```

```
<!ELEMENT content (scene+)>              <!-- con
tent (highest level element) -->
<!ATTLIST content name CDATA #IMPLIED>   <!-- na
me of content (optional) -->
<!ELEMENT scene (script, component*)>    <!-- sce
ne constituting content -->       ··· A
<!ATTLIST scene name ID #REQUIRED>       <!-- na
me of content (required) -->      ··· B
<!ELEMENT script (#PCDATA)>              <!-- ECMA
script code -->
<!ELEMENT component (property*)>         <!-- com
ponent constituting scene -->
<!ATTLIST component class CDATA #REQUIRED> <!-- cla
ss name of component (required) -->
<!ELEMENT property (boolean | byte | char
             | double | float | ini
             | long | short | string
             | object)>                  <!--component's pro
perty value -->
<!ATTLIST property name CDATA #REQUIRED> <!-- pro
perty (field) name (required) -->
<!ELEMENT boolean (#PCDATA)>             <!-- bool
ean (primitive) value -->
<!ELEMENT byte (#PCDATA)>                <!-- byte
 (primitive) value -->
<!ELEMENT char (#PCDATA)>                <!-- char
 (primitive) value -->
<!ELEMENT double (#PCDATA)>              <!-- doub
le (primitive) value -->
<!ELEMENT float (#PCDATA)>               <!-- floa
t (primitive) value -->
<!ELEMENT int (#PCDATA)>                 <!-- int
 (primitive) value -->
<!ELEMENT long (#PCDATA)>                <!-- long
 (primitive) value -->
```

```
<!ELEMENT short (#PCDATA)>                                <!-- shor
t (primitive) value -->
<!ELEMENT string (#PCDATA)>                               <!-- stri
ng (primitive) value -->
<!ELEMENT object ((constructor?, setter*) | reference)>
 <!-- object -->
<!ATTLIST object class CDATA #REQUIRED
                 name CDATA #IMPLIED>                     <!-- cla
ss: class name (required) name: reference name (optional) -->
<!ELEMENT constructor (arg+)>                             <!-- con
structor, argument to be passed to setter method -->
<!ELEMENT setter (arg)>                                   <!-- set
ter method -->
<!ATTLIST setter name CDATA #REQUIRED>                    <!-- met
hod name -->
<!ELEMENT arg    (boolean | byte | char | double
                 | float | ini | long | short
                 | string | object)>                      <!-- arg
ument -->
<!ATTLIST arg name CDATA #IMPLIED>                        <!-- arg
ument name (optional) -->
<!ELEMENT reference (#PCDATA)>                            <!-- ref
erence to another object (for expression of ring list structure) -->

<!-- if verification is performed actually using this file, it is necessary
to convert character encoding of this file into UTF-8, in advance -->
```

BROWSER AND PROGRAM CONTAINING MULTI-MEDIUM CONTENT

TECHNICAL FIELD

The present invention relates to a program containing a browser and a multimedia content, and more particularly to a program containing a browser capable of dealing with a sophisticated multimedia content with ease, and a multimedia content.

BACKGROUND ART

In recent years, the dissemination of information networks, particularly the Internet, have been striking. W.W.W (World Wide Web) among others is essential for services not only for businesses but also for general home users. W.W.W is services allowing a reception terminal to access a variety of content (home pages) existing on the Internet and obtain necessary information.

In recent years, general users also use W.W.W as a tool for not only collecting content but also for enjoying the content rich in entertainment or presenting their own content. It is expected that the number of users is increasing more and more in the future.

W.W.W is a software architecture developed by the CERN (Conseil Europ'en pour la Recherche Nucl'aire) in 1989. W.W.W is the communication system constituted of a software group constituted of a so-called HTTP (HyperText Transfer Protocol) server and an HTML (HyperText Markup Language) browser interconnected by the Internet, and is supported by software HTTP and HTML. HTTP is the communication protocol between an HTTP server and an HTML browser, and HTML is the format of (homepage) data exchanged between an HTTP server and an HTML browser.

FIG. 1 shows a mechanism of producing a W.W.W content (homepage) of this type.

As shown in FIG. 1, in a W.W.W system 1, a reception terminal 11 and an HTTP server 13 are interconnected by the Internet, the reception terminal being constituted of an HTML browser 22 and a platform 21 made of a predetermined OS (Operating System), hardware and the like.

Description will be made on a process of reproducing content on the HTTP server 13 by the reception terminal 11.

Upon reception of an URL (Uniform Resource Locater) of a homepage from a user as shown by an arrow 31, the HTML browser 22 of the reception terminal 11 accesses the HTTP server 13 designated by the input URL via the Internet 12 as shown by an arrow 32 to request for the data of the homepage designated by the URL.

In response to the request, the HTTP server 13 transmits the data file (hereinafter called an HTML document) 33-1 of the homepage described in the HTML format via the Internet 12. The HTML browser 22 of the reception terminal 11 displays the received HTML text 33-1 on a display (not shown) of the reception terminal 11, for example, in the format of a display 34. The HTML browser 22 acquires related data 33-2 such as a bitmap file (image file), when necessary, from the HTTP server 13, and displays it in a predetermined area of the display 34.

The HTML browser 22 is therefore essential software for general users utilizing W.W.W. HTML has been developed in order for researchers to share text data such as technical documents via information networks, and has distinctive characteristics that documents are structured by using an approach called Markup.

FIG. 2 shows an HTML text and its display example.

In the HTML text 33-1, the portion sandwiched between "<" and ">" is called a tag which is used for Markup.

The contents of the portion sandwiched between HTML tags (<HTML> and </HTML>) indicate HTML data. The portion sandwiched between BODY tags (<BODY> and </BODY>) indicates the main text of the document. A portion 41 "<H1>PLEASANT FOOD SHOP IN KAMAKURA</H1>" sandwiched between H1 tags (<H1> and </H1>) indicates that the character string "PLEASANT FOOD SHOP IN KAMAKURA" is a headline of the document. Portions 42 and 43 sandwiched between P tags (<P> and </P>) indicate sentences of the documents. Standardization of such tag types is managed by W3C (World Wide Web Consortium).

A display 34 provides the content in conformity with the structure of the HTML document 33-1.

A character string corresponding to the portion 41 sandwiched between H1 tags is displayed in the upper area 51 of the display 34, a sentence corresponding to the portion 42 sandwiched between the P tags is displayed in the lower area 52, and a sentence corresponding to the portion 43 sandwiched between the P tags is displayed in an area lower than the area 52.

Since the HTML document 33-1 is expressed by text, HTML is not dependent upon a platform such as OS. Since HTML is a text format, a user and the like can create a content in a relatively straightforward manner by using HTML with some learning.

HTML can insert an image into a document by using <IMG> tags. For example, an image 33-2 is displayed in an area 54 in the area 52 of the display 34, the image 33-2 corresponding to an image file (food.jpg) corresponding to a portion 44 sandwiched between <IMG> tags in the portion 42 sandwiched between the P tags in the HTML document 33-1.

Since HTML is provided with tags for expressing media other than the text, HTML can deal with a combination of a plurality of media such as texts, images (still images and moving images) and audio. The content of this type is hereinafter called a multimedia content. Therefore, most of W.W.W data known as so-called homepages are a multimedia content.

As above, since HTML is characterized in that it does not depend upon a platform, it can deal with multimedia information, and it can create content in a relatively straightforward manner.

Services for distributing a multimedia content are prevailing and HTML derivative technologies have been adopted in information networks for digital electronic home appliances such as mobile phone networks and digital broadcasting, in addition to the Internet. For example, BML (Broadcast Markup Language), Compact HTML and the like are known, BML being adopted for data broadcasting services of BS (Broadcasting Satellite) and Compact HTML being used by the i-mode for mobile phones by the NTT DoCoMo, Inc. These services are often supplied nowadays on the assumption that they are used only by particular digital home electronic appliances or particular information networks, and mutual distribution of content is not possible or limitative.

It is expected in the future that all digital electronic home appliances including computers are interconnected by one information network. In such a case, it is requested that any terminal can receive services of the same content and that the content is highly entertaining, has sophisticated functions, high performance as well as being apt to be developed under reduced cost.

As described earlier, however, HTML has been developed in order for researchers to share text data, and is not developed as a system for satisfying the needs expected to become essential in the future. As solutions for satisfying such needs, HTML has therefore the following issues left to be solved.

Namely, as described above, HTML is the format for expressing a structured document, i.e., text media. In HTML, therefore, media (images and the like) other than the text is inserted into a text (document).

However, if other media are inserted into a document, there arises a first issue that consistency of presentation is not guaranteed.

More specifically, although the position of media inserted into a text is determined by the text layout, the text is returned when it reaches the end of the window (for example, as shown in FIG. 2, in the area 52 of the display 34, the text is returned at "PASTER HOUSE" and the following "HAS BEEN FOUND" is displayed in the next row). The display position of media is not determined therefore until the window size of an HTML browser is determined (until a user displays content).

A display 34-1 shown in FIG. 3 and a display 34-2 shown in FIG. 4 are examples of presentations having different media display positions because of different window sizes, even with the same HTML document, i.e., the displays are examples of presentations not guaranteeing presentation consistency.

In other words, although a layout method of a display by HTML is a suitable method of displaying media such as images as part of a document, it is not a suitable method of displaying a combination of various media as a multimedia content.

The reason for this is that considerable attention is paid to the design of a multimedia content in many cases, and that a content creator often desires that the positions of respective media to be presented can be designated by absolute values and the content of the same design can be presented irrespective of the window size of an HTML browser. Namely, the content creator does not desire to display differently the created multimedia content as in the display 34-1 (FIG. 3) or display 34-2 (FIG. 4) depending upon the window size of an HTML browser. The content creator desires that, as shown in a display 34-3 of FIG. 5 each of a title text, two main texts and an image is displayed by designating the absolute positions (in the example of FIG. 5, absolute values from the upper left corner) of the fixed coordinate system of the display 34-3.

In addition, since the HTML format defines only the text structure, the layout details such as a font type, a space between characters and a space between rows, a hyperlink expression method (although expression is made often by using blue fonts and underlines, definitions thereof do not exist) and the like are fundamentally dependent upon an HTML browser, when HTML data is actually displayed. If the same HTML document is presented by HTML browsers developed by different vendors, it may be displayed minutely different. This shows that presentation consistency is not guaranteed.

Under such circumstances, CESS (Cascading Style Sheets) has been proposed as a mechanism of designating the style of an HTML document. By utilizing CESS, it is possible to unanimously designate the layout of a text. However, CESS is used persistently for the layout of a document, HTML browsers of companies support in different manners and as will be later described, CESS does not provide services for 3D (3 Dimensional). Further, CESS has its own grammar (different from HTML) and content creators are required to be familiar with it.

As above HTML is associated with the first issue that presentation consistency is not guaranteed which is the essential condition of multimedia expression.

Further, HTML is associated with a second issue that no synchronizing mechanism between media is provided, from the view point of multimedia expression.

The synchronizing mechanism between media is a means for controlling the presentation timings when a combination of media having a time axis, such as audio, moving images and animation, is presented. Use of the synchronizing mechanism between media allows expressions, for example, reproduction of animation synchronized with music and concurrent or continuous reproduction of a plurality of moving images. As above, the synchronizing mechanism between media is a function essential for realizing a multimedia content.

Further, HTML is associated with the third issue that there is no compatibility of the content between different types of apparatuses (e.g., between a personal computer and a digital electronic home appliance).

Namely, although HTML has no specification regarding the interface for manipulating a content, many HTML browsers on personal computers are realized by the interfaces of personal computers, e.g. by a window provided by the Windows (registered trademark) OS.

Since the size of a window can be changed, the size of an HTML browser can also be changed. Namely, the size in a browser horizontal direction is not definite so that the content unable to be displayed is developed downward and not displayed. In order to display it, a scroll in the vertical direction is used. A mouse is used for a content manipulation such as a jump to another HTML document through hyper link. A content is created on the assumption of a manipulation performance dependent upon the personal computer.

In contrast, although an HTML text can be displayed on a digital electronic home appliance, the display size of an HTML browser is generally fixed and a scroll function is not provided in some cases. Since it is necessary to be accustomed to the manipulation of a moving cursor such as a mouse, the moving cursor is considered unsuitable for electronic home appliances, so that the function corresponding to a mouse is not provided in many cases. Therefore, when HTML is applied to digital electronic home appliances, the HTML format is generally modified or extended in some way, in order to allow the interface of a digital electronic home appliances to use HTML.

This difference between a personal computer and a digital electronic home appliance results in a possibility that compatibility is not ensured if an HTML content distributed on the Internet is distributed to a network of digital electronic home appliances. In order to absorb this difference, conversion software is used in a partial field. Since an HTML content on the Internet is created based upon an interface of a personal computer as described above, even if the HTML content converted by the conversion software is produced, the content may become meaningless presentation.

As above, HTML is associated with the third issue of no compatibility between contents.

HTML has also a fourth issue of a limit in function extension.

Namely, as described above, HTML is primarily structured document data and is not an application program. An HTML browser can therefore display only the data prepared in an HTTP server. The types (media) of data capable of being displayed is limited to only those defined by the HTML format.

For example, when newly developed media are used, it is necessary to perform extension of the media with regard to the HTML format standardized by the above-described W3C. In order also for the media to be used, the HTML browser of each company is required to support a software module for reproducing the new media and correctly recognize the extended portion, i.e., tags.

However, in practice, the HTML browser of each company extends tags often in an independent manner, and there may be no compatibility between these browsers. Also in some cases, an HTML content itself is dependent upon specific extension of a particular HTML browser.

There is a plug-in function as another method of extending the function of an HTML content. A plug-in is a software module of extending a function of an HTML browser. If a plug-in realizing an optional function is installed in an HTML browser, this function can be executed by HTML content. However, in order for a user to use the plug-in, it is necessary to perform in advance its download, install and upgrade. The plug-in is required to be developed for each of OSes and browsers, and the HTML browser not supporting the plug-in cannot display the HTML content using the plug-in.

More correctly, the extension function by a plug-in incorporates the mode that another application runs in a partial region of an HTML content, and the function is not contained in the content itself and the HTML itself is a structured document unchangeably.

There is Java(R)Script as an extension aiming at making an HTML document itself execute an optional logic. Java(R) Script is a script language, and similar to a C language and a Java(R) language, has a grammar considering that even a content producer such as a designer and a content creator can write in a relatively straightforward manner, while supporting the control structure such as conditional branch and iteration. Code of Java(R)Script is characterized by ease of use such as not requiring advanced compilation since it is executed by an interpreter. Since Java(R)Script places importance to use easiness, it is inferior to the C language and Java(R) language in terms of an execution performance, a program size and program structuralization.

From these reasons, although Java(R)Script is suitable for media and a plug-in provided by HTML and a relatively simple application such as manipulating a browser itself, it is often unpractical to realize a complicated function (e.g., decoding particular media, and GUI components) by Java(R) Script itself.

As above, HTML is associated with the fourth issue of a limit in its extension function.

HTML has also a fifth issue of inferior productivity of content.

Namely, as described above, HTML has been developed in order to allow researchers to share structured document data. Being limited to the usage of this kind, it can be said that writing a content with a tool such as a text editor in accordance with the HTML format is a relatively easy work for researchers well grounded in software.

In contrast, when designers and creators form a content which is rich in entertainment and complicated, it is rare that an HTML document is written directly by using a text editor or the like, but dedicated authoring software is generally used. This software presents a graphical content forming environment so that the content having a relatively complicated layout can be formed without knowledge of HTML.

The HTML format itself is, however, not designed by considering affinity with the authoring software. Harmful influences of this include an overhead of a data size to be caused by the software mechanically forming an HTML document, difficulty in compatibility between authoring software and in fine adjustment at the content finishing stage, low readability of formed HTML documents, and the like, thus leading to the situation that advantages of HTML become rather disadvantages.

As described earlier, when the extension function is mounted in an HTML content, a script language such as Java(R) Script is often used and designers and content creators often write code of Java(R)Script by themselves even for a more or less complicated content.

However, from the viewpoint of content productivity, the extension functions of this type are preferably developed by programmers having high skills of software by using a program language such as a C language and a Java(R) language. Also from the viewpoint of content productivity, it is preferable that designers and creators pay attention to how the extension functions are customized and combined and which kind of services are realized, and that the script language such as Java(R)Script is used when designers and content creators combine and control these extension functions.

However, presently, specialization in the production of an HTML content is still not established, and in addition the HTML format itself is not designed by considering affinity with development flows of this type.

From the viewpoint of content productivity, although the extension function once developed should be reused, it cannot be said that the script language such as Java(R)Script sufficiently supports the function regarding software modularization (easy to customize, capsulated mount, software module distribution and the like), and it is therefore difficult to reuse.

As above, HTML has the fifth issue of inferior content productivity.

HTML has also a sixth issue of difficulty in sufficient manifestation of a hardware performance.

Specifically, it is expected that the function and performance of hardware of digital electronic home appliances including personal computers are improved more and more in the future. There is a large possibility that highly sophisticated 3D graphics functions as realized in some home games, among others, are adopted in other products in the near future.

In contrast, HTML is software aiming primarily at sharing structured documents, and is unsuitable for expressing a content assuming 3D. As described above, although it is possible to extend the function of an HTML content by using a plug-in or a plug-in such as Java(R)Script, they are associated with the above-described issues and HTML is not always a proper solution to manifest the expected hardware performance that digital electronic home appliances have in the near future.

As above, HTML is a software architecture developed in order to meet the needs of sharing document data among researchers. From the viewpoint of sharing document data, it can be considered that HTML is one of the most refined solutions even at the present time. However, the needs of content distribution on present information networks are sophisticated-function-orientated and multimedia-orientated, and it is required that content producers of an occupation type such as designers and content creators can produce a content in a straightforward manner.

In order to deal with a change in the needs of this kind, although extension of various functions has been made heretofore to HTML, since it does not follow the design idea inherent to HTML, the fundamental solution is still not reached in the context of content compatibility, productivity and the like and HTML is associated with the above-described first to sixth issues.

DISCLOSURE OF THE INVENTION

The present invention has been conceived in consideration of the circumstances described above, and allows to dealing with highly functional multimedia content in a straightforward manner.

A first program according to the present invention is characterized by including: browser software for providing each component with each service in accordance with specifications to be satisfied in order for the component to receive the service; and a multimedia content formed by a collection of scenes each containing a component group formed by customizing and arbitrarily combining a plurality of the components operating on the browser software and a script for operating the component, the service including: a service for reading a predetermined one of the multimedia content and loading the component group and the script contained in the scene constituting the multimedia content; a service for managing a life cycle of each component constituting the component group; a service for displaying the component in a predetermined 3D virtual space and erasing the component already displayed in the 3D virtual space; a service for providing a communication service between an interpreter of the script and the component; a service for managing focus transition between a predetermined one of the components and another of the components; and a service for distributing an input from a predetermined external key to a corresponding one of the components.

The browser software may further provide the component with the service in accordance with the specifications to be satisfied in order for the component to receive the service, the service further includes: a service for synchronously reproducing a plurality of media; and a transition service for transition between first and second ones of the scenes.

The multimedia content may be configured to maintain presentation consistency when the multimedia content is reproduced on the browser software.

A first recording medium recording a program according to the present invention is characterized in that the program includes: browser software for providing each component with each service in accordance with specifications to be satisfied in order for the component to receive the service; and a multimedia content formed by a collection of scenes each containing a component group formed by customizing and arbitrarily combining a plurality of the components operating on the browser software and a script for operating the component, the service including: a service for reading a predetermined one of the multimedia content and loading the component group and the script contained in the scene constituting the multimedia content; a service for managing a life cycle of each component constituting the component group; a service for displaying the component in a predetermined 3D virtual space and erasing the component already displayed in the 3D virtual space; a service for providing a communication service between an interpreter of the script and the component; a service for managing focus transition between a predetermined one of the components and another of the components; and a service for distributing an input from a predetermined external key to a corresponding one of the components.

The first program and recording medium of the present invention provide the program which contains browser software for providing each component with each service in accordance with specifications to be satisfied in order for the component to receive the service; and a multimedia content formed by a collection of scenes each containing a component group formed by customizing and arbitrarily combining a plurality of the components operating on the browser software and a script for operating the component.

A second program as a multimedia content according to the present invention is characterized by a collection of a plurality of scenes each containing: a component group formed by customizing and arbitrarily combining a plurality of components operating on browser software for providing the component with each service in accordance with specifications to be satisfied in order for the component to receive the service; and a script for operating the component, the service including: a service for reading a predetermined one of the multimedia content and loading the component group and the script contained in the scene constituting the multimedia content; a service for managing a life cycle of each component constituting the component group; a service for displaying the component in a predetermined 3D virtual space and erasing the component already displayed in the 3D virtual space; a service for providing a communication service between an interpreter of the script and the component; a service for managing focus transition between a predetermined one of the components and another of the components; and a service for distributing an input from a predetermined external key to a corresponding one of the components.

A second recording medium storing a program as a multimedia content according to the present invention is characterized in that the program includes a collection of a plurality of scenes each containing: a component group formed by customizing and arbitrarily combining a plurality of components operating on browser software for providing the component with the service in accordance with specifications to be satisfied in order for the component to receive the service; and a script for operating the component, the service including: a service for reading a predetermined one of the multimedia content and loading the component group and the script contained in the scene constituting the multimedia content; a service for managing a life cycle of each component constituting the component group; a service for displaying the component in a predetermined 3D virtual space and erasing the component already displayed in the 3D virtual space; a service for providing a communication service between an interpreter of the script and the component; a service for managing focus transition between a predetermined one of the components and another of the components; and a service for distributing an input from a predetermined external key to a corresponding one of the components.

The second program and recording medium of the present invention provide as the program a collection of a plurality of scenes each containing: a component group formed by customizing and arbitrarily combining a plurality of components operating on browser software for providing the component with the service in accordance with specifications to be satisfied in order for the component to receive the service; and a script for operating the component.

A third program as browser software according to the present invention is characterized by providing each component with each service in accordance with specifications to be satisfied in order for said component to receive said service; said service including: a service for reading a predetermined one of said multimedia content and loading said component group and said script contained in said scene constituting said multimedia content; a service for managing a life cycle of each component constituting said component group; a service for displaying said component in a predetermined 3D virtual space and erasing said component already displayed in said 3D virtual space; a service for providing a communication service between an interpreter of said script and said component; a service for managing focus transition between a predetermined one of said components and another of said components; and a service for distributing an input from a predetermined external key to a corresponding one of said components.

A third recording medium storing a program as browser software and a multimedia content according to the present invention is characterized in that each component is provided with each service in accordance with specifications to be satisfied in order for the component to receive the service; the service including: a service for reading a predetermined one of the multimedia content and loading the component group and the script contained in the scene constituting the multimedia content; a service for managing a life cycle of each component constituting the component group; a service for displaying the component in a predetermined 3D virtual space and erasing the component already displayed in the 3D virtual space; a service for providing a communication service between an interpreter of the script and the component; a service for managing focus transition between a predetermined one of the components and another of the components; and a service for distributing an input from a predetermined external key to a corresponding one of the components.

The third program and recording medium of the present invention provide the browser software for supplying each component with each service in accordance with the specifications to be satisfied in order for the component to receive the service.

A fourth program according to the present invention is characterized by including a step of producing a multimedia content containing a collection of scenes each containing: a component group formed by customizing and arbitrarily combining a plurality of components operating on browser software for providing each component with each service in accordance with specifications to be satisfied in order for the component to receive the service; and a script for operating the component, the service including: a service for reading a predetermined one of the multimedia content and loading the component group and the script contained in the scene constituting the multimedia content; a service for managing a life cycle of each component constituting the component group; a service for displaying the component in a predetermined 3D virtual space and erasing the component already displayed in the 3D virtual space; a service for providing a communication service between an interpreter of the script and the component; a service for managing focus transition between a predetermined one of the components and another of the components; and a service for distributing an input from a predetermined external key to a corresponding one of the components.

The program may further include a step of combining the produced multimedia content and the browser software to create one program.

The producing step may include: a display control step of controlling to read the component in a distribution format and displaying on GUI; an addition step of adding the component selected on the GUI to the multimedia content; a providing step of providing the GUI which customizes the component contained in the multimedia content; and a converting step of converting the multimedia content edited by the display control step, the addition step and the providing step into a distributable format.

A fourth recording medium storing a program according to the present invention is characterized by including a step of producing a multimedia content containing a collection of scenes each containing: a component group formed by customizing and arbitrarily combining a plurality of components operating on browser software for providing each component with each service in accordance with specifications to be satisfied in order for the component to receive the service; and a script for operating the component, the service including: a service for reading a predetermined one of the multimedia content and loading the component group and the script contained in the scene constituting the multimedia content; a service for managing a life cycle of each component constituting the component group; a service for displaying the component in a predetermined 3D virtual space and erasing the component already displayed in the 3D virtual space; a service for providing a communication service between an interpreter of the script and the component; a service for managing focus transition between a predetermined one of the components and another of the components; and a service for distributing an input from a predetermined external key to a corresponding one of the components.

The fourth program and recording medium of the present invention provides the program which is a multimedia content containing a collection of scenes each containing: a component group formed by customizing and arbitrarily combining a plurality of components operating on browser software for providing each component with each service in accordance with the specifications to be satisfied in order for the component to receive the service.

A fifth program according to the present invention is characterized by including: a conversion step of converting a format of a multimedia content produced in accordance with a first format utilizing techniques of expressing a data structure by a text into a second format, wherein the multimedia content whose format was converted into the second format by the conversion step contains a collection of scenes each containing: a component group formed by customizing and arbitrarily combining a plurality of components operating on browser software for providing each component with each service in accordance with specifications to be satisfied in order for the component to receive the service; and a script for operating the component, the service including: a service for reading a predetermined one of the multimedia content and loading the component group and the script contained in the scene constituting the multimedia content; a service for managing a life cycle of each component constituting the component group; a service for displaying the component in a predetermined 3D virtual space and erasing the component already displayed in the 3D virtual space; a service for providing a communication service between an interpreter of the script and the component; a service for managing focus transition between a predetermined one of the components and another of the components; and a service for distributing an input from a predetermined external key to a corresponding one of the components.

The program may further include a step of combining the multimedia content whose format was converted into the second format by the conversion step and the browser software to create one program.

The techniques of being utilized by the first format may be techniques utilizing XML.

A fifth recording medium storing a program according to the present invention is characterized by including: a conversion step of converting a format of a multimedia content produced in accordance with a first format utilizing techniques of expressing a data structure by a text, from the first format into a second format, wherein the multimedia content whose format was converted into the second format by the conversion step contains a collection of scenes each containing: a component group formed by customizing and arbitrarily combining a plurality of components operating on browser software for providing each component with each service in accordance with specifications to be satisfied in order for the component to receive the service; and a script for operating the component, the service including: a service for reading a predetermined one of the multimedia content and loading the component group and the script contained in the scene constituting the multimedia content; a service for managing a life cycle of each component constituting the component group; a service for displaying the component in a predetermined 3D virtual space and erasing the component already displayed in the 3D virtual space; a service for providing a communication service between an interpreter of the script and the component; a service for managing focus transition between a predetermined one of the components and another of the components; and a service for distributing an input from a predetermined external key to a corresponding one of the components.

In the fifth program and recording medium, a format of a multimedia content produced in accordance with a first format utilizing techniques of expressing a data structure by a text, is converted from the first format into a second format. The multimedia content whose format was converted into the second format contains a collection of scenes each containing: a component group formed by customizing and arbitrarily combining a plurality of components operating on browser software for providing each component with each service in accordance with specifications to be satisfied in order for the component to receive the service; and a script for operating the component.

An information processing apparatus as an apparatus for reproducing a multimedia content according to the present invention is characterized by including: acquiring means for acquiring a program, the program comprising: browser software for providing each component with each service in accordance with specifications to be satisfied in order for the component to receive the service; and a multimedia content formed by a collection of scenes each containing a component group formed by customizing and arbitrarily combining a plurality of the components operating on the browser software and a script for operating the component, the service including: a service for reading a predetermined one of the multimedia content and loading the component group and the script contained in the scene constituting the multimedia content; a service for managing a life cycle of each component constituting the component group; a service for displaying the component in a predetermined 3D virtual space and erasing the component already displayed in the 3D virtual space; a service for providing a communication service between an interpreter of the script and the component; a service for managing focus transition between a predetermined one of the components and another of the components; and a service for distributing an input from a predetermined external key to a corresponding one of the components; executing means for executing the browser program acquired by the acquiring means; and reproducing means for reproducing the multimedia content acquired by the acquiring means, by utilizing services provided by the browser software executed by the executing means.

The information processing apparatus may further include storing means for storing the browser software, the storing means storing the browser software in advance, wherein the executing means executes the browser software stored in advance in the storing means, when the multimedia content is acquired by the acquiring means.

An information processing method for an information processing apparatus for reproducing a multimedia content according to the present invention is characterized by including: an acquiring step of acquiring a program, the program comprising: browser software for providing each component with each service in accordance with specifications to be satisfied in order for the component to receive the service; and a multimedia content formed by a collection of scenes each containing a component group formed by customizing and arbitrarily combining a plurality of the components operating on the browser software and a script for operating the component, the service including: a service for reading a predetermined one of the multimedia content and loading the component group and the script contained in the scene constituting the multimedia content; a service for managing a life cycle of each component constituting the component group; a service for displaying the component in a predetermined 3D virtual space and erasing the component already displayed in the 3D virtual space; a service for providing a communication service between an interpreter of the script and the component; a service for managing focus transition between a predetermined one of the components and another of the components; and a service for distributing an input from a predetermined external key to a corresponding one of the components; an executing step of executing the browser program acquired by the acquiring step; and a reproducing step of reproducing the multimedia content acquired by the acquiring step, by utilizing services provided by the browser software executed by the executing means.

In the information processing apparatus as an apparatus for reproducing a multimedia content and the information processing method according to the present invention, a program is acquired which includes: browser software for providing each component with each service in accordance with the specifications to be satisfied in order for the component to receive a predetermined service; and a multimedia content having a predetermined configuration, the acquired browser program is executed, the service provided by the executed browser software is utilized, and the acquired multimedia content is reproduced.

An information processing apparatus as a first apparatus for producing a multimedia content according to the present invention is characterized in that the multimedia content is a collection of scenes each containing: a component group formed by customizing and arbitrarily combining a plurality of components operating on browser software for providing each component with each service in accordance with specifications to be satisfied in order for the component to receive the service; and a script for operating the component, the service including: a service for reading a predetermined one of the multimedia content and loading the component group and the script contained in the scene constituting the multimedia content; a service for managing a life cycle of each component constituting the component group; a service for displaying the component in a predetermined 3D virtual space and erasing the component already displayed in the 3D virtual space; a service for providing a communication service between an interpreter of the script and the component; a service for managing focus transition between a predetermined one of the components and another of the components; and a service for distributing an input from a predetermined external key to a corresponding one of the components.

An information processing method for an information processing apparatus as the first apparatus for producing a multimedia content according to the present invention is characterized in that the multimedia content contains a collection of scenes each containing: a component group formed by customizing and arbitrarily combining a plurality of components operating on browser software for providing each component with each service in accordance with specifications to be satisfied in order for the component to receive the service; and a script for operating the component, the service including: a service for reading a predetermined one of the multimedia content and loading the component group and the script contained in the scene constituting the multimedia content; a service for managing a life cycle of each component constituting the component group; a service for displaying the component in a predetermined 3D virtual space and erasing the component already displayed in the 3D virtual space; a service for providing a communication service between an interpreter of the script and the component; a service for managing focus transition between a predetermined one of the components and another of the components; and a service for distributing an input from a predetermined external key to a corresponding one of the components.

In the information processing apparatus as the first apparatus for reproducing a multimedia content and the information processing method according to the present invention, a multimedia content is produced which operates on the browser software and having a predetermined configuration, the browser software providing each component with each service in accordance with the specifications to be satisfied in order for the component to receive the service.

An information processing apparatus as a second apparatus for producing a multimedia content according to the present invention is characterized by comprising by including: producing means for producing the multimedia content in accordance with a first format utilizing techniques of expressing a data structure by a text; and converting means for converting a format of a multimedia content produced by the producing means, from the first format into a second format, wherein the multimedia content whose format was converted into the second format by the converting means contains a collection of scenes each containing: a component group formed by customizing and arbitrarily combining a plurality of components operating on browser software for providing each component with each service in accordance with specifications to be satisfied in order for the component to receive the service; and a script for operating the component, the service including: a service for reading a predetermined one of the multimedia content and loading the component group and the script contained in the scene constituting the multimedia content; a service for managing a life cycle of each component constituting the component group; a service for displaying the component in a predetermined 3D virtual space and erasing the component already displayed in the 3D virtual space; a service for providing a communication service between an interpreter of the script and the component; a service for managing focus transition between a predetermined one of the components and another of the components; and a service for distributing an input from a predetermined external key to a corresponding one of the components.

The information processing apparatus may further include combining means for combining the multimedia content whose format was converted into the second format by the converting means and the browser software to create one program.

The techniques used by the first formation may be techniques utilizing XML.

An information processing method for an information processing method for an information processing apparatus as the second apparatus for producing a multimedia content according to the present invention is characterized by including: a producing step of producing the multimedia content in accordance with a first format utilizing techniques of expressing a data structure by a text; and a converting step of converting a format of a multimedia content produced by the producing means, from the first format into a second format, wherein the multimedia content whose format was converted into the second format by the converting step contains a collection of scenes each containing: a component group formed by customizing and arbitrarily combining a plurality of components operating on browser software for providing each component with each service in accordance with specifications to be satisfied in order for the component to receive the service; and a script for operating the component, and the service including: a service for reading a predetermined one of the multimedia content and loading the component group and the script contained in the scene constituting the multimedia content; a service for managing a life cycle of each component constituting the component group; a service for displaying the component in a predetermined 3D virtual space and erasing the component already displayed in the 3D virtual space; a service for providing a communication service between an interpreter of the script and the component; a service for managing focus transition between a predetermined one of the components and another of the components; and a service for distributing an input from a predetermined external key to a corresponding one of the components.

In the information processing apparatus as the first apparatus for reproducing a multimedia content and the information processing method according to the present invention, the multimedia content is produced in accordance with a first format utilizing techniques of expressing a data structure by a text, and a format of the multimedia content produced by the producing means is converted from the first format into a second format. The multimedia content whose format was converted into the second format contains a collection of scenes each containing: a component group formed by customizing and arbitrarily combining a plurality of components operating on browser software for providing each component with each service in accordance with specifications to be satisfied in order for the component to receive the service; and a script for operating the component.

An information processing system according to the present invention wherein: a first information processing apparatus for producing a multimedia content and distributing the produced multimedia content; and a second information processing apparatus for reproducing the multimedia content distributed by the first information processing apparatus, are interconnected by a predetermined network, and the information processing system is characterized in that: the first information processing apparatus produces the multimedia content containing a collection of scenes each containing: a component group formed by customizing and arbitrarily combining a plurality of components operating on browser software for providing each component with each service in accordance with specifications to be satisfied in order for the component to receive the service; and a script for operating the component, the service including: a service for reading a predetermined one of the multimedia content and loading the component group and the script contained in the scene constituting the multimedia content; a service for managing a life cycle of each component constituting the component group; a service for displaying the component in a predetermined 3D virtual space and erasing the component already displayed in the 3D virtual space; a service for providing a communication service between an interpreter of the script and the component; a service for managing focus transition between a predetermined one of the components and another of the components; and a service for distributing an input from a predetermined external key to a corresponding one of the components, and distributes as one program the produced multimedia content and the browser software to the second information processing apparatus via the network, and the second information processing apparatus reproducing the multimedia content in the distributed program on the browser software in the distributed program.

In the information processing system according to the present invention, the first information processing apparatus produces the multimedia content having a predetermined configuration and operating on browser software for providing each component with each service in accordance with the specifications to be satisfied in order for the component to receive the service, one program constituted of the produced multimedia content and browser is distributed, and the second information processing apparatus displays the distributed multimedia content on the distributed browser software.

The computer for executing the program of the present invention may be a stand-alone computer such as a personal computer or a computer built in another apparatus such as a digital electronic home appliance. Similarly, the information processing apparatus of the present invention may be a personal computer and the like or another apparatus such as a digital electronic home appliance.

BRIEF DESCRIPTION OF THE DRAWINGS

FIG. 30 is a diagram showing an example of XML data (a multimedia content of an XML format) shown in FIG. 27.

FIG. 31 is a diagram showing the example of the XML data (a multimedia content of the XML format) shown in FIG. 27.

FIG. 32 is a diagram showing the example of the XML data (a multimedia content of the XML format) shown in FIG. 27.

FIG. 33 is a diagram showing the example of the XML data (a multimedia content of the XML format) shown in FIG. 27.

FIG. 34 is a diagram showing the example of the XML data (a multimedia content of the XML format) shown in FIG. 27.

FIG. 35 is a diagram showing the example of the XML data (a multimedia content of the XML format) shown in FIG. 27.

FIG. 36 is a diagram showing the example of the XML data (a multimedia content of the XML format) shown in FIG. 27.

FIG. 37 is a diagram showing the example of the XML data (a multimedia content of the XML format) shown in FIG. 27.

FIG. 38 is a diagram showing the example of the XML data (a multimedia content of the XML format) shown in FIG. 27.

FIG. 39 is a diagram showing the example of the XML data (a multimedia content of the XML format) shown in FIG. 27.

FIG. 40 is a diagram showing the example of the XML data (a multimedia content of the XML format) shown in FIG. 27.

FIG. 41 is a diagram showing the example of the XML data (a multimedia content of the XML format) shown in FIG. 27.

FIG. 42 is a diagram showing the example of the XML data (a multimedia content of the XML format) shown in FIG. 27.

FIG. 43 is a diagram showing the example of the XML data (a multimedia content of the XML format) shown in FIG. 27.

FIG. 44 is a diagram showing the example of the XML data (a multimedia content of the XML format) shown in FIG. 27.

FIG. 45 is a diagram showing the example of the XML data (a multimedia content of the XML format) shown in FIG. 27.

FIG. 46 is a diagram showing the example of the XML data (a multimedia content of the XML format) shown in FIG. 27.

FIG. 47 is a diagram showing the example of the XML data (a multimedia content of the XML format) shown in FIG. 27.

FIG. 48 is a diagram showing the example of the XML data (a multimedia content of the XML format) shown in FIG. 27.

FIG. 49 is a diagram showing the example of the XML data (a multimedia content of the XML format) shown in FIG. 27.

FIG. 50 is a diagram showing the example of the XML data (a multimedia content of the XML format) shown in FIG. 27.

FIG. 51 is a diagram showing the example of the XML data (a multimedia content of the XML format) shown in FIG. 27.

FIG. 52 is a diagram showing the example of the XML data (a multimedia content of the XML format) shown in FIG. 27.

FIG. 53 is a diagram showing the example of the XML data (a multimedia content of the XML format) shown in FIG. 27.

FIG. 54 is a diagram showing the example of the XML data (a multimedia content of the XML format) shown in FIG. 27.

FIG. 55 is a diagram showing the example of the XML data (a multimedia content of the XML format) shown in FIG. 27.

FIG. 56 is a diagram showing the example of the XML data (a multimedia content of the XML format) shown in FIG. 27.

FIG. 57 is a diagram showing the example of the XML data (a multimedia content of the XML format) shown in FIG. 27.

FIG. 58 is a diagram showing the example of the XML data (a multimedia content of the XML format) shown in FIG. 27.

FIG. 59 is a diagram showing the example of the XML data (a multimedia content of the XML format) shown in FIG. 27.

FIG. 60 is a diagram showing the example of the XML data (a multimedia content of the XML format) shown in FIG. 27.

FIG. 61 is a diagram showing the example of the XML data (a multimedia content of the XML format) shown in FIG. 27.

FIG. 62 is a diagram showing an example of a DTD shown in FIG. 27.

FIG. 63 is a diagram showing the example of the DTD shown in FIG. 27.

BEST MODES FOR CARRYING OUT THE INVENTION

First, Java(R) will be described which is one example of basic technologies applied to preferred embodiments of the present invention.

Java(R) is fundamental software for developing or executing general programs, and has been developed by Sun Microsystems as software suitable for software distribution on information networks.

The cores of Java(R) technologies are those indicated in the following (1) to (4).

(1) Program language specifications called a Java(R) language.

(2) A compiler for converting a program written with the Java(R) language into the format called intermediate code.

(3) A Java(R) virtual machine which is software for executing the intermediate code on a computer.

(4) A class library standardized for the Java(R) language.

The virtual machine and standardized class library among others are collectively called a Java(R) execution environment.

The specifications of the intermediate code and library are designed independent from the platform such as an OS, so that only the standardized library is used as an external module and if the Java(R) execution environment is supported on the terminal side, a developed Java(R) program (in actual, the Java(R) program compiled to the intermediate code) can be executed irrespective of the type of the platform at the lower level. An external module other than the standardized library can be used if it is developed by the Java(R) language and if it exists on each platform.

The standardized library of Java(R) is provided with a function of downloading a particular file from a network through a protocol such as HTTP by designating an URL, and other functions. It is therefore possible to acquire a Java(R) application from an information network and execute it.

The characteristics of Java(R) described above provide an ample possibility of content distribution via a network. The reason for this is that if the Java(R) execution environment is mounted on a terminal such as a personal computer and a digital electronic home appliance, not distribution of data based upon a format such as HTML, but distribution of an application having its own logic becomes possible on a cross platform.

Figure 1:
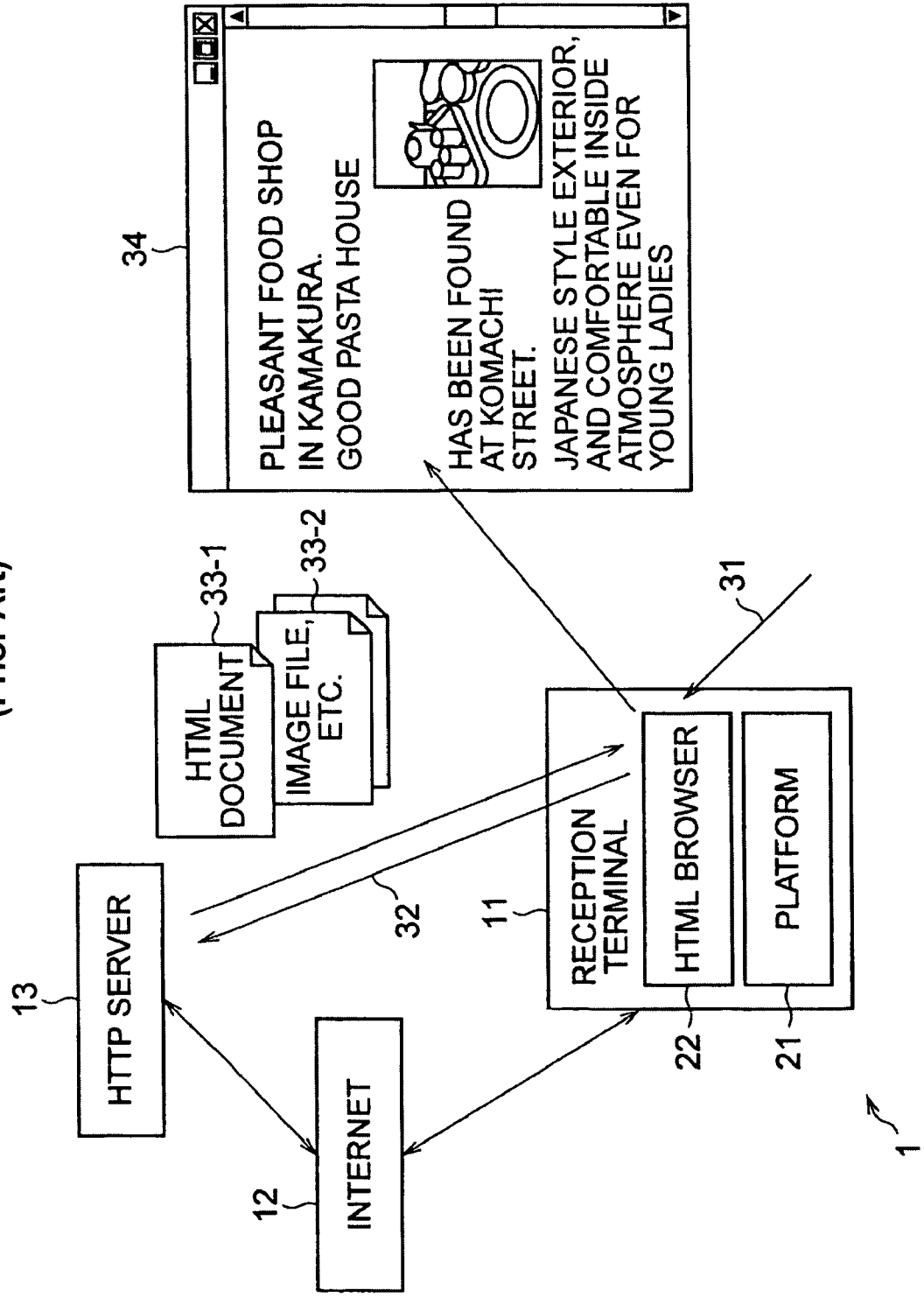
FIG. 1 is a perspective view showing an example the configuration of a W.W.W system illustrating the operation principle of W.W.W.
Figure 2:
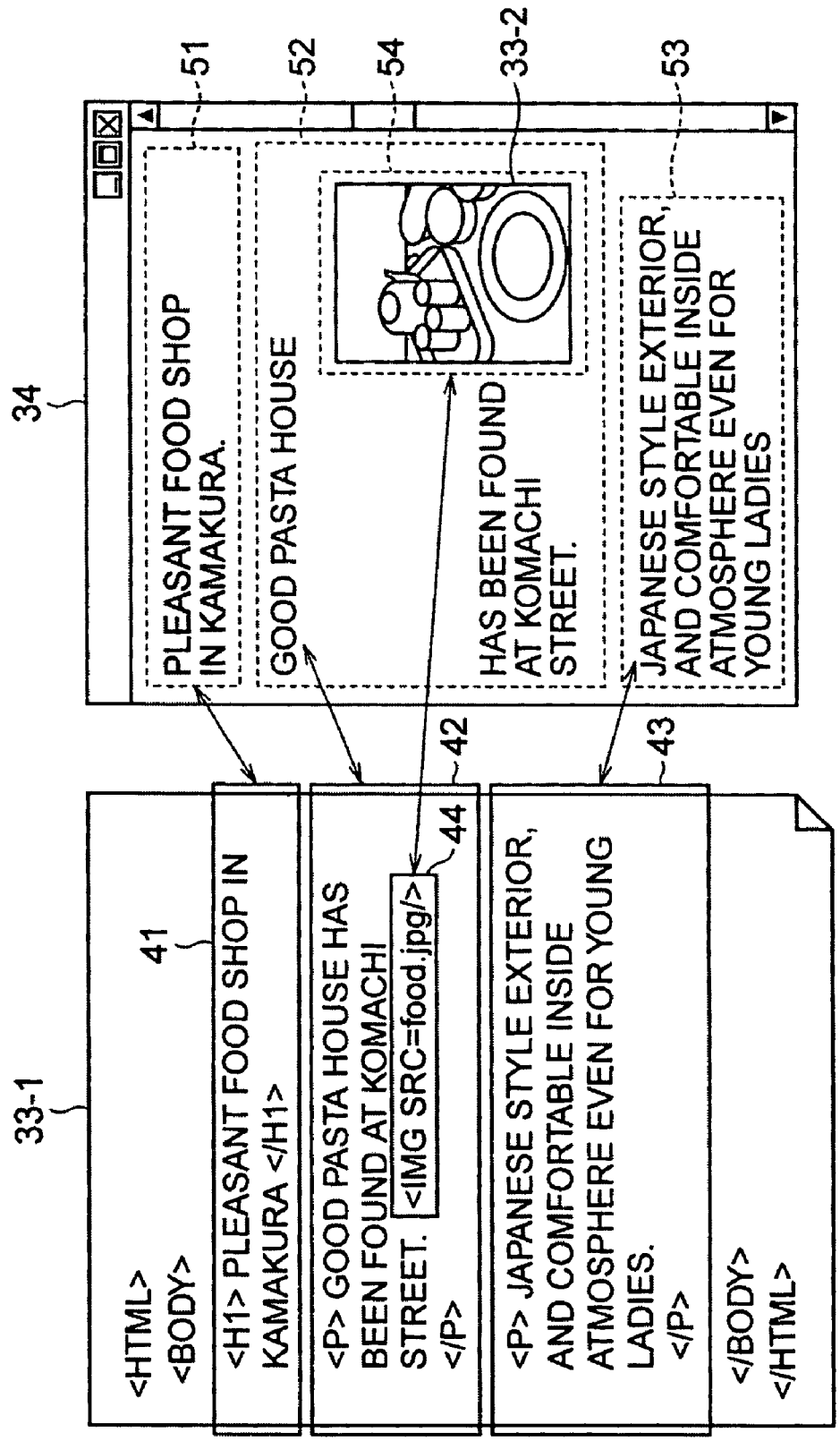
FIG. 2 is a diagram showing an example of an HTML document and its display example.
Figure 3:
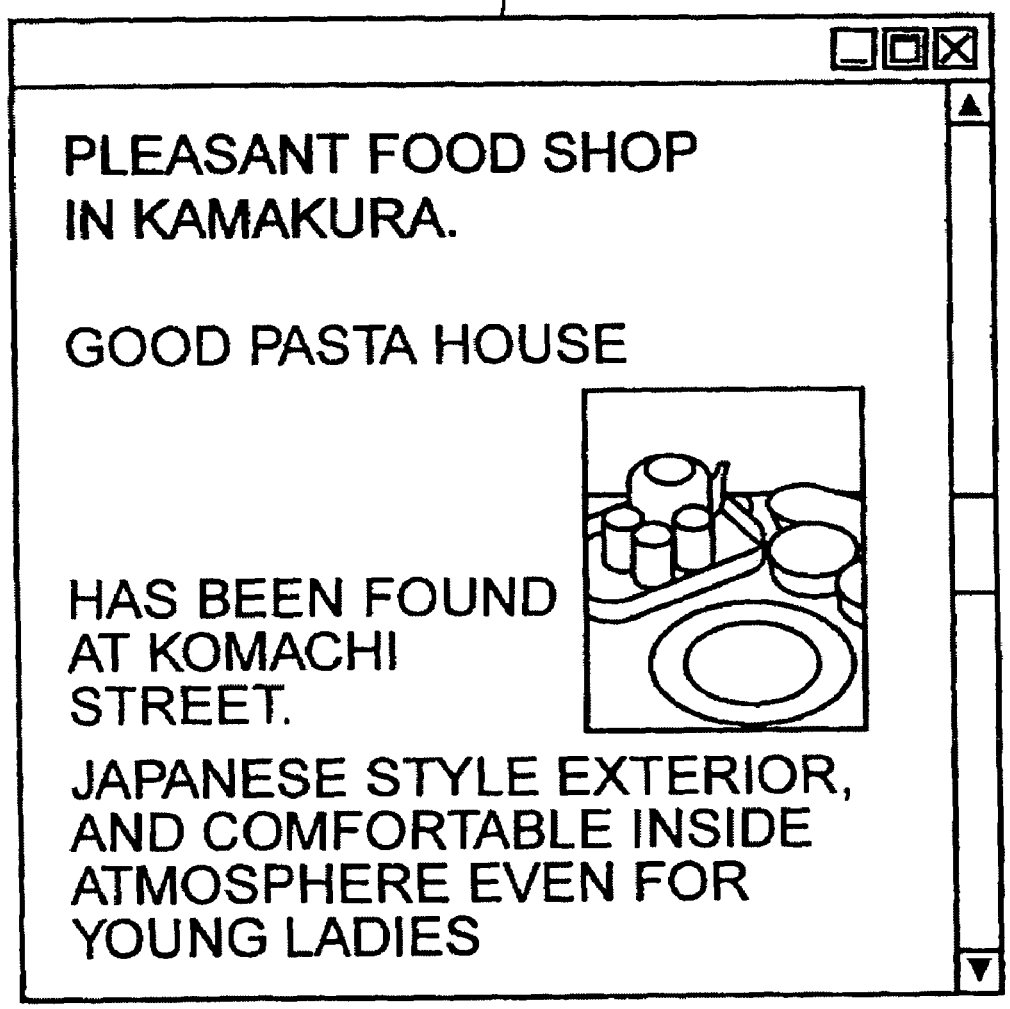
FIG. 3 is a diagram showing a display example of the HTML document shown in FIG. 2 when presentation consistency is not guaranteed.
Figure 4:
FIG. 4 is a diagram showing another display example of the HTML document shown in FIG. 2 when presentation consistency is not guaranteed.
Figure 5:
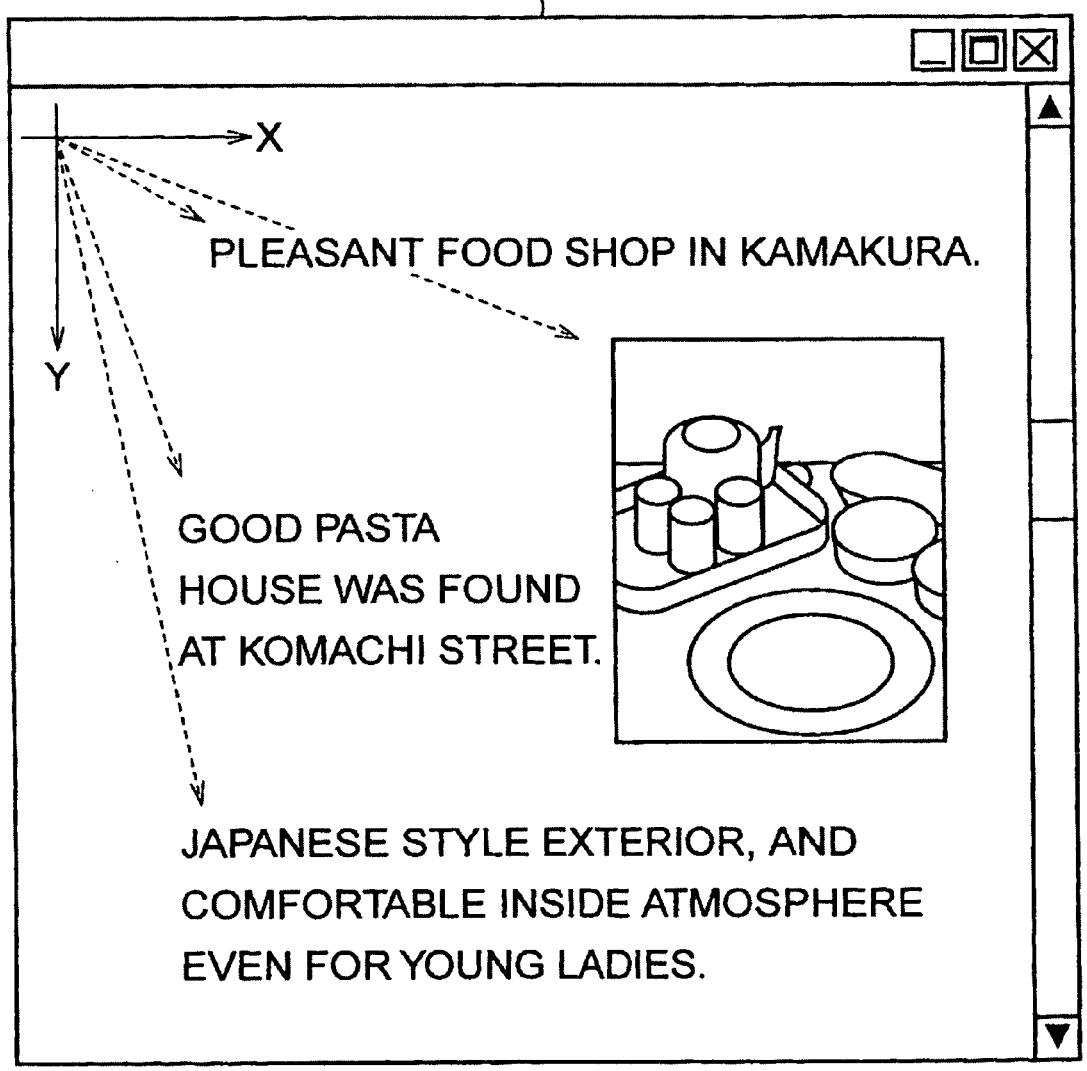
FIG. 5 is a diagram showing another display example of the HTML document shown in FIG. 2 when presentation consistency is guaranteed.
Figure 6:
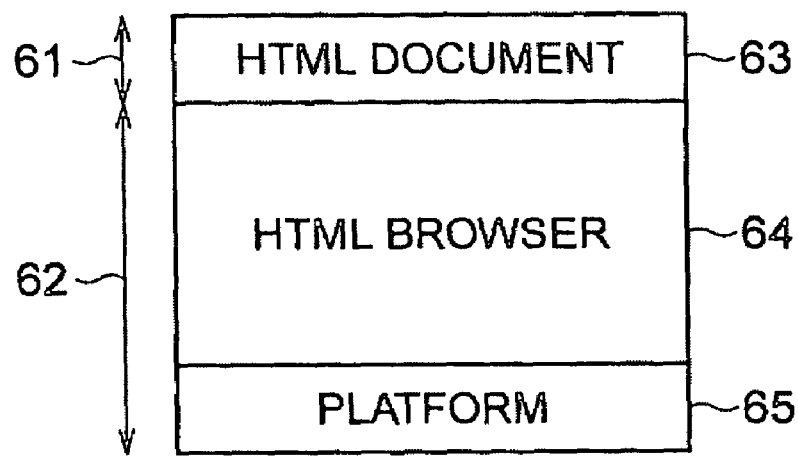
FIG. 6 is a diagram illustrating a distribution method for an HTML document.
Figure 7:
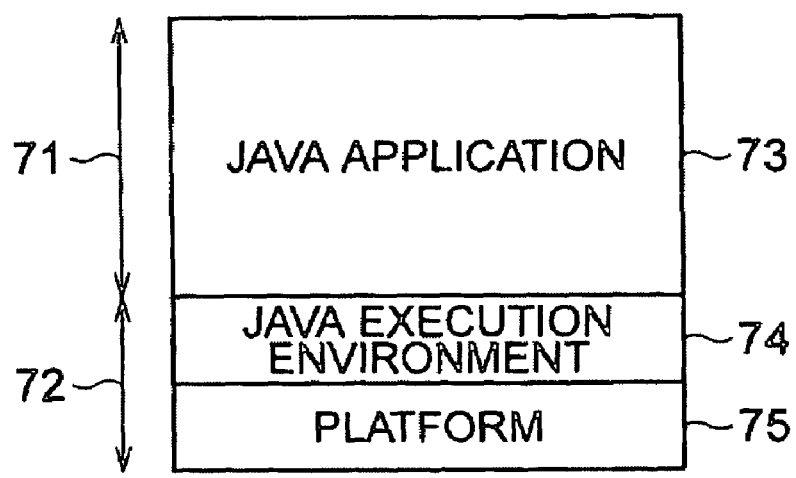
FIG. 7 is a diagram illustrating a distribution method for a Java(R) application.

FIG. 6 and FIG. 7 show a difference of a distribution method between an HTML document and Java(R) content. Namely, FIG. 6 shows a distribution method for HTML content, and in contrast, FIG. 7 shows a distribution method for a Java(R) application.

As shown in FIG. 6, for the HTML content distribution, a distribution content 61, specifically an HTML document 63, i.e., data, is distributed via a network. Terminal software 62 is constituted of an HTML browser 64 for analyzing and reproducing the HTML document 63, and a platform 63 such as an OS. Therefore, as described above, the functions capable of being realized by the content are limited to the functions of the HTML browser.

On the other hand, as shown in FIG. 7, for the Java(R) application distribution, a distribution content 71, specifically a Java(R) application 73, is distributed via a network. Terminal software 72 is a Java(R) execution environment 74 for executing the Java(R) application 73, and a platform 75. Therefore, any of the functions capable of being mounted by using the Java(R) language can be realized as a distribution content.

In advance of this trend, MHP (Multimedia Home Platform), which is the specifications of a software platform for digital electronic home appliances standardized by the European standardization organization DVB (Digital Video Broadcasting), incorporates actually the support of an execution environment for an application formed by the Java(R) language.

Java(R) is a software environment used for general applications. Developing a content of Java(R) requires programming skills of the Java(R) language, and it is not realistic for designers and content creators to develop a content directly by using the Java(R) language, and this should not be the case. Furthermore, the content development cost becomes higher than that of HTML in some cases.

Therefore, the above-described first to sixth issues are not solved merely by adopting Java(R). Namely, it is important to solve these issues by utilizing the features of Java(R).

According to preferred embodiments of the present invention, the above-described issues are solved by realizing software capable of production, distribution and reproduction of a multimedia content having the following characteristics.

Making realizable presentation and manipulation suitable for multimedia can be enumerated as the first characteristic. Specifically, there are characteristics (11) to (15) given in the following.

(11) Guarantee of Presentation Consistency

In the software according to a preferred embodiment of the present invention, a multimedia content is produced by disposing each of mono-media on a screen. In actual, each of various types of mono-media is realized as a kind of a component to be described later. The layout of a content by the software according to the preferred embodiment of the present invention is made by designating the position of each component constituting the content by the absolute coordinates on the screen. In this manner, the produced content is presented by the same layout and design as those at the time of production, irrespective of the type of a platform or the window size of a browser.

(12) Navigation with Upper, Lower, Right, Left, and Decision Keys.

Figure 8:
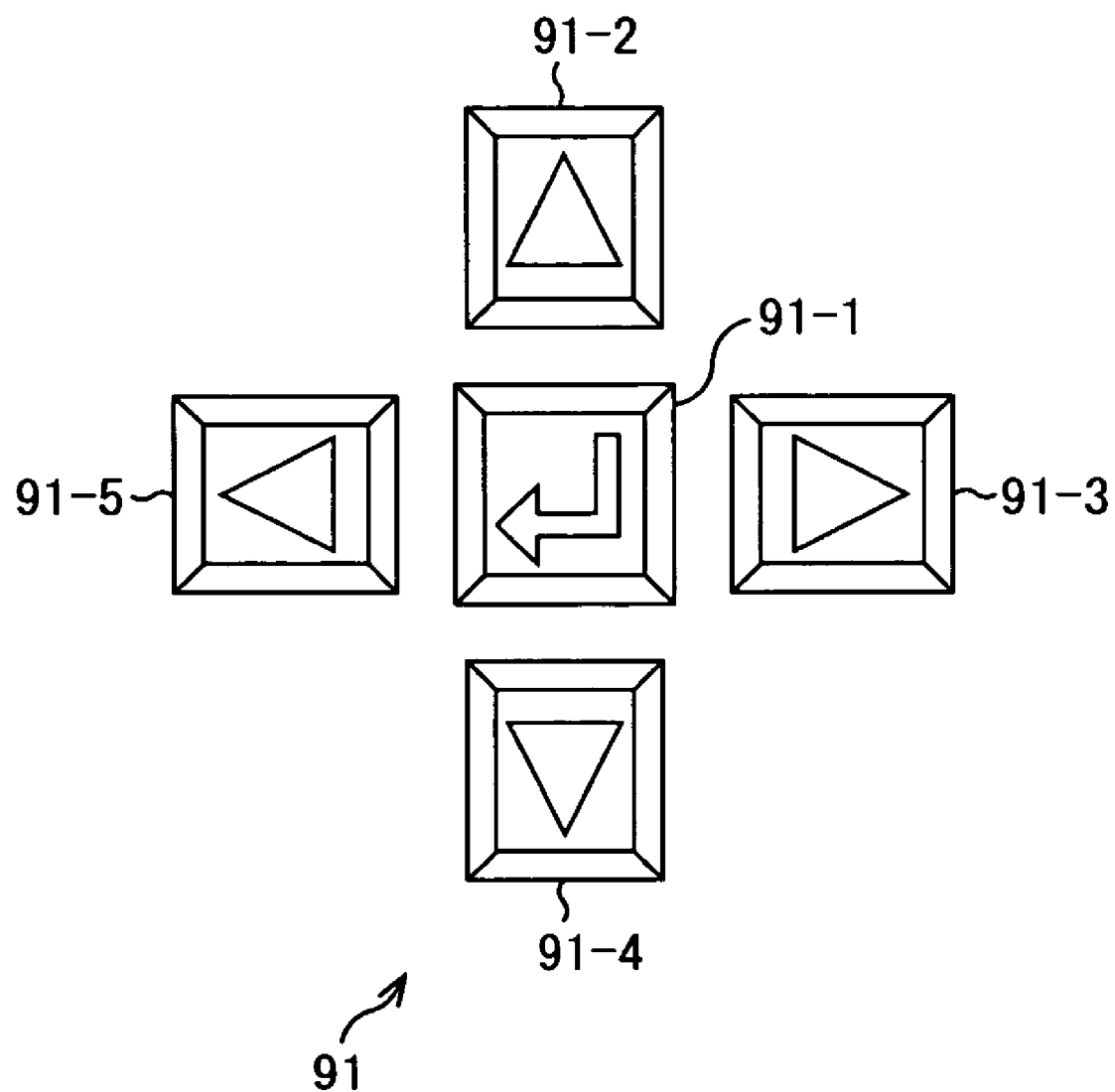
FIG. 8 is a diagram showing an example of the structure of upper, lower, right and left keys and a decision key.

In the software according to the preferred embodiment of the present invention, (upper, lower, right and left) arrow keys and a decision key are used as the interface between a user and a content. It is supposed that the platform for executing the software according to the preferred embodiment of the invention provides these keys in a hardware way. FIG. 8 shows an example of a key group as hardware. Namely, the interface between a user and a content according to the preferred embodiment of the present invention is constituted of a key 91-1 as the decision key, a key 91-2 as the upper arrow key, a key 91-3 as the right arrow key, a key 91-4 as the lower arrow key, and a key 91-5 as the left arrow key. A typical input device having the key group of this type is a remote controller (hereinafter simply called a remo-con). An input/output device having this key group 91 is not limited to a remo-con, but obviously personal computers, and also mobile terminals and various digital electronic home appliances can perform interaction with a content by the same manipulation. By using the button group 91, a user selects one of the components on the screen to perform interaction with the content.

(13) Content Structure of Scene Unit

A multimedia content by the software according to the preferred embodiment of the present invention is constituted of a plurality of scenes (screens) and distributed in the scene unit.

(14) Media Synchronizing Mechanism

The preferred embodiment of the present invention provides a function of presenting synchronously a plurality of media having a time axis such as moving images, audio and animation.

(15) Presentation on 3D Base

A multimedia content according to the preferred embodiment of the present invention is based on presentation on the 3D base. It is therefore possible to configure a user interface easy to understand intuitively.

A component framework allowing realizing sophisticated content production at a reduced cost can be enumerated as the second characteristic of the software according to the preferred embodiment of the present invention. Specifically, there are characteristics (21) to (24) given in the following.

(21) A content is configured by combining arbitrary components.

Each scene of a multimedia content according to the preferred embodiment of the present invention is configured by a combination of arbitrary components. Mono-media components such as moving images and still images or GUI (Graphical User Interface) components such as buttons can be enumerated as examples of components. Actual content production is performed by using an authoring system as will be later described. A content producer can add a component to a scene to customize the component by using the authoring system, or can write the behavior of the component by using the script language.

(22) Content Reproduction by Browser Software (hereinafter simply called a browser)

A multimedia content according to the preferred embodiment of the present invention is reproduced by the browser. The browser loads a designated scene and performs read-in and 3D display of a component group constituting the scene. Further, the browser provides a component with services such as life cycle management of components, key input navigation support and binding of scripts and components.

(23) Interface Specification of Component

In order to receive services of the browser, it is necessary that each component is mounted in the manner satisfying the defined interface specification, and in other cases, the component and browser are perfectly separated in terms of software. Therefore, if the specification is satisfied, a component having an arbitrary function can be developed newly and freely and assembled with a content.

(24) Component Control by Script Language

The software according to the preferred embodiment of the present invention allows even general content producers considered having no skill in expert programming languages such as designers and content creators to write the control of behavior of each component, such as manipulating a component, and receiving an event from the component and executing a process corresponding to the event type.

A content reproduction environment of a cross platform can be enumerated as the third characteristic of the software according to the preferred embodiment of the present invention. Specifically, there are characteristics (31) to (32) given in the following.

(31) Distribution of Browser

A browser can be distributed along with a content. Version-up of a browser and mutual existence with other architectures are therefore easy.

(32) Cross Platform

The content and browser to be distributed are applications formed by a language operable on the cross platform such as Java(R), and can be executed if the platform is supplied with the operation environment of the applications.

A preferred embodiment of the present invention will be described using Java(R).

Figure 9:
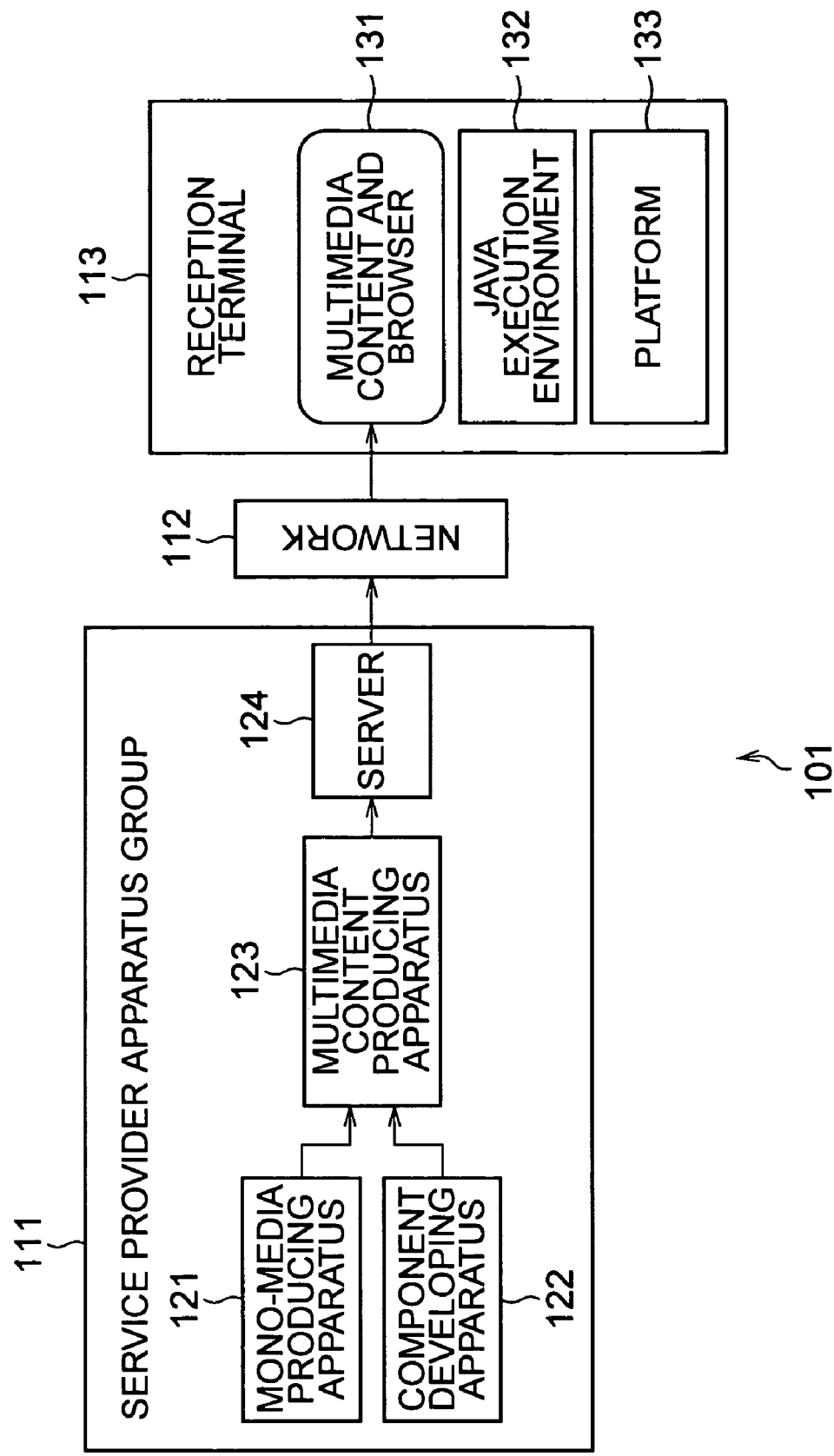
FIG. 9 is a diagram showing an example of the configuration of an information distribution system to which the invention is applied.

FIG. 9 shows an example of the configuration of an information distribution system applied with the preferred embodiment of the present invention.

As shown in FIG. 9, in the information distribution system 101, a service provider apparatus group 111 (specifically a server 124 to be described later) managed by a service provider and a reception terminal 113 managed by a user are interconnected via a predetermined network 112.

The service provider apparatus group 111 is constituted of a mono-media producing apparatus 121, a component developing apparatus 122, a multimedia content producing apparatus 123, and a server 124. In this embodiment, although the mono-media apparatus 121 to server 124 are discrete apparatuses, the mono-media apparatus 121 to server 124 may be collectively formed as one apparatus or they may be divided into a predetermined number of apparatuses (e.g., two apparatuses: a first apparatus having the functions of the mono-media producing apparatus 121 to multimedia content producing apparatus 123 and a second apparatus having the function of the server 124). Separation points of the division are arbitrary.

Although the entity which manages the service provider apparatus group 111 is not particularly limited, the entity is the subject which produces a multimedia content and distributes the content to a user (reception terminal 113) via the network 112. It is conceivable that the subject may be various types of subjects such as individuals aiming at profit or non-profit and parties.

The mono-media producing apparatus 121 produces various mono-media to be mounted on a multimedia content such as moving images, still images, texts and 3D shapes, and supplies them to the multimedia content producing apparatus 123. The mono-media producing apparatus 121 is generally operated by a designer.

The component developing apparatus 122 develops components according to the preferred embodiment of the present invention and supplies them to the multimedia content producing apparatus 123. Since components are developed by the Java(R) language, the component developing apparatus 122 is generally operated by a programmer. If a multimedia content can be produced by using only already existing components, the component developing apparatus 122 may be omitted.

The multimedia content producing apparatus 123 combines various components supplied from the component developing apparatus 122 to produce a multimedia content, assembles various mono-media supplied from the mono-media producing apparatus 121 in the multimedia content, and supplies them to the server 124.

Further, the multimedia content producing apparatus 123 produces, when necessary, software constituted of a produced multimedia content and a browse for reproducing it, and supplies the program to the server 124.

Specifically, the multimedia content producing apparatus 123 is installed with the authoring system of the type to be described later, and a content producer uses this system to assemble components into the content, customizes them, and writes the behavior of them by using the script language. In this case, the content producer is not required to have the knowledge of the Java(R) language. Therefore, the multimedia content producing apparatus 123 is generally operated directly by a designer or content creator even not having the knowledge of the Java(R) language.

The server 124 is connected to the network 112 and distributes a multimedia content supplied from the multimedia content producing apparatus 123 to the reception terminal 113 via the network 112. Further, the server 124 distributes, when necessary, software constituted of a multimedia content and a browser for reproducing the content. As described earlier, this software may be supplied from the multimedia content producing apparatus 123 or may be newly produced by the server 124.

The server 124 is installed with server application software for executing processes of this kind. Although the type of an server application changes with the type of a network or a protocol, if distribution is performed on the Internet by using the HTTP protocol, a general HTTP server corresponds to the server 124.

Although the network 112 is not limited particularly, it is an information network capable of transmitting a multimedia content, such as the Internet.

The reception terminal 113 is operated by a user who utilizes a multimedia content. Although a user is supposed to be a general user in a home, it is not limited thereto. Further, the reception terminal 113 is not limited to a particular one, and other terminals capable of utilizing a multimedia content may also be used, such as various digital electronic home appliances in addition to personal computers.

However, in order to apply the preferred embodiment of the present invention, the reception terminal 113 is required to have a multimedia content and browser 131 as the Java(R) application software distributed via the network, a Java(R) execution environment 132 as the software environment for executing distributed Java(R) application software, and a platform 133 for supporting the Java(R) execution environment 132.

In this example, although the Java(R) execution environment 132 is a JRE (Java(R) Runtime Environment) distributed by Sun Microsystems, it may be others of Java(R) software.

Next, with reference to FIG. 10, description will be made on an example of the structure of the multimedia content producing apparatus 123.

A CPU 141 executes various processes in accordance with programs stored in a ROM 142 or programs loaded from a storage unit 148 into a RAM 143.

RAM 143 stores also data necessary for CPU 141 to execute various processes, when necessary.

CPU 141, ROM 142 and RAM 143 are interconnected by a bus 144. The bus 144 is also connected to an input/output interface 145.

The input/output interface 145 is connected to an input unit 146 constituted of a keyboard and the like, an output unit 147 constituted of a display for displaying images (moving images and still images), a speaker for outputting audio sounds and the like, the storage unit 148 constituted of a hard disk and the like, and a communication unit 149 for executing a communication process with the mono-media producing apparatus 121, component developing apparatus 122, server 124 and the like respectively shown in FIG. 9.

The input/output unit 145 is also connected to a drive 150 when appropriate, on which a removable recording medium 151 is mounted when appropriate, such as a magnetic disk, an optical disk, a magneto optical disk and a semiconductor memory, and a computer program read from the recording medium 151 is installed in the storage unit 148 when necessary.

The removal recording medium 151 is recorded, when necessary, with mono-media produced by the mono-media producing apparatus 121, components developed by the component developing apparatus 122, a multimedia content produced by the multimedia content producing apparatus 123 and the like.

Figure 10:
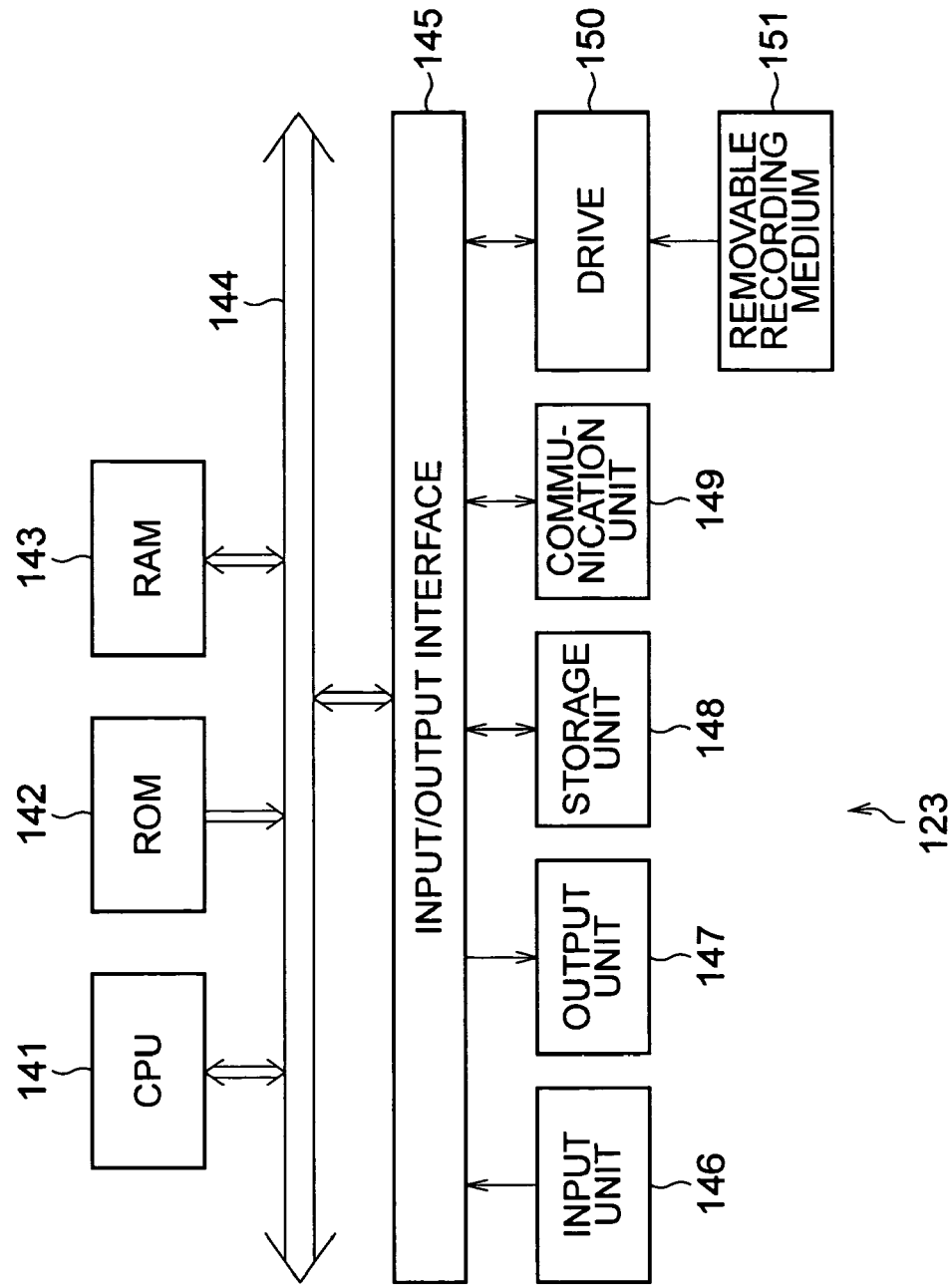
FIG. 10 is a block diagram showing an example of the structure of a multimedia content producing apparatus of the information distribution system shown in FIG. 9.
Figure 11:
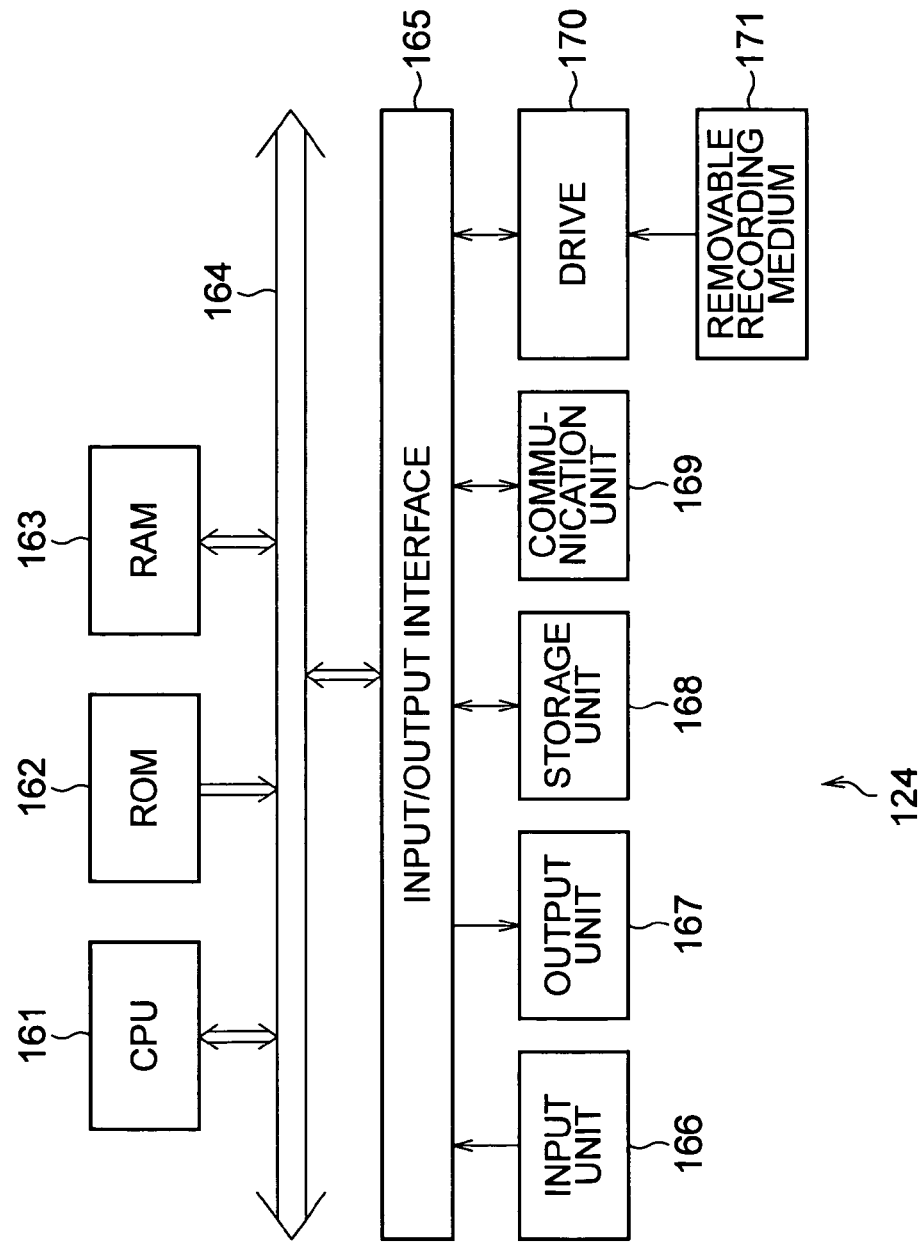
FIG. 11 is a block diagram showing an example of the structure of a server of the information distribution system shown in FIG. 9.

FIG. 11 shows an example of the structure of the server 124. A CPU 161 to a removable recording medium 171 have basically similar structures to those having corresponding names of CPU 141 to removable recording medium 141 of the multimedia content producing apparatus 123 of FIG. 10 described above, and the description thereof is therefore omitted. A communication unit 169 executes a communication process with the multimedia content producing apparatus 123 and network 112 (FIG. 9).

Figure 12:
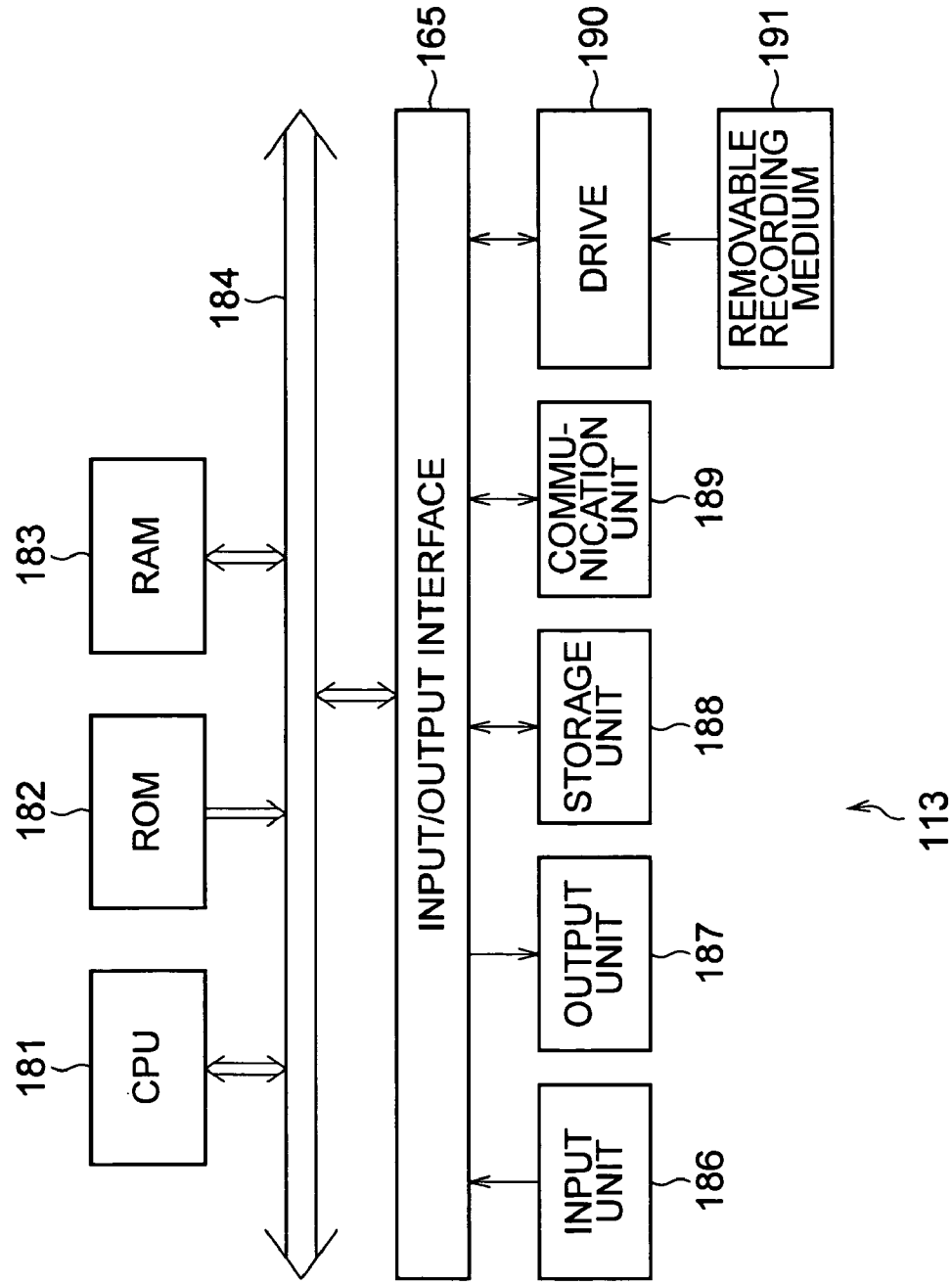
FIG. 12 is a block diagram showing an example of the structure of a reception terminal of the information distribution system shown in FIG. 9.

FIG. 12 shows an example of the structure of the reception terminal 113. A CPU 181 to a removable recording medium 191 have basically similar structures to those having corresponding names of CPU 141 to removable recording medium 141 of the multimedia content producing apparatus 123 of FIG. 10 described above, and the description thereof is therefore omitted. A communication unit 169 executes a communication process with the network 112 (FIG. 9). In the example shown in FIG. 12, although the reception terminal 113 has the style of a personal computer, the style is not limited thereto, but it may use various styles such as digital electronic home appliances as described earlier. Therefore, the input unit 186, output unit 187 and the like may use various types depending upon the type of the reception terminal 113.

Although not shown, each of the mono-media producing apparatus 121 and component developing apparatus 122 has basically a similar structure to that of the multimedia content producing apparatus 123 of FIG. 10 described above.

Next, with reference to FIG. 13, description will be made on the mechanism of an example of multimedia content reproduction to which a preferred embodiment of the present invention is applied.

In this example, not only a content but also a browser is distributed via a network 112 by positively incorporating the characteristics of Java(R) capable of distributing applications on a cross platform.

As indicated by an arrow 241 in FIG. 13, when a URL is input to the reception terminal 113, the Java(R) execution environment (strictly speaking, an application manager to be later described) 132 issues an access request to the server 124 on the network 112 designated by URL to access the server 124, as indicated by an arrow 242. The Java(R) execution environment (strictly speaking, the application manager to be described later) 132 acquires distribution software (Java(R) application software) 243 constituted of a multimedia content 252 designated by the user and a browser 251 for reproducing the content, activates the acquired browser 251 and executes content reproduction 244 for the multimedia content 243. For example, as the result of the content reproduction 244, an image 461 shown in FIG. 26 to be described later is displayed on a display (the output unit 187 in FIG. 12) of the reception terminal 113.

As above, since also the browser 251 is distributed via the network 112, the user is not necessary to be conscious of updating the browser 251. Further, if the Java(R) execution environment 132 only is standardized, software distribution of a combination of browsers having a variety of architectures and content can be freely (without standardization) performed.

Furthermore, like a conventional browser, the browser 251 may be fixedly mounted on the reception terminal 113 to run it. In this case, since it is not necessary to distribute the browser 251 each time the multimedia content 252 is distributed, the size of distribution data can be suppressed.

Figure 14:
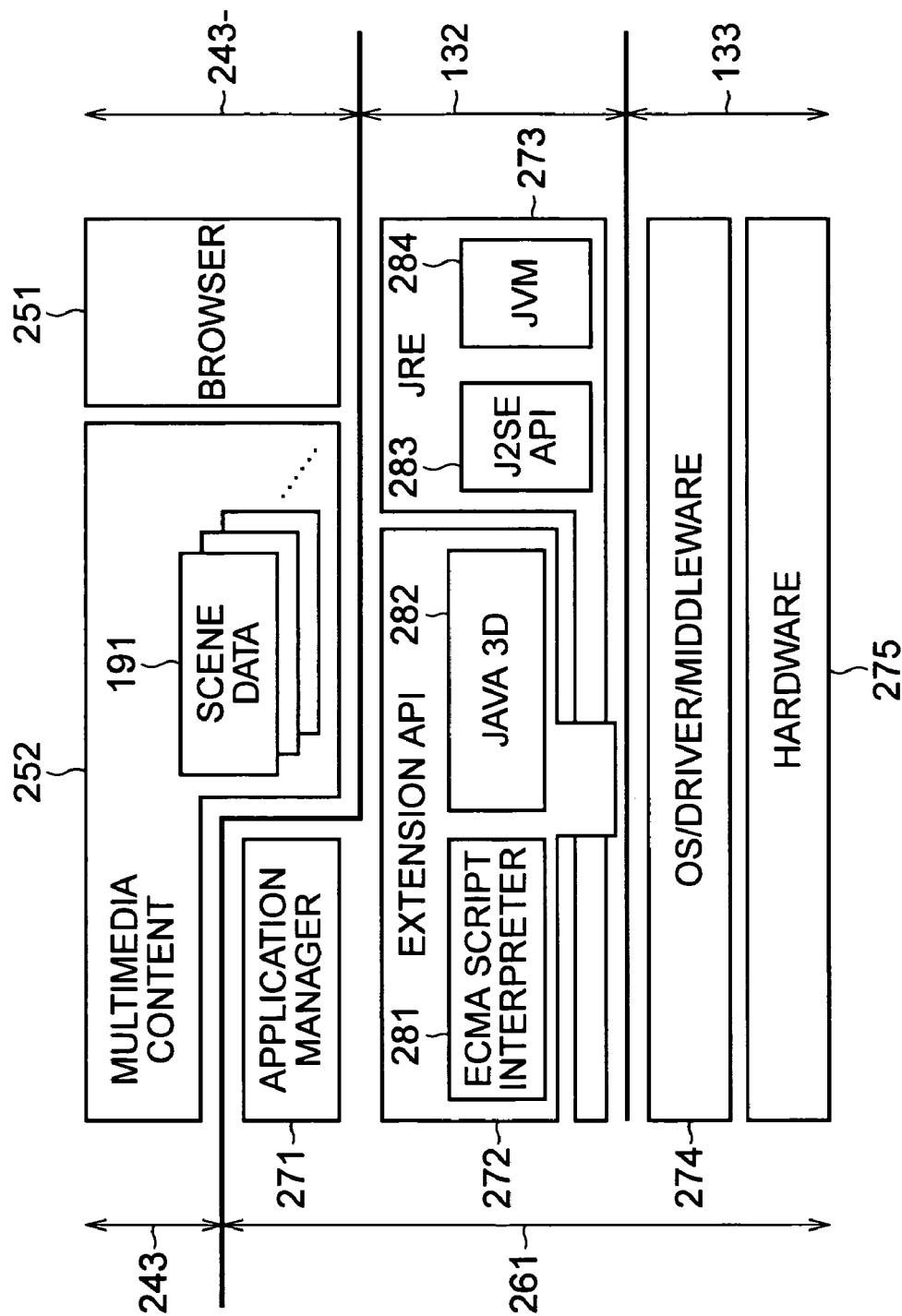
FIG. 14 is a diagram showing software stacks on the side of the reception terminal.

Next, with reference to the drawing, the operation environment according to a preferred embodiment of the present invention will be described. FIG. 14 shows software stacks on the side of the reception terminal 113.

As shown in FIG. 14, a Java(R) application 243-1 exists as distribution software 243, and an application manager 271, a Java(R) execution environment 132 and a platform 133 exist as terminal software 261.

As described above, the Java(R) application 243-1 is constituted of the multimedia content 252 and browser 251. The multimedia content 252 is structured, for example, by collecting a plurality of scene data 191.

Figure 13:
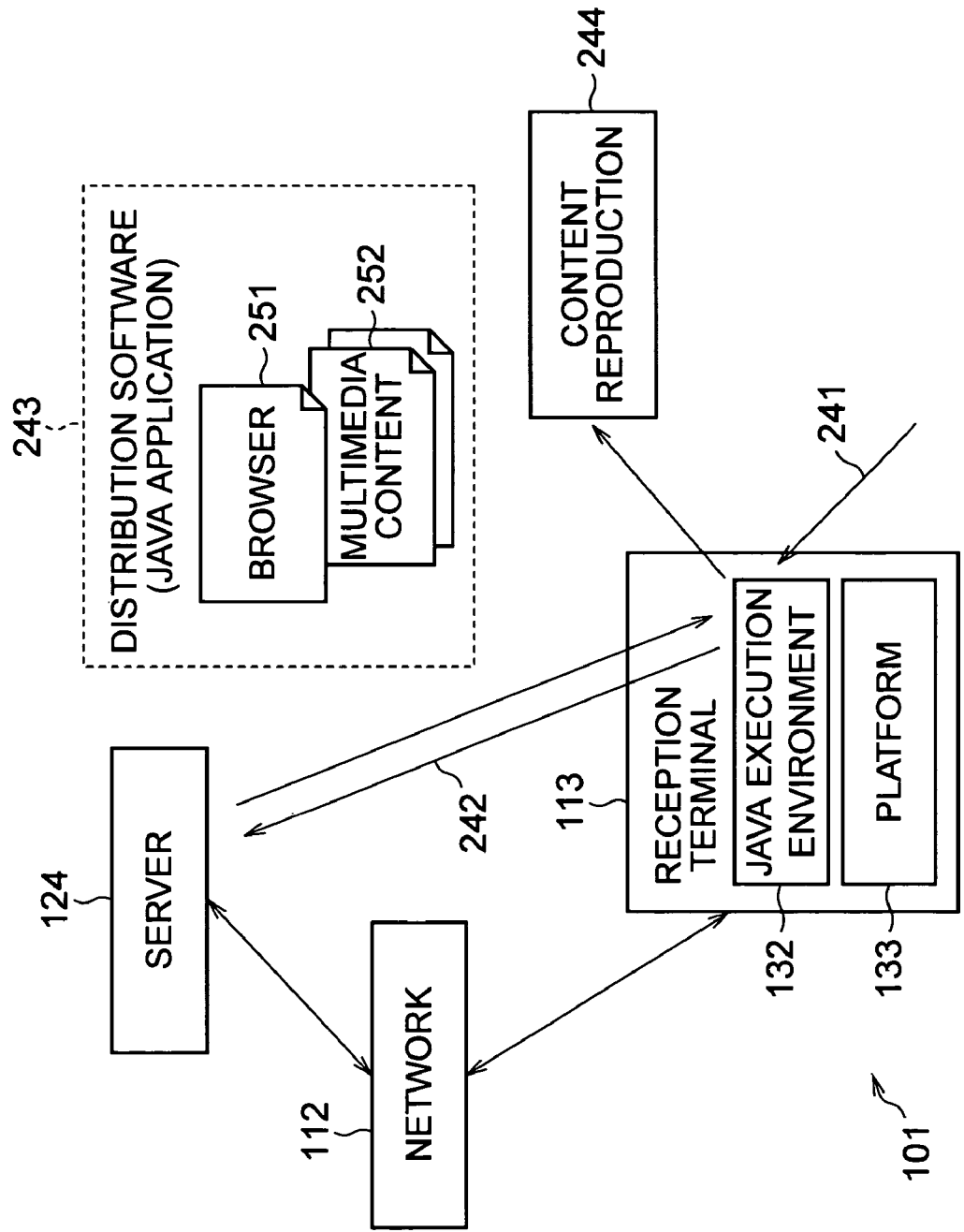
FIG. 13 is a diagram illustrating the mechanism of reproducing a multimedia content.

As shown in FIG. 13, the application manager 271 is software for downloading the multimedia content 252 and browser 251 (distribution software 243) from the network 112 in accordance with URL input from the user, and executing them.

The above-described Java(R) execution environment 132 is constituted, for example, of an extended API (Application Program Interface) 272, a JRE (Java(R) Runtime Environment) 273 and the like.

JRE 273 is an execution environment for Java(R) applications distributed by Sun Microsystems, and is constituted mainly of a JVM (Java(R) Virtual Machine) 284 and a J2SE API (Java(R)2 Platform Standard Edition API) 283. JVM 284 is software (Java(R) virtual machine) for analyzing and executing a Java(R) application expressed by intermediate code, and J2SE API 283 is a class library group standardized for Java(R) applications.

In the example, the extended API 272 is a Java(R) class library group added to J2SE, and representative ones are Java(R)3D 282 and an ECMA (European Computer Manufactures Association) script interpreter (trademark) 281.

Java(R)3D 282 is a class library developed by Sun Microsystems for realizing an application utilizing 3D in a Java(R) program. It can configure a 3D virtual space by directly calling a method from a program, as different from a script language configuring declaratively a 3D virtual space such as a VRML (Virtual Reality Modeling Language).

In this example, the ECMA script interpreter 281 is added because an ECMA script is used as the script language for manipulating components. The ECMA script is the Java(R) script developed by Netscape Communications Corporation and standardized by the standardization organization ECMA. The ECMA script has the control structure such as conditional branch and repetition like a general programming language so that a flexible component control is possible.

The platform 133 is constituted of an OS/driver/middleware 273 made of an OS, drivers, middleware and the like and hardware (such as CPU 181 to drive 190 shown in FIG. 12).

Next, an exchange format will be described.

The entity of a component includes a Java(R) class file constituting the component, and an object having an instanced class and set with a necessary field value, i.e., customized.

Each component constituting a scene is written in one file per scene (hereinafter called an instance file) by using a serialization mechanism provided by a Java(R).io package. In this example, the extension of an instance file is "dat". When a scene is reproduced, the browser reconfigures the object of each component from the class file group and instance file.

Figure 15:
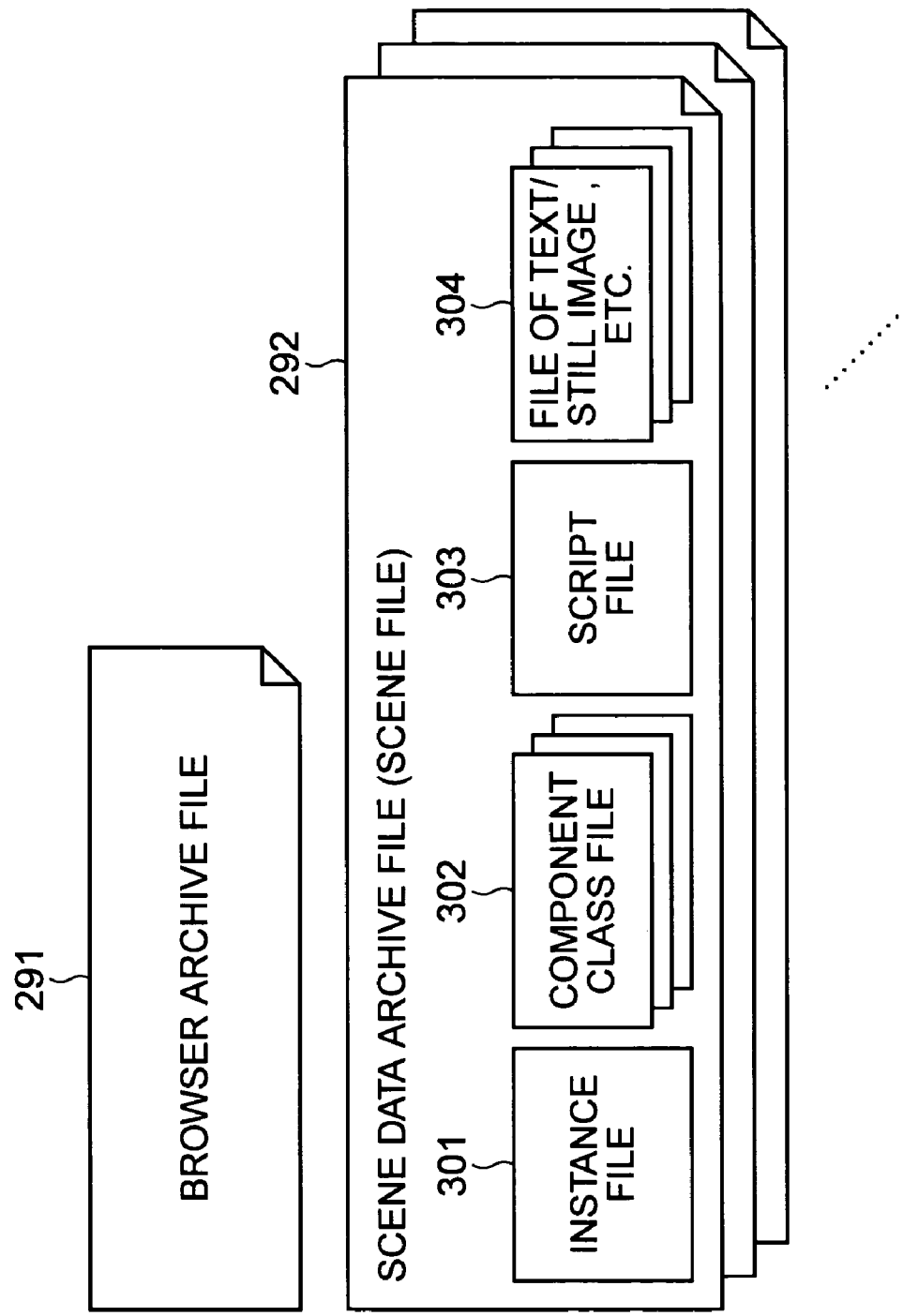
FIG. 15 is a diagram showing an example of the arrangement of distribution software shown in FIG. 13.

FIG. 15 shows an example of the structure of software actually distributed to the reception terminal 113 via the network 112.

As shown in FIG. 15, an archive file 292 of scene data 191 constituting each scene is constituted of an instance file 301, a class file 302 of components, a script file 303 in which code of the ECMS script is written in the text format, and a file 304 for texts, still images or the like.

Of the archive file 292 of the scene data 191, the instance file 301, class file 302 for class components and script file 303 are archived by a method called a Jar type provided by Java (R). This archive also contains, when necessary, a file (monomedia file) group 304 for texts, still images or the like used when each component is executed.

A file constituting the archive file group of scene data is hereinafter called a scene file. The name of a scene file to be reproduced first is "startup.jar" being distinguished from other scene files. "jar" is an extension of an archive file of the jar type.

The name of the instance file 301 of each scene is the same name as that of the scene file 292. Therefore, the instance file of the startup scene is "startup.dat".

The browser 251 is also archived by using the Jar type. Therefore, the distribution software is constituted of the archive file 291 of the browser 251 and a group of scene files (Jar files) 292 corresponding to respective scenes.

A file called a manifest file is built in the Jar file. This file is written with settings of various attributes in the text format. Each attribute is called an attribute. In this example, the attribute of the startup.jar file is extended so that a URL of the browser and a URL of each scene other than startup can be set.

Also in this example, when an instance of each component is written in a file or read from the file, although the serialization mechanism provided by the Java(R).io package is used, the embodiment is not limited only thereto, but techniques of the text format such as XML may also be used.

Next, an interface between the browser 251 and a component will be described.

In this example, the interface between the browser 251 and a component is configured on Java(R)Beans. Java(R)Beans is a component framework provided by Java(R).

Each component is required to mount a component interface defined by an mmcomponent in accordance with the function of the component, while the specification of Java(R) Beans is satisfied.

Figure 16:
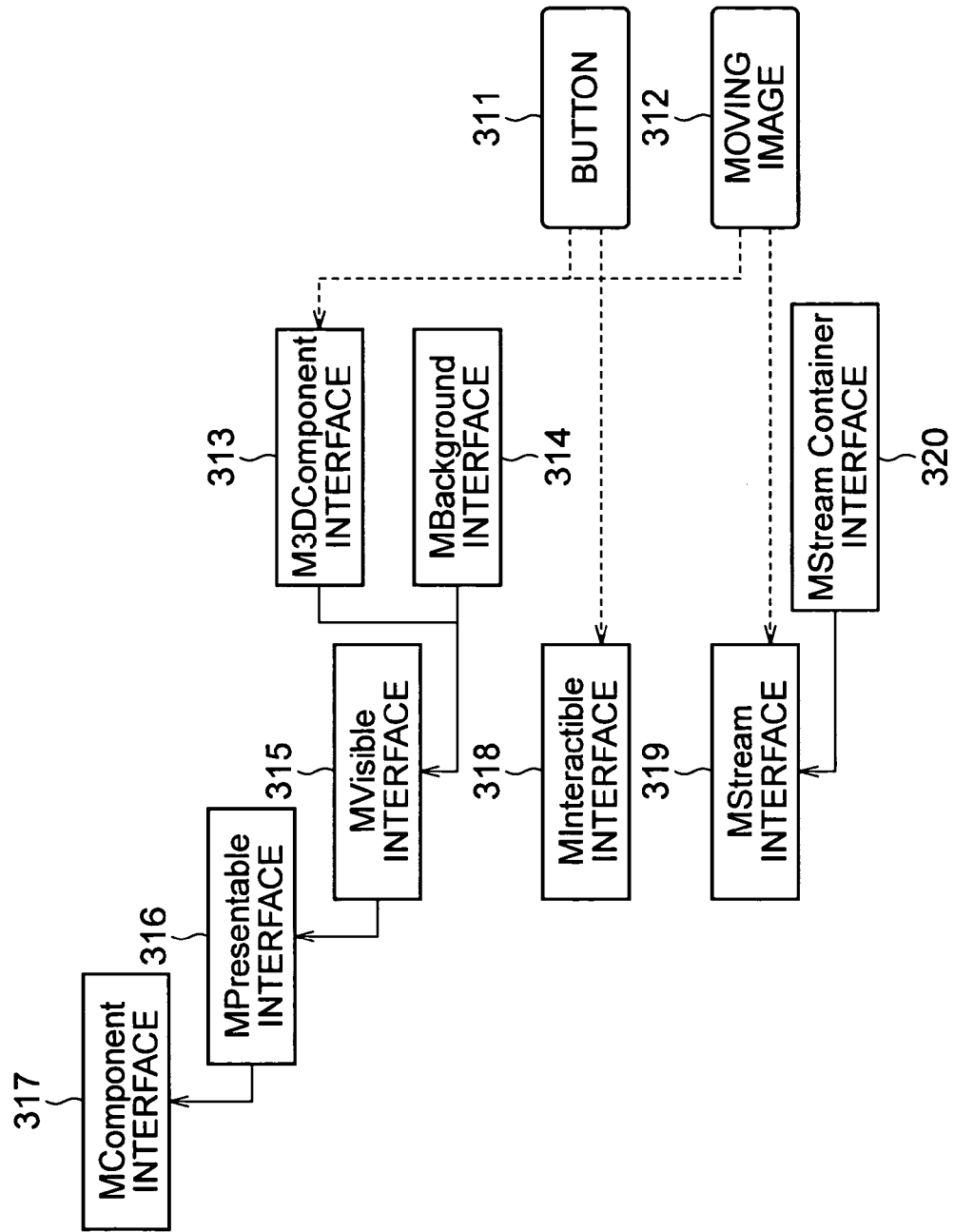
FIG. 16 is a diagram showing the structure of a MComponent package which is the interface with the browser and components shown in FIG. 13.

Each interface is used for allowing a component to receive various services from the browser, and has an inheritance relation such as shown in FIG. 16. In this drawing, the lower level interface inherits an upper level interface.

With reference to FIG. 16, the details of the mmcomponent package will be described.

An MComponent interface (hereinafter, simply described as MComponent) 317 is an interface all components are required to mount it. MComponent 317 provides a getid( ) method. The getid( ) method returns an ID character string of the component, and the browser distinguishes unanimously each component from the ID value obtained by the method. MComponent 317 also provides an initialize( ) method and a destroy( ) method. The component is required to execute an initialize process by the initialize ( ) method and an end process by the destroy( ) method.

An MPresentable interface (hereinafter, simply described as MPresentable) 316 is used for defining the operation of a component having some presentation. MPresentable 316 provides a run( ) method and a stop( ) method. The run( ) method starts presentation, and the stop( ) method terminates the presentation. Whether presentation is under execution or not is judged by the true-false value returned by a getActive( ) method. A getInitiallyActive( ) method returns a true-false value for whether or not presentation is started immediately when the component starts the scene.

An MVisible interface (hereinafter, simply described as MVisible) 315 defines the behavior of a visible component.

An M3DComponent interface (hereinafter, simply described as M3DComponent) 313 defines the behavior of a component having 3D presentation. M3DComponent 313 provides a getSubGraph( ) method. This method returns an instance of a BranchGroup of Java(R)3D API. The corresponding object is an entity of 3D presentation of the component, and the browser adds the BranchGroup object obtained by the method to a scene graph provided by Java(R) 3D. In this manner, 3D presentation of the component enters a visible state. Further, M3DComponent 313 provides methods such as a get/setPosition( ) method, a get/setRotation( ) method and a get/setScale( ) method. These methods designate the position, posture and scale of a component of each scene constituting a moving image 312 so that presentation consistency can be guaranteed.

An MBackground interface (hereinafter, simply described as MBackground) 314 defines the behavior of a component expressing the background of a 3D space. MBackground 314 provides a getBackgroundGraph( ) method. This method returns a BranchGroup object. This object is an entity of background presentation and is added to the scene graph by the browser.

An MInteractible interface (hereinafter, simply described as MInteractible) 318 defines the behavior of an interactive component such as a button 311. A component mounted with MInteractible 318 becomes an object of focus management. Of components mounted with MInteractible 318, there is one component in a scene at the most, which holds a focus at an arbitrary timing.

When a user performs a key input by manipulating the key group (FIG. 8), the browser 251 calls a keydown( ) method and a keyup( ) method of the component holding the focus (component mounted with MInteractible 318). The component can therefore receive the user key input. If the type of an input key is one of the arrow keys 91-2 to 91-5 (FIG. 8), the focus transits and another component newly acquires the focus. At this time, a blur( ) method is called for the component having held the focus, whereas a focus( ) method is called for the component newly acquired the focus (component mounted with MInteractible 318).

The component having the focus holds ID values as to whether the focus transits to which component in response to an input by any one of the upper, lower, right and left arrow keys 91-2 to 91-5 while the component holds the focus. These values can acquire from the values returned by a getNavup( ) method, a getNavdown( ) method, a getNavLeft( ) method, and a getNavright( ) method respectively provided by MInteractible 318.

An example of focus transition of this type will be described with reference to FIG. 17.

Figure 17:
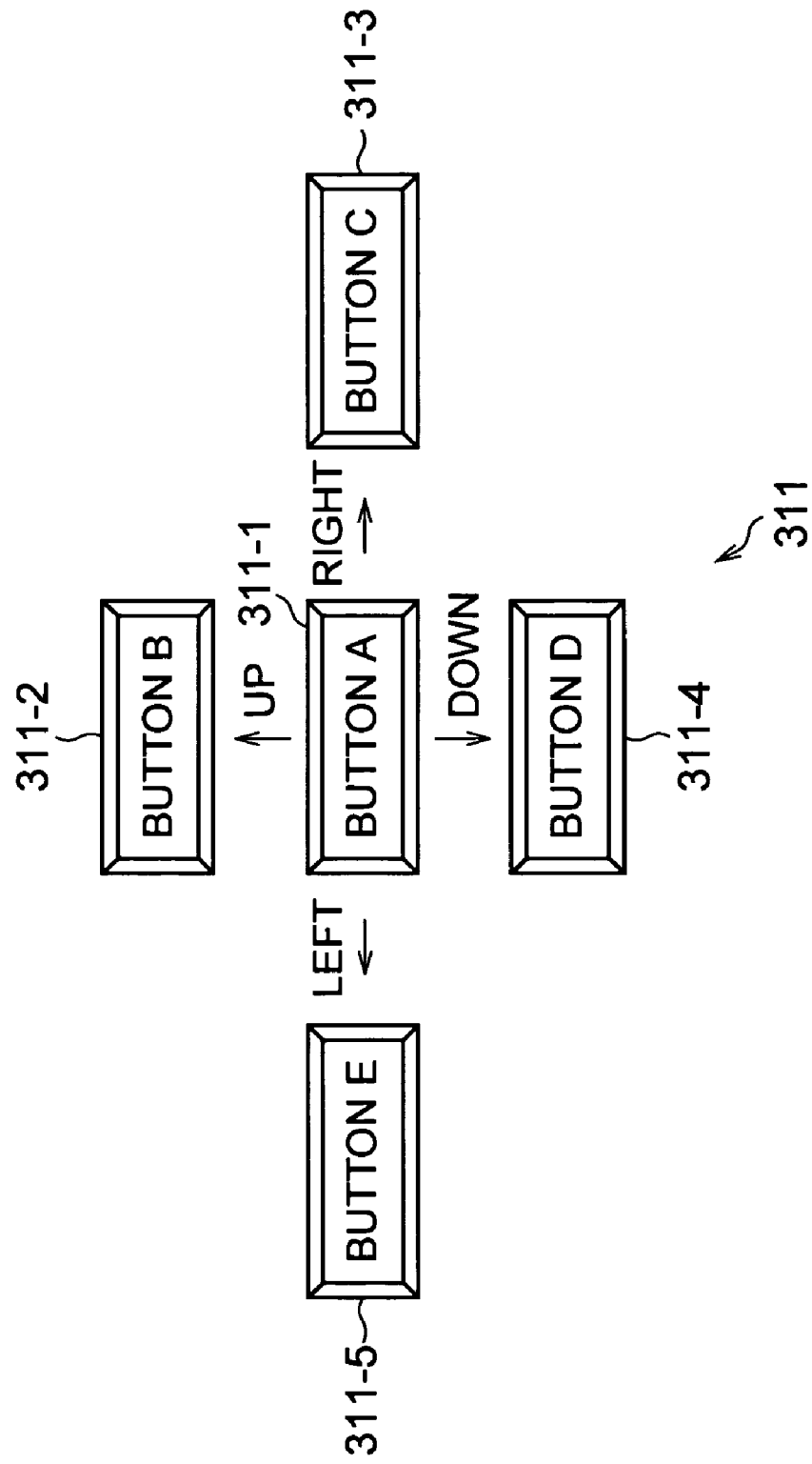
FIG. 17 is a diagram showing an example of focus transition of the browser shown in FIG. 13.

It is now assumed that components are disposed as shown in FIG. 17, the components including a component (hereinafter, simply called a button) 311-1 mounted with MInteractible 318 having, "button A" as its ID value, a component (hereinafter, simply called a button) 311-2 mounted with MInteractible 318 having "button B" as its ID value, a component (hereinafter, simply called a button) 311-3 mounted with MInteractible 318 having "button C" as its ID value, a component (hereinafter, simply called a button) 311-4 mounted with MInteractible 318 having "button D" as its ID value, and a component (hereinafter, simply called a button) 311-5 mounted with MInteractible 318 having "button E" as its ID value. It is also assumed that the getNavup( ) method of the button 311-1 returns "button B", the getNavdown( ) method returns "button D", the getNavLeft( ) method returns "button E" and the getNavright( ) returns "button C".

For example, assuming now that the button 311-1 holds the focus, when a user depresses the upper arrow key 91-2 (FIG. 8), a focus management unit 372 (FIG. 23) of the browser 251 to be described later executes the getNavup( ) method of the button 311-1, judges that the focus destination is the button 311-2, transits the focus correspondingly, and executes the blur( ) method for the button 311-1 and the focus( ) method for the button 311-2. Similarly, when the lower arrow key 91-4, left arrow key 91-5 or right arrow key 91-3 is depressed, the focus transits to the corresponding one of the button 311-4, button 311-5 and button 311-3.

Reverting to FIG. 16, MInteractible 318 also issues an event when the focus transition occurs, i.e., the focus( ) method or blur( ) method is called. When this event is generated, the above-described ECMA script interpreter 281 (FIG. 14) analyzes and executes as a script the character string returned by a getOnfocus( ) method or a getOnblur( ) method provided by MInteractible 318.

An MStream interface (hereinafter described as MStream) 319 defines the behavior of media (hereinafter called a stream) changing their expression state with a lapse of time, such as audio sounds and moving images 312. A component mounted with MStream 319 becomes the object of a synchronizing process. This interface provides a getStreamPosition( ) method or a setStreamPosition( ) method. Acquisition and setting of a reproduction position of a stream become therefore possible. A getSartLatency( ) method allows to acquire a wait time until reproduction of the stream becomes reproducible (await time for preparation). Further, a playStream( ) method or a stopStream( ) method allows the reproduction of a stream. The playStream( ) method can designate the time to the reproduction start as an argument.

An MStreamContainer interface (hereinafter, described as MStreamContainer) 320 defines the behavior of a component which executes the synchronization control of a plurality of MStreams 319. MStreamContainer 320 holds reference to each MStream component performing synchronization.

Figure 18:
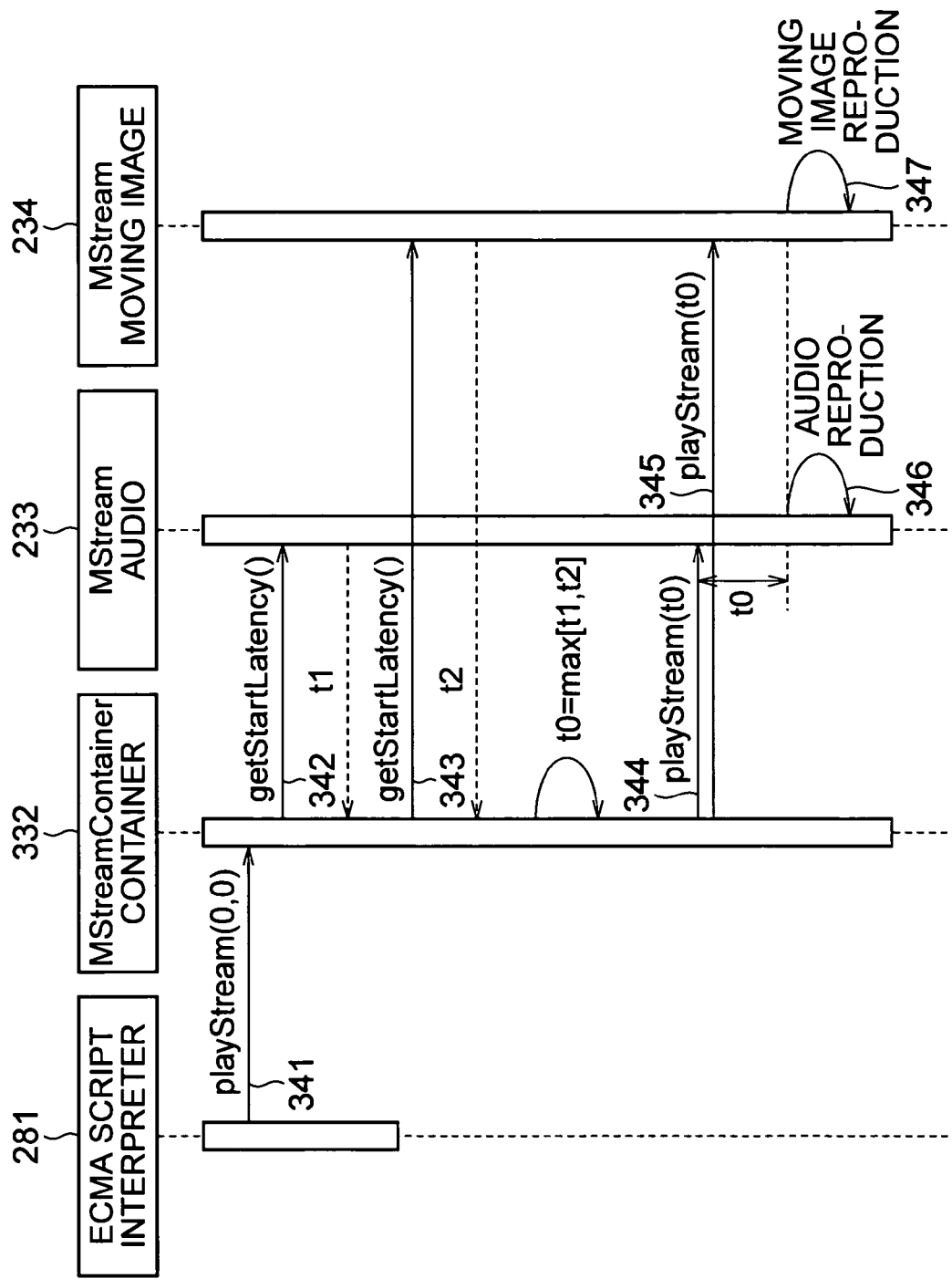
FIG. 18 is a diagram illustrating the sequence of a media synchronizing mechanism of the browser shown in FIG. 13.

FIG. 18 shows an example of a sequence when MStreamContainer 320 executes the control of a plurality of MStream components.

In the example shown in FIG. 18, it is assumed that a scene has a container mounted with MStreamContainer 320 (hereinafter, simply described as a container) and audio 233 and moving images 234 and that the container 332 performs the synchronization control of the audio 233 and moving images 234.

As indicated by an arrow 341, first the ECMA script interpreter 281 executes a call of the playstream( ) method from the container 332 by using an argument 0.0. The container 332 immediately reproduces the audio 233 and moving images 234 from the tops of the streams.

It is supposed in this case that times taken to prepare for the start of reproduction of the audio 233 and moving images 234 are different. In order to solve this problem, as indicated by arrows 342 and 343, the container 332 calls the getStartLatency( ) method relative to the audio 233 and moving images 234 to acquire the times t1 and t2 taken for each component to become possible to reproduce the stream.

Next, the container 332 obtains the maximum value t0 among these times (t1, t2), and as indicated by arrows 344 and 345, executes the playStream method( ) of each component by using this value as an argument. Since the time t0 is equal to or longer than the time t1 or time t2, it can be considered that the preparation for stream reproduction of the audio 233 and moving images 234 is completed before the lapse of the time t0, so that after the lapse of the time t0, these components can start the reproduction of the streams synchronously (audio reproduction 346 and moving image reproduction 347 are executed synchronously).

Also in the case that there are three or more components on the side being controlled, synchronous reproduction of the streams becomes possible by similar processes.

Reverting to FIG. 16, MStreamContainer 320 does not define the function of the synchronizing mechanism and its realization method. Therefore, it is possible to realize a synchronization control component by using logic other than the above-described logic (shown in FIG. 18). The example of the sequence shown in FIG. 18 is based upon generally the same thinking as the synchronous execution process of JMF (Java(R) Media Framework)(trademark) developed by Sun Microsystems.

Each interface constituting the mmcomponent package has been described above. In the example shown in FIG. 16, the button 311 and moving images 312 are shown as the examples of the components mounting these interfaces. Since the button 311 has its entity on the 3D virtual space, it is mounted with M3DComponent 313, and further in order to allow an interactive manipulation by the remo-con key 91 (FIG. 8), MInteractible 318 is mounted. Further, the moving images 312 are mounted with M3DComponent 313 since the moving images 312 have its entity on the 3D virtual space, and further MStream 319 is mounted since the moving image data having the time axis is reproduced.

Next, with referent to FIG. 19, an example of software of the browser will be described.

The browser 251 is constituted of a loader unit 362, a scene data unit 363, a drawing unit 364, an ECMA script processing unit 365, an event processing unit 366 and a control unit 361.

A component loader 367 in the loader unit 362 loads (inputs) the scene file (archive file) 292 (FIG. 15) of a scene, divides it into a component group 368 managed based upon the above-described ID value and script data 369 corresponding to the script file 303 (FIG. 15), and supplies these to the scene data unit 363. Specifically, the component loader 367 reconfigure the object file constituting the scene from a group of class files 302 contained in the loaded scene file 292 (FIG. 15) and from the instance file 301.

The script data 369 is supplied to a script interpreter 371. The script interpreter 371 is an interpreter for the above-described ECMA script, scans the script data 369, manipulates the component in accordance with the contents of data when the content is executed, or executes a designated function by supplementing an event generated by the component.

As the function of this type, the ECMA script processing unit 365 has an extension function 370, and a corresponding function is supplied to the script interpreter 371 when appropriate. Namely, the extension function 370 is a function group for providing functions such as scene transition, and can call the ECMA script.

A 3D drawing engine 373 in the drawing unit 364 is used for acquiring a corresponding component from the component group 368 and rendering, as a reproduction screen, 3D graphics to be displayed on the display (output unit 187 in FIG. 12) of the reception terminal 113. In this example, although the 3D drawing engine 373 uses a drawing engine of Java(R), the invention is not limited thereto.

An event/focus management unit 372 of the event processing unit 366 is used for distributing an input from the input unit 186 to the component holding the focus. Further, as described above, if the input from the input unit 186 is an input from any one of the upper, lower, right and left keys 91-2 to 91-5 shown in FIG. 8, the focus transition is performed.

The control unit 361 is used for managing the behavior of the main body of the browser 251 such as activation and termination.

Next, with reference to FIG. 20, description will be made on the life cycle management of components by the browser 251. After reading a scene, the browser 251 manages the life cycle of components contained in the scene, the statuses of a component being shown in FIG. 20.

Namely, the status of a component is one of the statuses: a serialized status (hereinafter called a status A), a deserialized status (hereinafter called a status B), an initialized and inactive status (hereinafter called a status C), an active status (hereinafter called a status D) and a discarded status (hereinafter called a status E).

Next, with reference to FIG. 20 and a flow chart of FIG. 21, a scene activation process by the browser 251 will be described.

Figure 20:
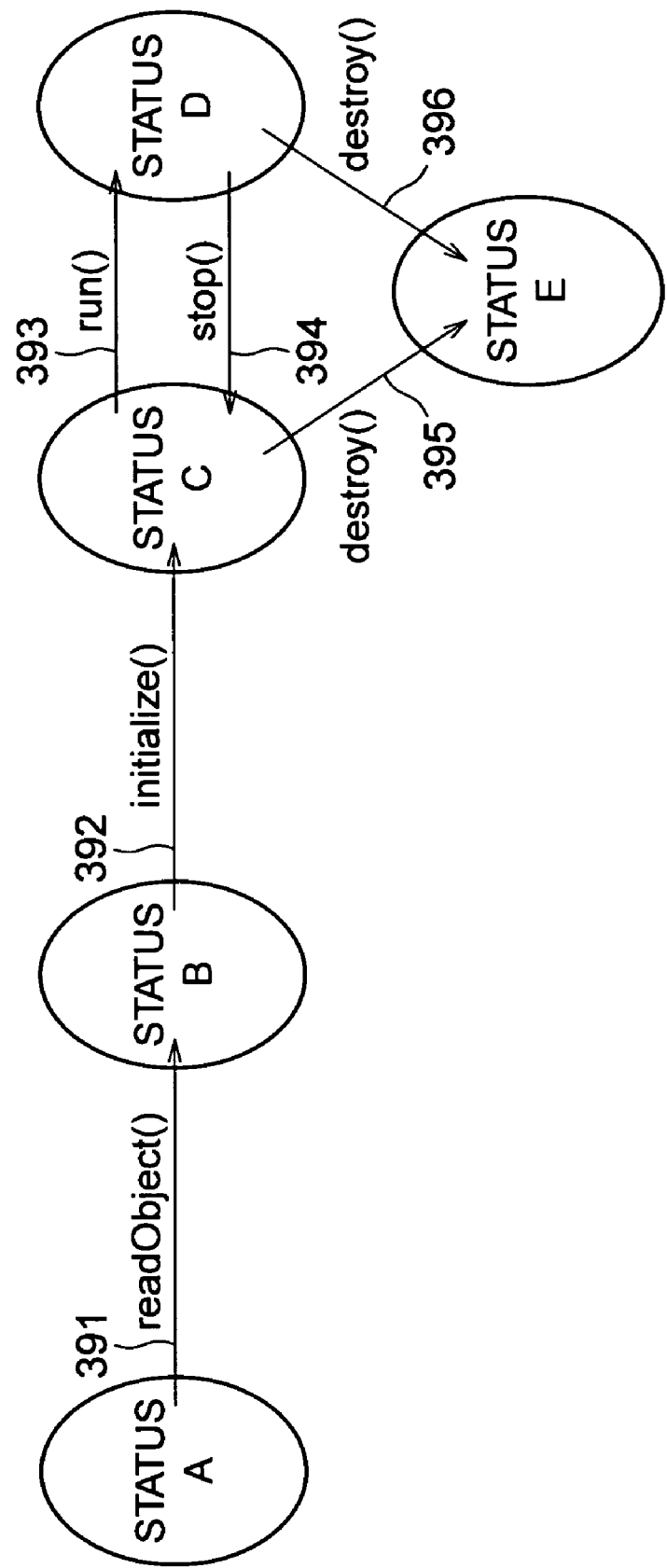
FIG. 20 is a status transition diagram illustrating the life cycle of a component of the browser shown in FIG. 13.
Figure 21:
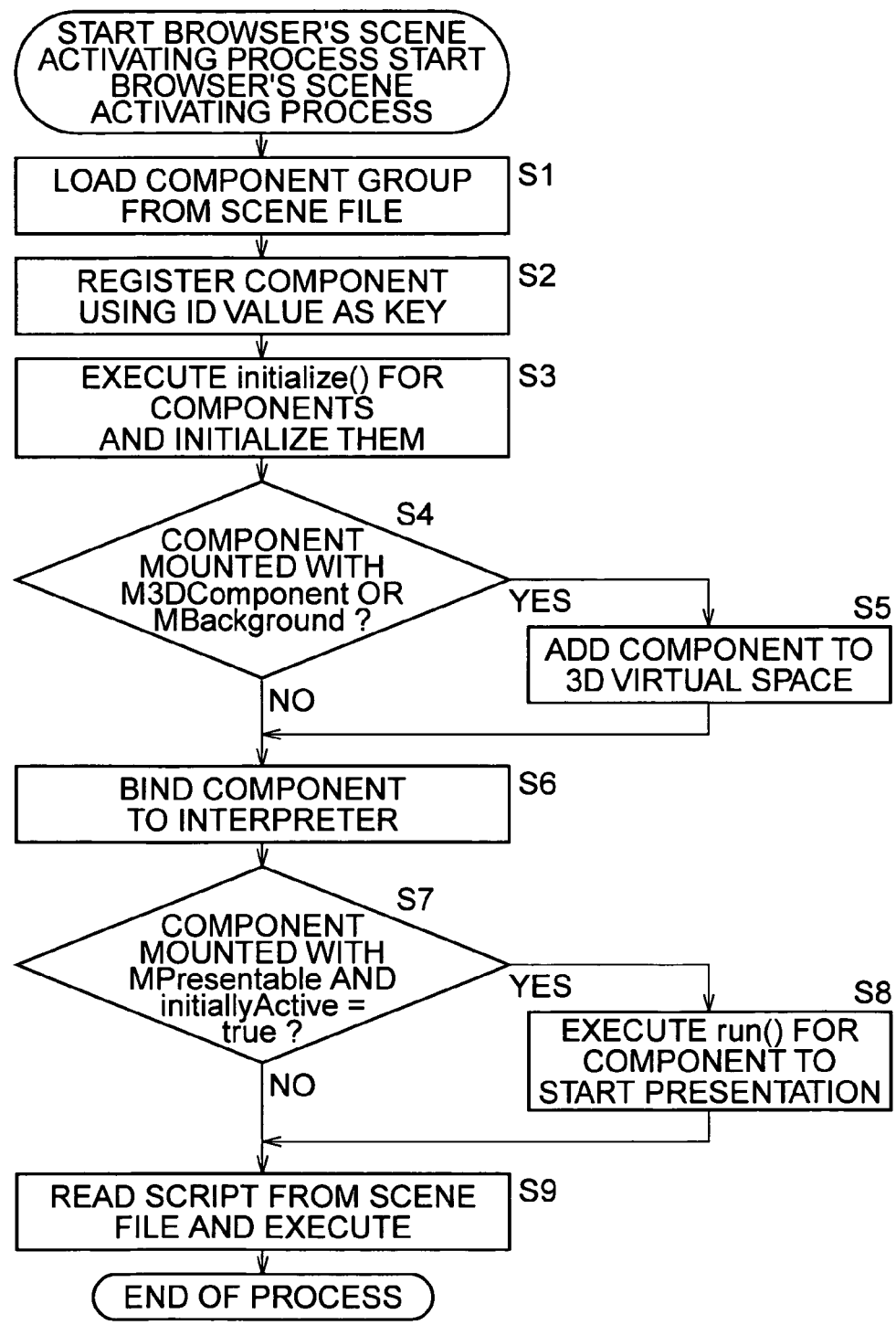
FIG. 21 is a flow chart illustrating a scene activating process by the browser shown in FIG. 13.

When a designated scene is activated, at Step S1 shown in FIG. 21, the browser 251 deserializes (loads) a component (component in the status A shown in FIG. 20) group serialized in the instance file 301 of the scene file 292 (FIG. 15).

Namely, as indicated by an arrow 391 in FIG. 20, a readObject( ) method is executed so that the component transits from the status A to the status B.

At Step S2 in FIG. 21, the browser 251 registers therein the component loaded by the process at Step S1 by using the ID value as a key, and at Step S3 executes the initialize( ) method of the component to initialize the component. In this manner, as indicated by an arrow 392 shown in FIG. 20 the component transits from the status B to the status C.

At Step S4 in FIG. 21, the browser 251 judges whether the component initialized by the process at Step S3 is mounted with M3DComponent 313 (FIG. 16) or MBackground 314 (FIG. 16), and if it is judged that it is mounted, then at Step S5 adds the component to the 3D virtual space to advance to Step S6.

In contrast, if the browser 251 judges at Step S4 that the component is not mounted with M3DComponent 313 or MBackground 314, the process at Step S5 is not executed to advance to Step S6.

At Step S6, the browser 251 binds the component to the script interpreter 371 (FIG. 19) (reference to the component is passed to the script interpreter 371) in order that the ECMA script can manipulate the component and an event generated by the component is notified to the ECMA script.

After the component is bound to the script interpreter 371, it becomes possible that script code executes a method of the component and that when the component issues an event, script code designated in advance in accordance with the type of the code is executed (the process of this kind is hereinafter called activation of an event handler).

At Step S7, the browser 251 judges whether the component is mounted with MPresentable 316 (FIG. 16) and whether the initialyActive( ) method returns true (initialyActiv=true).

If the browser 251 judges at Step S7 that the component is mounted with MPresentable 316 (FIG. 16) and that the initialyActive( ) method returned true (initialyActive=true), then at Step S8 the run( ) method is executed for the component to start presentation.

In this manner, as indicated by an arrow 393 the component transits from the status C to the status D. Namely, the component is set active.

During reproduction of the content, if the stop( ) method is called from the script interpreter 371 (FIG. 19) as indicated by an arrow 394, the component transits from the status D (active status) to the status C (inactive status). As indicated by an arrow 393, if the run( ) method is called thereafter from the script interpreter 371, the component transits again from the status C to the status D.

Namely, during reproduction of the content, the component is switched between the statuses C and D when appropriate.

Reverting to FIG. 21, after executing the process at Step S8, the browser 251 advances to Step S9.

In contrast, if the browser 251 judges at Step S7 that the component is not mounted with MPresentable 316 (FIG. 16) or that it is not initialyActiv=true, then the process at Step S8 is not executed to advance to Step S9.

At Step S9, the browser 251 reads the script file 303 from the scene file 292, analyzes and executes it.

Next, with reference to FIG. 20 and a flow chart of FIG. 22, a scene ending process by the browser 251 will be described.

Figure 22:
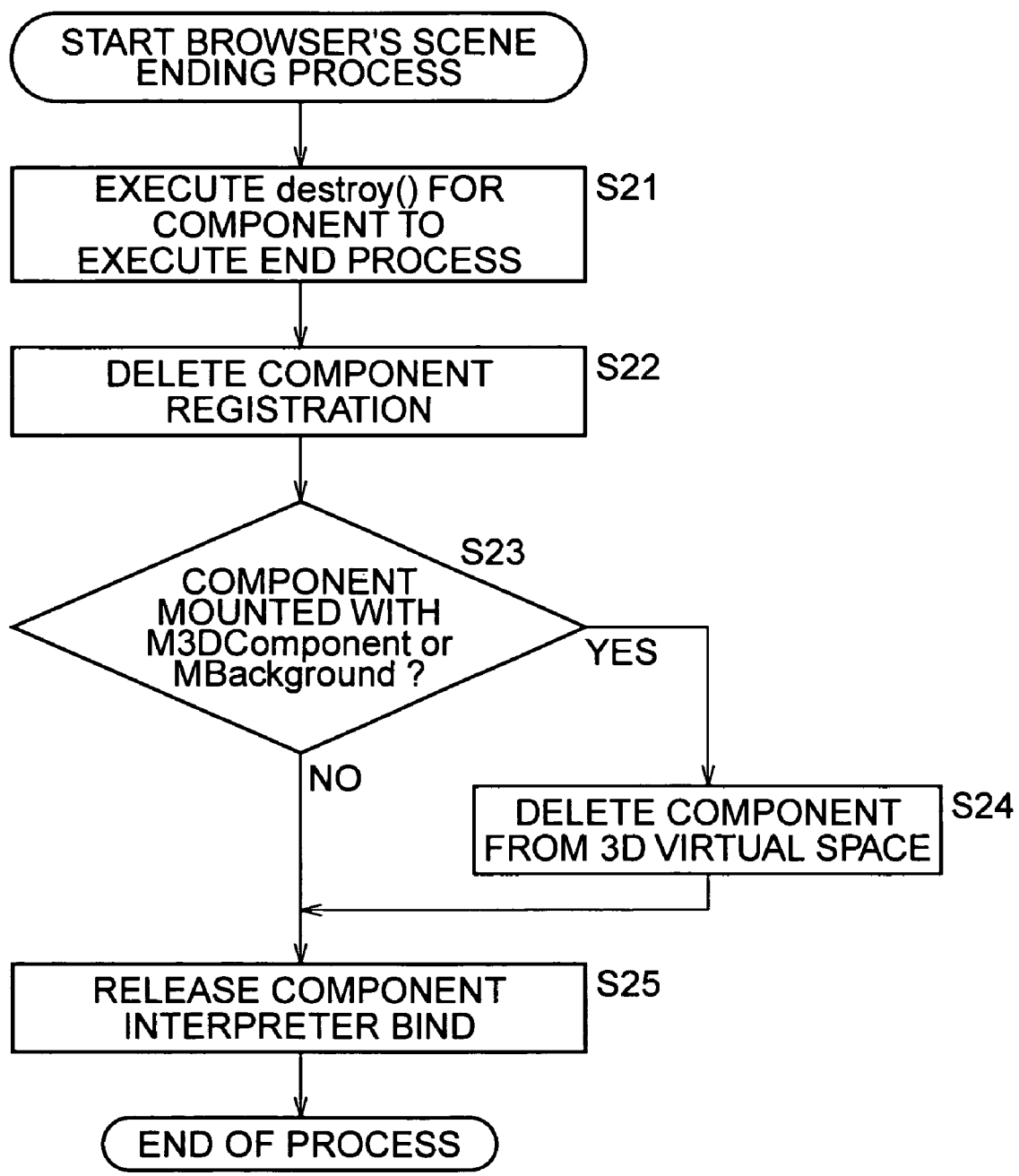
FIG. 22 is a flow chart illustrating a scene ending process by the browser shown in FIG. 13.

When the content is completed, at Step S21 in FIG. 22, the browser 251 executes the ending process by executing the destroy( ) method relative to each component.

In this manner, as indicated by arrows 395 and 396 in FIG. 20, the component transits from the status C or D to the status E.

At Step S22, the browser 251 deletes the registration of the component.

At Step S23, the browser 251 judges whether the component is mounted with M3DComponent 313 (FIG. 16) or MBackground 314 (FIG. 16), and if it is judged that the component is mounted with M3DComponent 313 or MBackground 314 (if the component is displayed in the 3D space), then at Step S24, deletes the components from the 3D virtual space to advance to Step S25.

In contrast, if the browser 251 judges at Step S23 that the component is mounted with neither M3DComponent 313 nor MBackground 314 (the component is not displayed in the 3D virtual space), then the process at Step S24 is not executed to advance to Step S25.

At Step S25, the browser 251 releases the interpreter bind of the component with the script interpreter 371.

Next, with reference to FIG. 23, description will be made on an example of a process of event distribution and focus management by the browser 251.

Figure 19:
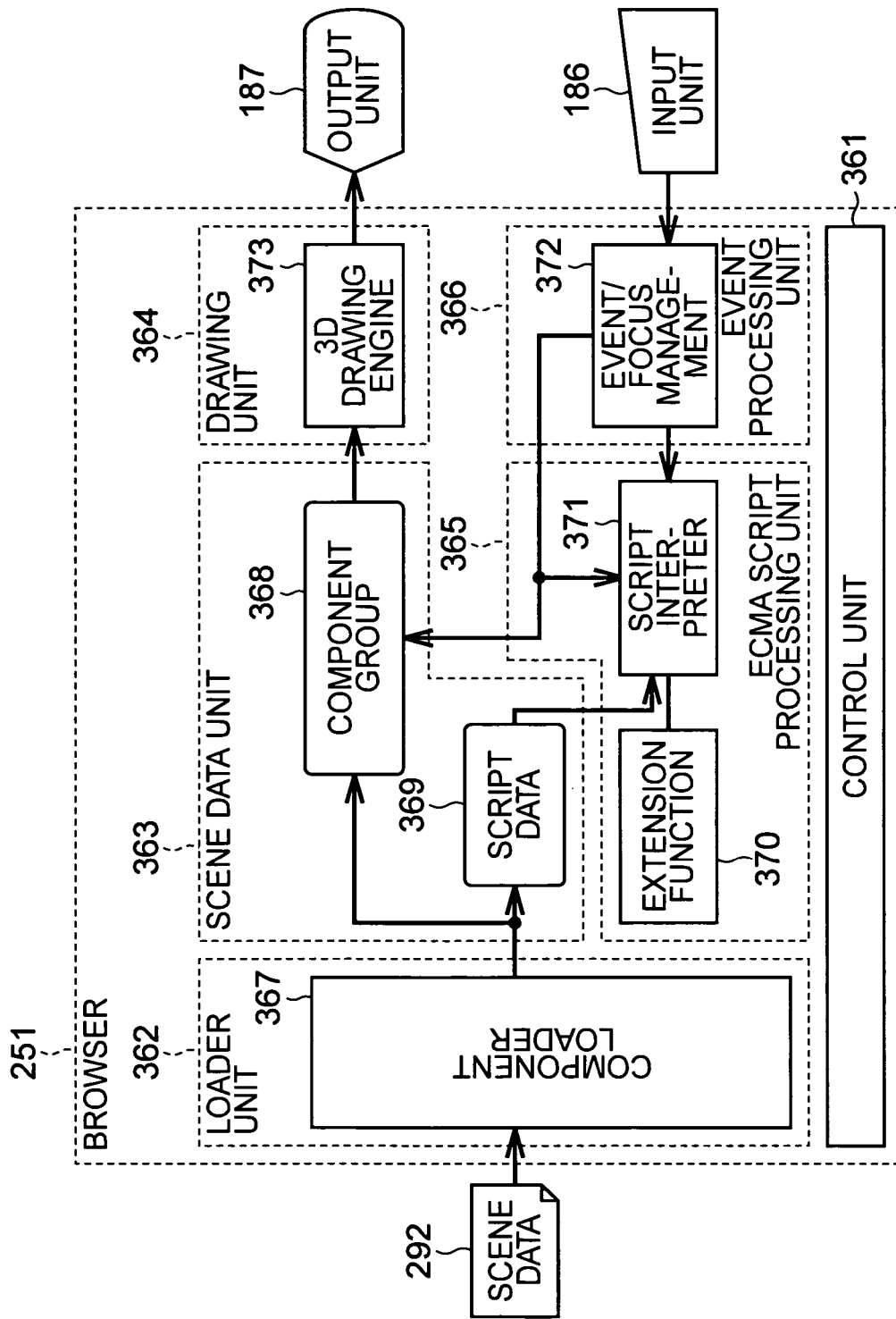
FIG. 19 is a block diagram showing an example of the structure of the browser shown in FIG. 13.
Figure 23:
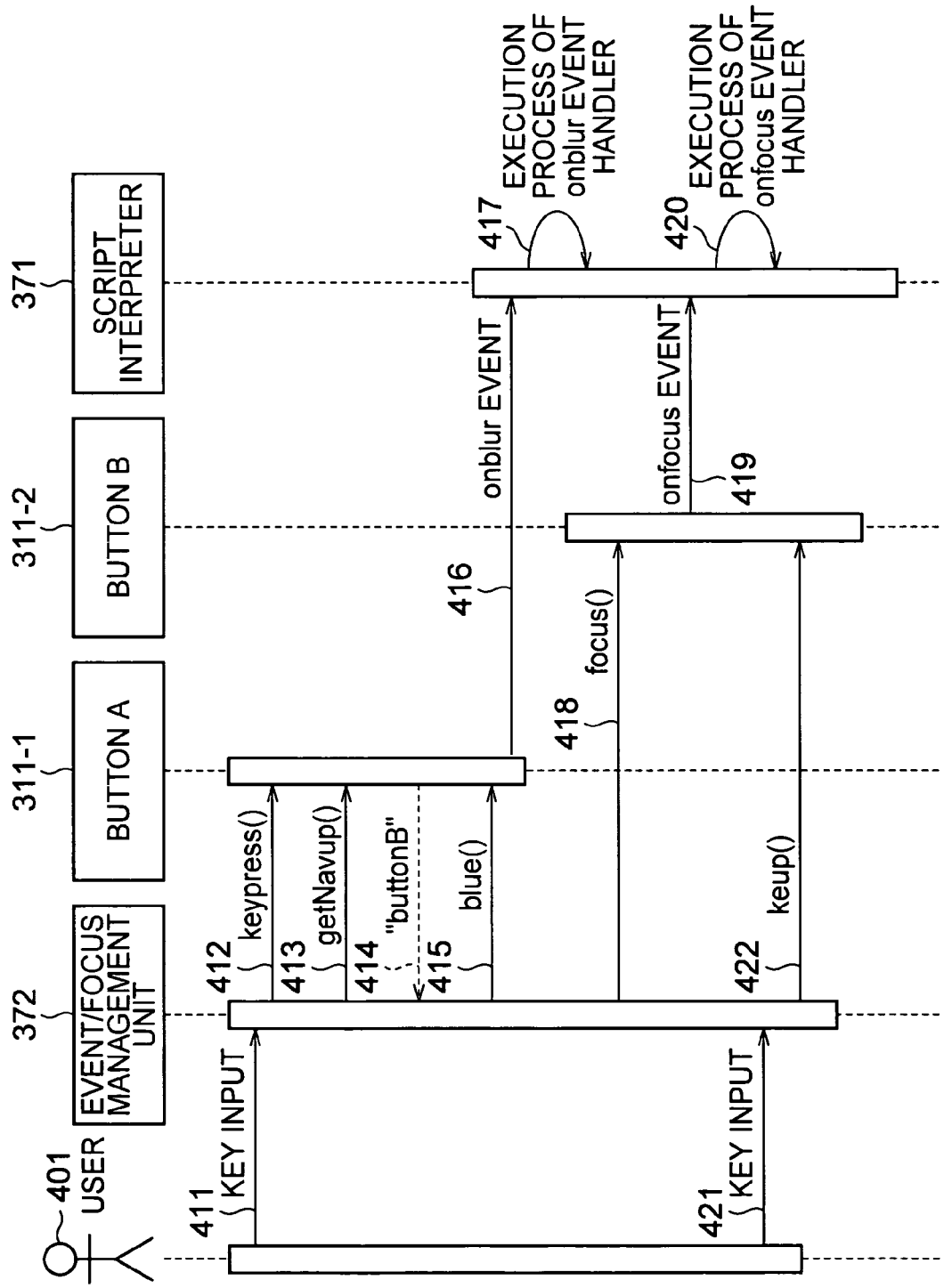
FIG. 23 is a diagram illustrating the sequence of an event distribution mechanism of the browser shown in FIG. 13.

FIG. 23 shows a message exchange sequence among the event/focus management unit 372 (FIG. 19), two components (corresponding to two buttons 311-1 and 311-2 in FIG. 17) mounted with MInteractible 318 (FIG. 16), and the script interpreter 371 (FIG. 19).

As indicated by an arrow 411 in FIG. 23, when a user 401 depresses any key 91 (FIG. 8), the event/focus management unit 372 notifies this effect by executing the keypress( ) method relative to the component (in this example, the button 311-1) presently having the focus, as indicated by an arrow 412.

Next, if the input key is one of the arrow keys 91-2 to 92-5, transition of the focus is conducted.

It is now assumed that the user 401 depresses the upper arrow key 91-2. First, as indicated by an arrow 413, the event/focus management unit 372 executes the getNavup( ) method relative to the button 311-1, and acquires from its return value an ID of the component at a focus transition destination (in this example, the ID value is "button B").

Next, as indicated by an arrow 415, the event/focus management unit 372 executes the blur( ) relative to the button 311-1 to notify a loss of the focus.

The button 311-1 issues an event (onbluer event) because of the focus loss. As indicated by an arrow 416, the script interpreter 372 acquires this onbluer event, and as indicated by an arrow 417, analyzes and executes the character string returned by the getOnblur( ) from the button 311-1 as the script (executes the event handler).

Next, as indicated at an arrow 418, the event/focus management unit 372 notifies this effect by executing the focus( ) method relative to the component button 311-2 at the focus transition destination.

The button 311-2 issues an event in response to the acquisition of the focus. As indicated by an arrow 419, the script interpreter 371 acquires this in focus event, and as indicated by an arrow 420, analyzes and executes the character string returned by the getOnfocus( ) from the button 311-2 as the script (executes the event handler).

As indicated by an arrow 421, as the user 401 detaches thereafter the finger from the depressed key (executes the key input), the event/focus management unit 372 notifies this effect by executing the keyup( ) method relative to the component button 311-2, as indicated by an arrow 422.

Next, description will be made on the application manager applied to which is a preferred embodiment of the present invention.

As shown in FIG. 13, the application manager 271 (FIG. 14) is software for downloading the multimedia content 252 and browser 251 (distribution software 243) from the network in accordance with an URL input (arrow 241) from a user, and executing it, the control being passed to the browser 251 side after it is activated.

With reference to a flow chart in FIG. 24, description will be made on an example of the process by the application manager.

As shown in FIG. 13, when a user supplies the reception terminal 113 with an URL of a certain content (startup scene), at Step S41 the application manager 271 inputs URL of the start scene.

If the network 112 is the Internet and the HTTP protocol is used on the Internet, the URL is written, for example, as in the following.

URL "jar:http://w.w.w. sony.co.jp/.../startup.jar!/startup.dat"

This URL indicates the instance file (startup.dat) 301 in the scene file (archive file (startup.jar) 292 (FIG. 15)) at the designated URL.

Figure 24:
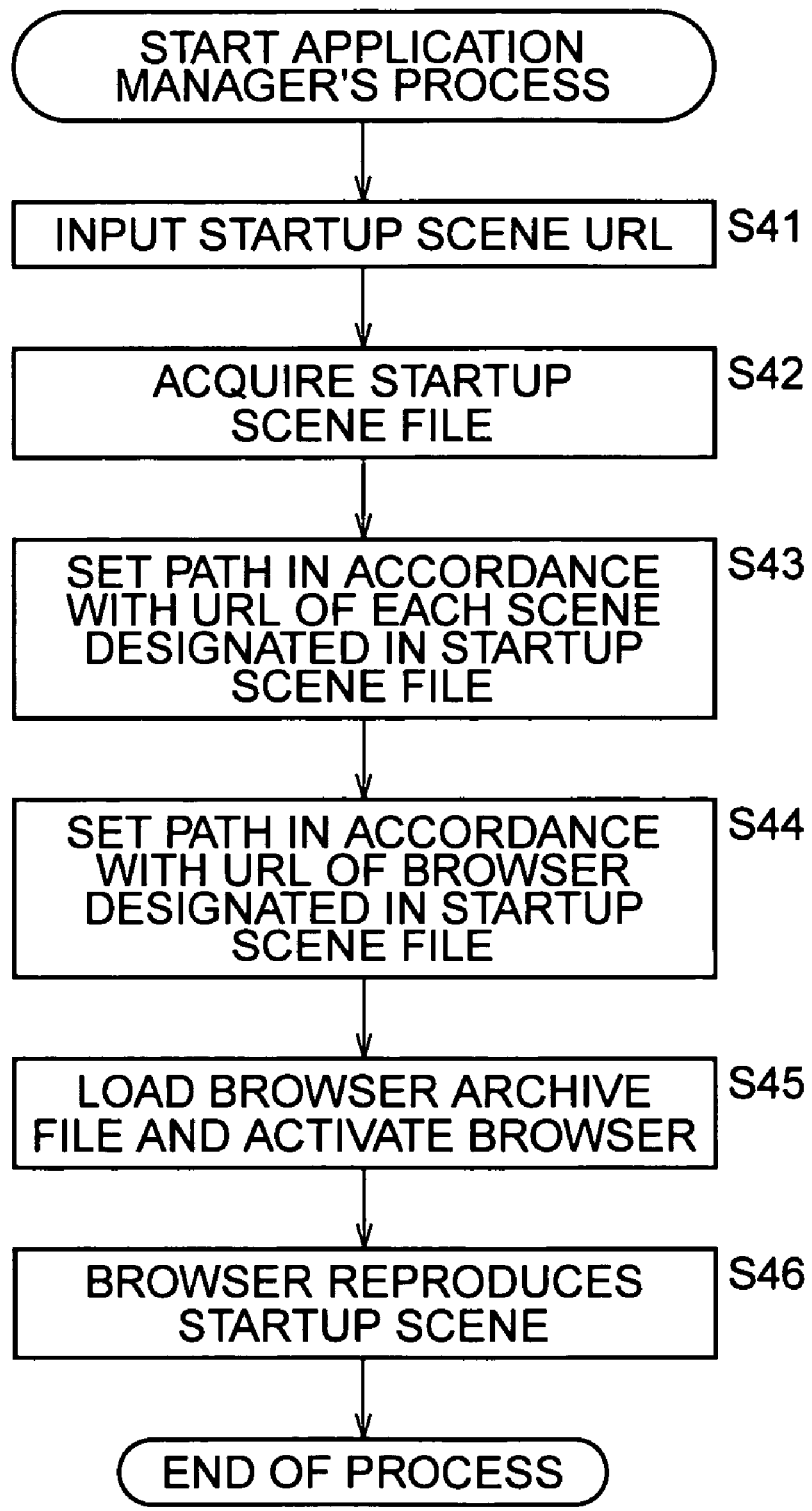
FIG. 24 is a flow chart illustrating a process by an application manager shown in FIG. 14.

Reverting to FIG. 24, at Step S42 the application manager 271 acquires (downloads) the startup scene file 292 at the URL input by the process at Step S41.

At Step S43 the application manager 271 sets paths in accordance with a URL of each scene other than the startup scene designated in the startup scene file 292 in order to allow the class file to be loaded at each URL.

As Step S44, the application manager 271 sets a path in accordance with a URL of the browser 251 designated in the startup scene file 292 in order to allow the browser to be acquired.

At Step S45 the application manager 271 loads (acquires) the archive file 291 of the browser 251 and activates the browser 251.

Thereafter, the application manager 271 passes its process to the browser 251 which in turn reproduces the startup scene at Step S46.

Next, with reference to FIG. 25, description will be made on an authoring system 441 applied to which is a preferred embodiment of the present invention.

The authoring system 441 is fundamentally software to be installed in the multimedia content producing apparatus 123 as described earlier (as shown in FIG. 9).

Figure 25:
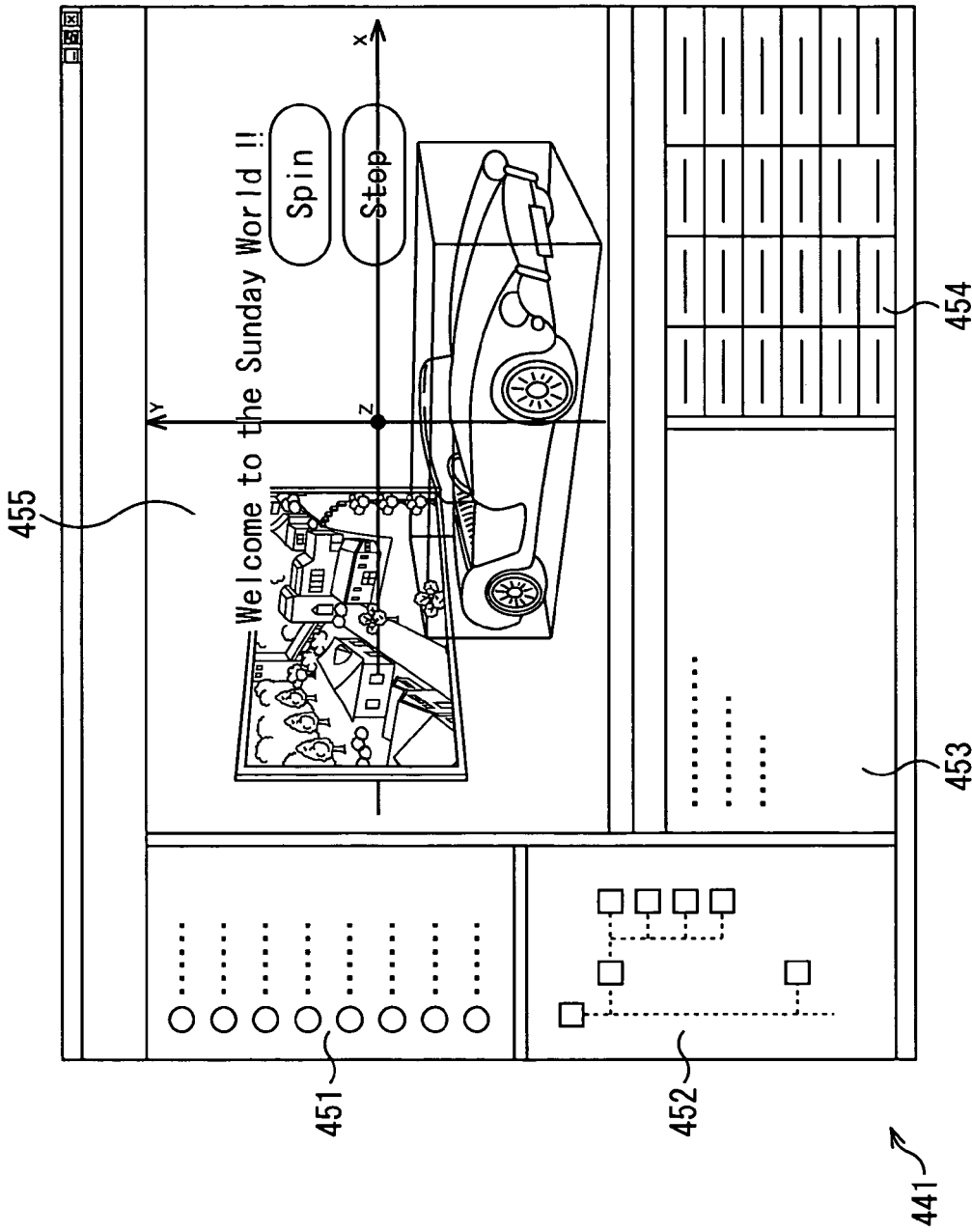
FIG. 25 is a diagram showing a display example when an authoring system is activated.

As shown in FIG. 25, the authoring system 441 has a window-based user friendly GUI. The authoring system 441 is not limited particularly if the above-described multimedia content can be produced. In this example, it is assumed that the authoring system has the following functions (41) to (45).

(41) A producing function of newly producing a multimedia content, a storing function of storing an edited multimedia content and an execution function of executing a multimedia content.

Conceivable as the storing function is a function of storing a multimedia content in an executable state or a function of storing a multimedia content in an internal form specific to the authoring system 441.

(42) A content presenting function of reading a component developed basing upon the architecture according to the preferred embodiment of the present invention and presenting it to a user.

(43) A user interface environment function of providing a visual user interface environment to add an arbitrary component to a multimedia content and customizing the component group.

(44) An information presenting function of visually presenting screen configuration information of a multimedia content and information of a component group contained in the multimedia content.

(45) A script edit supporting function of supporting edition of the ECMA script.

As shown in FIG. 25, the authoring system 441 displays the following items (51) to (54) on the display.

(51) Component List 451

Java(R) Beans can perform distribution in the Jar archive form. The component list 451 loads components provided in this form and displays them in a list form. This component group is disposed in a particular directory of the authoring system 441. The component list 451 adds the component selected by a user from the list to the content under production.

(52) Content Tree 452

The content tree 452 displays the data structure of a multimedia content in a tree form. If the data structure of the multimedia content is changed (if a scene is added or deleted or a component is added or deleted), the content tree 452 reflects this change upon the tree. When a user selects a node of the tree, the content tree 452 sets the corresponding scene or component to a select state.

(53) Property Table 454

The property table 454 displays customization information of selected components in a table form. This allows the value of an attribute selected in the table to be edited. When the attribute value of a component is changed by another process, the property table 454 reflects this change upon the table.

(54) Layout Panel 455

The layout panel 455 provides a 3D virtual space corresponding to the selected scene. When a component is added to the scene, the layout panel 455 displays it. When the data structure of a scene is changed (when a scene is added or deleted or a component is added or deleted), the layout panel 455 reflects it. In this manner, a content producer can immediately confirm the state of an editing content. The layout panel 455 can also set the position and posture of a component with a mouse.

(55) Script Editor 453

The script editor 453 is used for inputting and editing code of the ECMA script of a selected scene.

(56) Others

The authoring system 441 is provided with other components such as a menu and a tool bar.

The authoring system 441 may be a content producing environment having no graphical environment such as shown in FIG. 25.

As described earlier, a multimedia content produced by the authoring system 441 of this type is supplied to the server 124 as shown in FIG. 9, and as shown in FIG. 13, distributed from the server 124 to the reception terminal 113 via the network 112, along with the above-described browser 251 as one piece of the distribution software 243. As described above, the process of combining the multimedia content and browser 251 to obtain the distribution software 243 may be executed by the multimedia content producing apparatus 123 (FIG. 9) mounted with the authoring system 441 or by the server 124.

Figure 26:
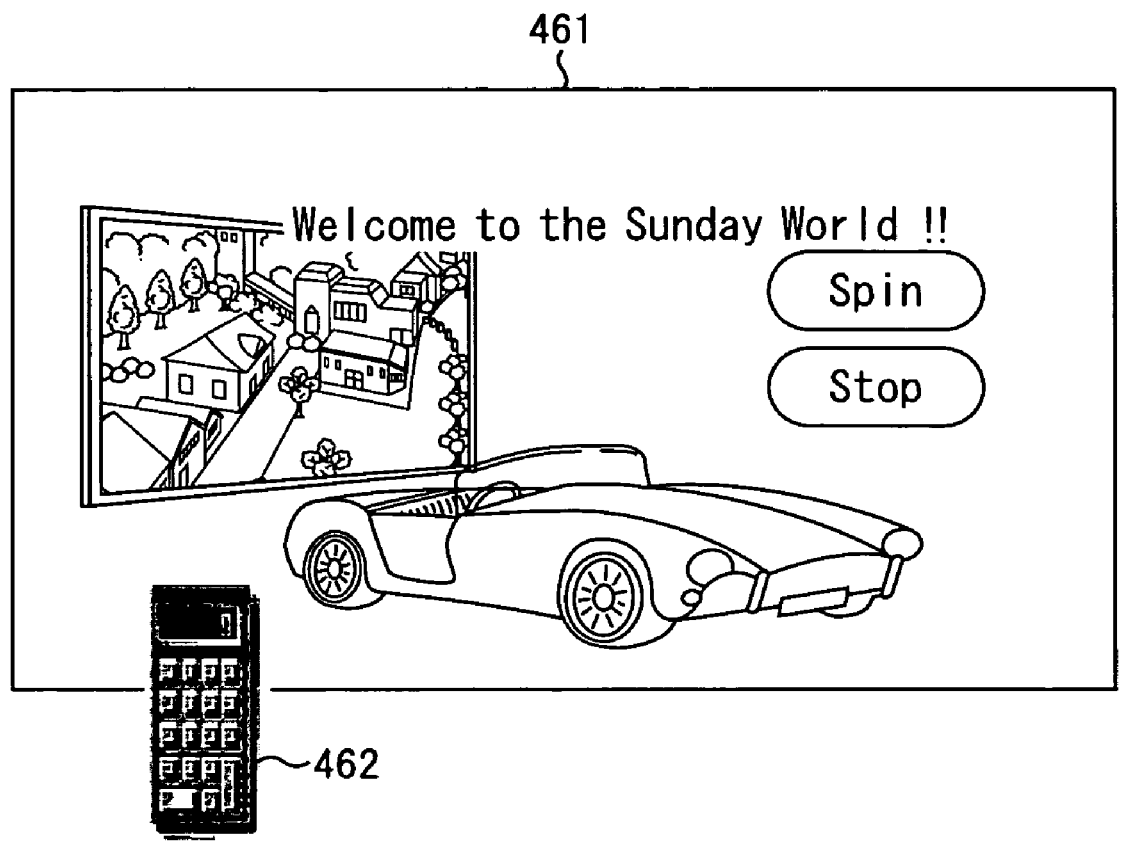
FIG. 26 is a diagram showing an example of the reproduction of a multimedia content produced by the authoring system shown in FIG. 25.

The reception terminal 113 displays (acquires the state of the content reproduction 244) the multimedia content 252 contained in the distribution software 243 on the display or the like by using the browser 251 contained in the distribution software 243. At this time, an image 461 such as shown in FIG. 26 is displayed on the browser on the display.

As above, the authoring system 441 can provide an efficient development environment to a content producer (a user of the multimedia content producing apparatus 123 (FIG. 9)) and can be used in a straightforward manner even by a content producer having no sophisticated knowledge of software. Therefore, content producers, particularly of the occupation type such as designers and creators, can produce the content of high quality in a straightforward manner by using the authoring system 441.

However, a high cost is generally imposed on developing the system of the authoring system 441 so that it is difficult for users (content producers) to have it at a reduced price.

In order to prevail the technologies applied to which are the above-described preferred embodiments, it is supposed that a multimedia content aiming at evaluation or research is required to be produced.

It is therefore necessary to supply users (content producers) with the environment capable of producing a multimedia content readily or at a reduced cost without acquiring the system such as the authoring system 441.

According to a preferred embodiment of the present invention, conversion software is prepared which can be used as an alternative of the authoring system 441. The conversion software converts the format of a multimedia content written in the format using techniques of representing a data structure by a text (hereinafter called text data structure expression techniques), into the format (format such as shown in FIG. 15 described above) used when the above-described server 124 (FIGS. 9 and 13) distributes a multimedia content.

The type of the text data structure expression techniques is not limited particularly, but techniques originally developed by the developer of the above-described conversion software may be used or methods in conformity with open standards such as XML (Extensible Markup Language) may be used.

In this case, if the conversion software developer develops the conversion software adopting the text data structure expression techniques originally developed by the developer, for the format of a multimedia content (multimedia content before conversion) whose format is to be converted, then the development cost can be suppressed.

If the development cost is desired to be further reduced, this reduction becomes possible if the conversion software developer develops the conversion software adopting the text data structure expression techniques in conformity with the open standards, for the format of multimedia content whose format is to be converted.

A user (content producer) can therefore acquire the conversion software of this type in a straightforward manner and can produce a multimedia content of the same format at that produced by the authoring system 441 by using the conversion system, even if the above-described authoring system 441 is not acquired.

The conversion software of this type is therefore software for converting the format of a multimedia content (multimedia content (data) written in the XML format is called XML data) written in the text format using XML (hereinafter called an XML format), into the format shown in FIG. 15 described above.

XML is a general data descriptive language using a text and standardized by the above-described W3C. Similar to HTML, XML expresses the data structure through markup.

The following five points can be enumerated as the advantages of adopting XML for the text data structure expression techniques.

Namely, the first point is that XML has a very high propagation degree as compared with other general text data structure expression techniques. The second point is that the XML standards are open and easy to use. The third point is that the XML grammar is simple and easy to understand. The forth point is that there are a number of libraries for processing data expressed by XML. The fifth point is that there is a large amount of application software (a dedicated editor or the like) for supporting to generate data using XML which can be acquired free of charge or at a relatively reduced price.

Figure 27:
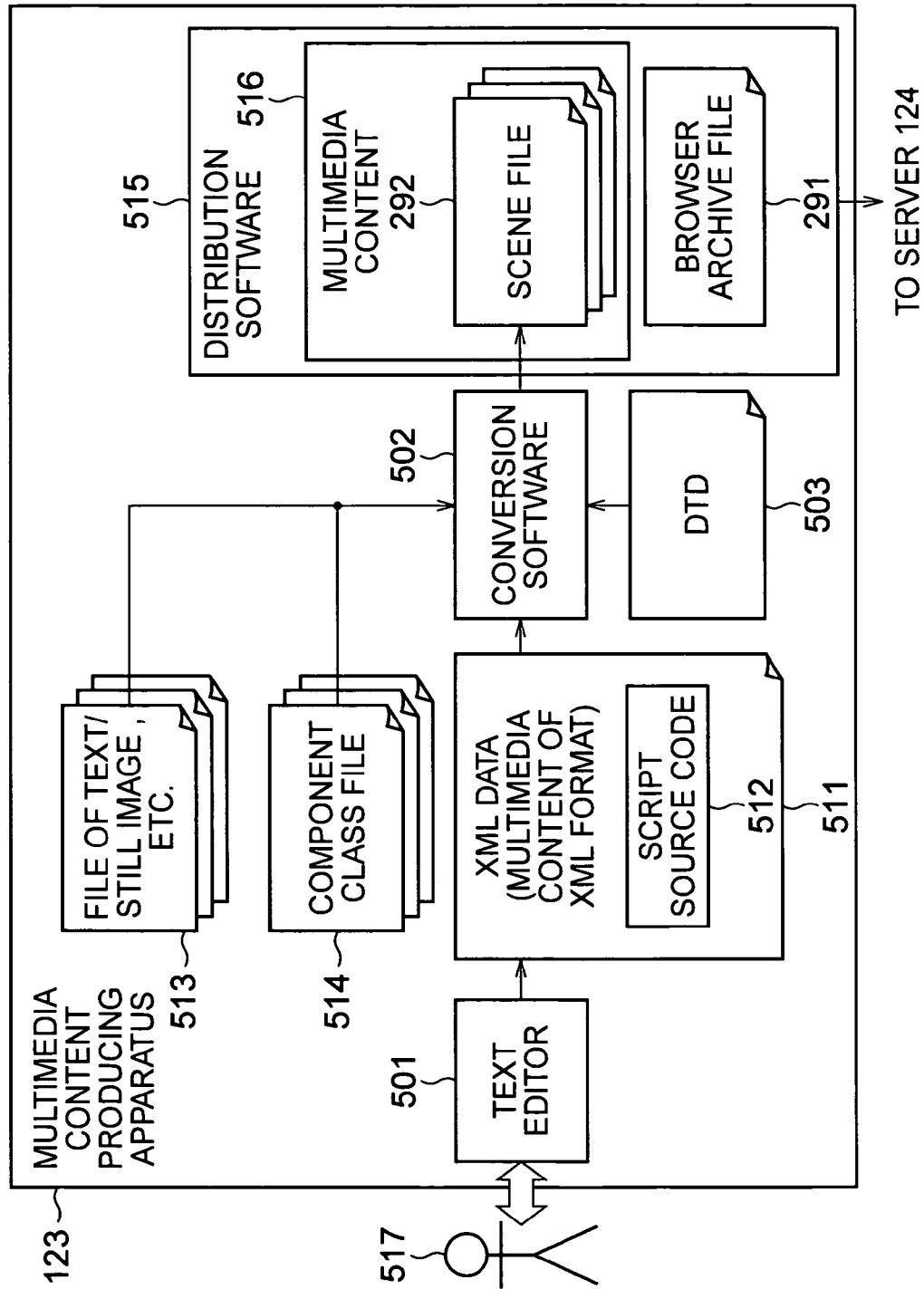
FIG. 27 is a diagram showing an example of the arrangement of software of the multimedia content producing apparatus shown in FIG. 9 mounted with conversion software.

FIG. 27 shows an example of the structure of software of the multimedia content producing apparatus 123 mounted with the conversion software applied to which is a preferred embodiment of the present invention.

As shown in FIG. 27, the multimedia content producing apparatus 123 is provided with a text editor 501, a conversion software 502 and a DTD (Document Type Definition) 503.

The text editor 501 is application software used when a content producer 517 writes a multimedia content in the XML format. Namely, the text editor 501 generates XML data (multimedia content in the XML format) 511. In this case, in the example shown in FIG. 27, source code 512 of the ECMA script of each scene is also written as part of the XML data 511. The source code 512 of the script may be output as another file different from the XML data 511.

The text editor 501 is not limited particularly if the XML data 511 can be generated. For example, as the text editor 501, a general XML editor may be used such as iPAD (ai pad) (trademark) and Athens Editer (trademark) acquirable at a relatively reduced price.

The conversion software 502 is software for converting the XML data 511, a file 513 such as text/still images and the like and a class file 514 of components, into a multimedia content 516 (multimedia content 516 constituted of a plurality of scene files 292 similar to those shown in FIG. 15) of the format used when the above-described server 124 (FIGS. 9 and 13) distributes the multimedia content.

The file 513 of text/still images and the like corresponds to the file 304 of text/still images and the like shown in FIG. 15, and in the example shown in FIG. 27, is supplied in advance from the mono-media producing apparatus 121 (FIG. 9) to the multimedia content producing apparatus 123 to be assembled with the XML data 511.

The class file 514 of components corresponds to the class file 302 of component shown in FIG. 15, and in the example shown in FIG. 27, is supplied in advance from the mono-media producing apparatus 122 (FIG. 9) to the multimedia content producing apparatus 123 as the class file of components to be contained in the XML data 511.

In the example shown in FIG. 27, the conversion software 502 also executes the process of combining the multimedia content 516 and the archive file 291 of the above-described browser to acquire the distribution software and supplying it to the server 124.

However, as described above, the execution site for this process is not limited particularly, but it may be executed by software (not shown) different from the conversion software 502 or by the server 124 (FIG. 9) instead of the multimedia content producing apparatus 123.

DTD 503 is data representative of the definitions of the type and occurrence rules of tags appearing in the data (in this example, the XML data 511) written in the XML format. The details of DTD 503 and the tag will be later described.

Next, with reference to a flow chart shown in FIG. 28, the process by the conversion software 502 shown in FIG. 27 will be described.

In this example, the XML data 511 is assumed to be, for example, the following multimedia content in the XML format.

Figure 29:
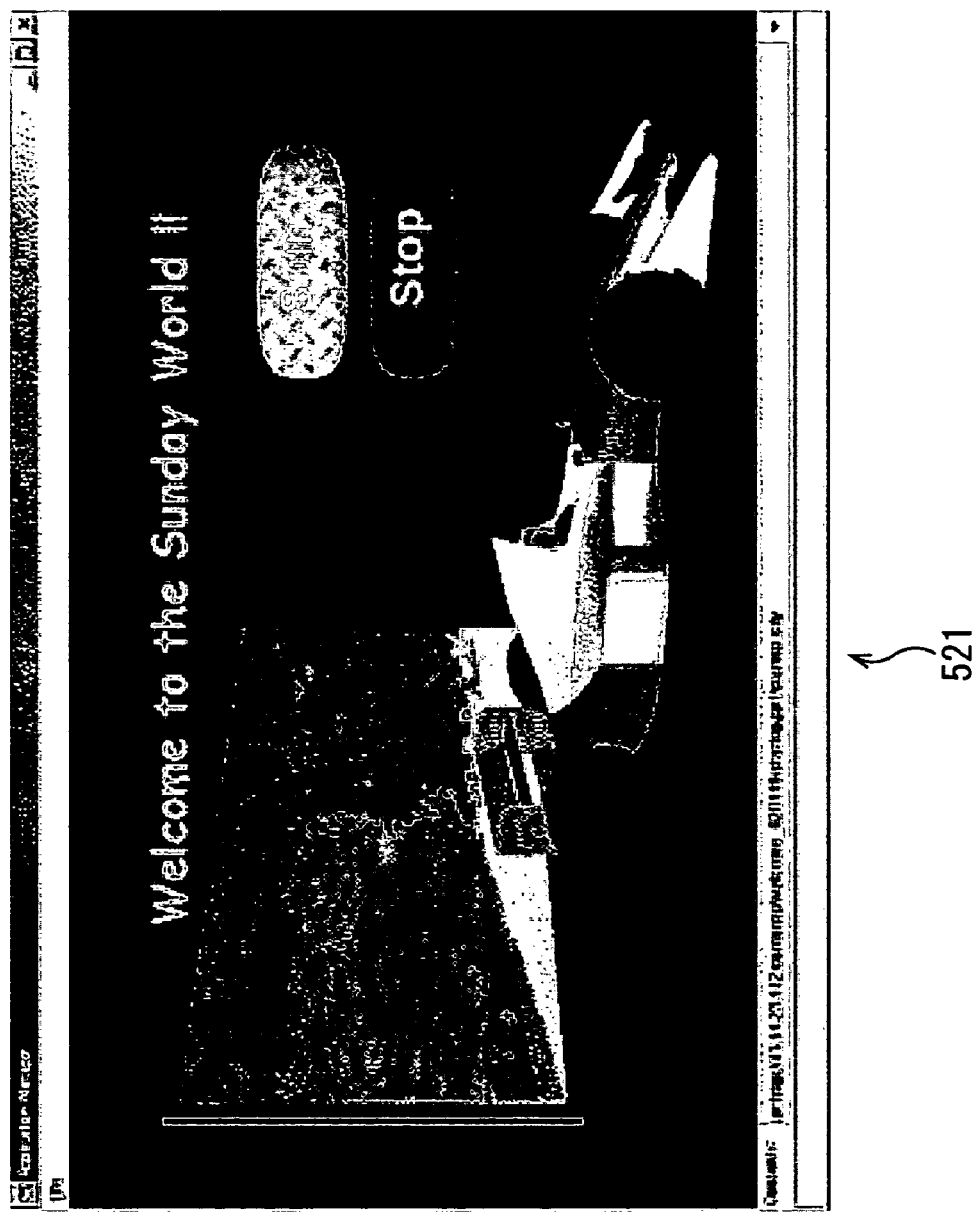
FIG. 29 is a diagram showing an example that a multimedia content whose format was converted by the conversion software shown in FIG. 27 is distributed to a reception apparatus shown in FIG. 9 and reproduced.

Specifically, the XML data 511 of this example is converted into the multimedia content 516 by Steps S61 to S71 of the conversion software 502 to be later described, and supplied to the server 124 (FIG. 9) as the distribution software 515 along with the archive file 291 of the browser, and the server 124 distributes the distribution software 515 to the reception terminal 113 (FIG. 9) via the network 112 (FIG. 9). In this case, the reception terminal 113 reproduces the distributed multimedia content 516 by using the browser corresponding to the distributed archive file 291 of the browser to display an image 521 such as shown in FIG. 29 on the display (the output unit 187 of FIG. 12) of the reception terminal 113.

Specifically, the XML data 511 (XML data 511 for displaying the image 521 of FIG. 29) of this example is written as shown in FIGS. 30 to 61.

In the XML data 511 (XML data 511 constituted of portions 511-1 to 511-32) shown in FIGS. 30 to 61, a portion surrounded by "<" and ">" such as "<component>" and "<scene>" is called a tag similar to HTML. A portion surrounded by a pair of tags (e.g., "<component>" and </component>" is called an element.

For example, the portion 511-1 of the XML data shown in FIG. 30 expresses the following.

Namely, the XML data 511 is the multimedia content having the name "welcome" as indicated in a portion a, and contains a scene having the name "startup" as indicated in a portion b. As indicated in a portion c, the scene "startup" contains a component having an SSpotLight class as its entity. As indicated in portions d and e, the value of an "id" attribute of this component is a character string "sSpotLight1". The description of the other portions of the portion 511-1 and the portions 511-2 to 511-32 is omitted because of redundancy.

Figure 28:
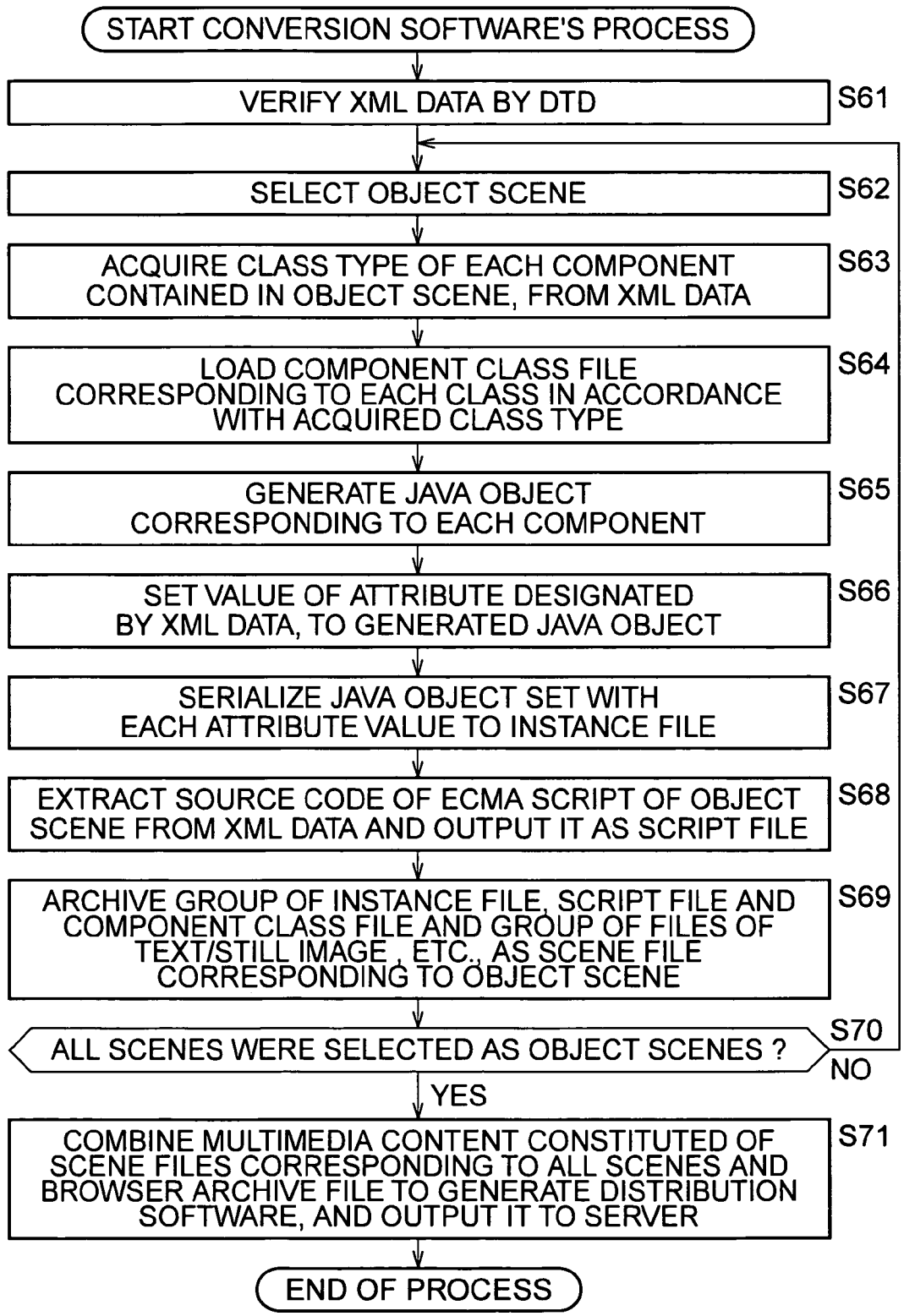
FIG. 28 is a flow chart illustrating a process by the conversion software shown in FIG. 27.

Reverting to FIG. 28, first at Step S61 the conversion software 502 shown in FIG. 27 verifies the XML data 511 by using DTD 503.

Namely, it is necessary to define the type and occurrence rules of tags appearing in the data written with the XML format (in this case, the above-described XML data 511) for each of its data structure. Although several types of the definition methods have been proposed, the above-described DTD is the most widely used one.

In this example, DTD 503 is stored in advance in the multimedia content producing apparatus 123 (the storage unit 148 or the like shown in FIG. 10), and the conversion software 502 checks whether the XML data 511 actually produced is in conformity with the rules, by referring to DTD 503. This process is herein called verification.

In this example, for example, DTD 503 is written like a portion 503-1 in FIG. 62 and a portion 503-2 in FIG. 63.

On DTD 503 shown in FIG. 62 and FIG. 63, "*" indicates "repetition". For example, a portion A <!ELEMENT scene (script, component*)> shown in FIG. 62 indicates that in the element "scene", an element "script" appears once and then the element "component" appears an arbitrary number of times.

"#REQUIRED" indicates "required" and "ID" indicates a value "ID" the attribute can have (identifier (unique value)), respectively. For example, a portion B<!ATTLIST scene name ID #REQUIRED> shown in FIG. 62 indicates that the element "scene" has an attribute "name" and that its value (ID) is always required to be designated and is required to be unique in the XML data 511. Namely, it indicates that the existence of a plurality of scenes (element "scene") having the same name (value (ID) of the attribute "name").

A portion A <!--scene constituting content--> shown in FIG. 62 indicates a comment for <!ELEMENT scene (script, component*)>, and a portion B <!--name of scene (required)--> shown in FIG. 62 indicates a comment for <!ATTLIST scene name ID #REQUIRED>.

Similarly, the other portions of DTD 503 (each tag in the portions 503-1 excepting the portions A and B in FIG. 62 and each tag in the portion 503-2 in FIG. 63) write the comments (corresponding to the portions <!-- -->) for respective portions (tags). Although the description of the other portions is omitted because of redundancy, the meaning of each tag can be presumed easily from the comment corresponding to each portion (tag).

After the XML data 511 is verified by using DTD 503 in the above manner in the process at Step S61 shown in FIG. 28, a process at Step S62 is executed.

Namely, since the XML data (multimedia content of the XML format) 511 is constituted of a plurality of scenes, at Step S62 the conversion software 502 selects a scene to be processed (hereinafter called an object scene) from the plurality of scenes.

At Step S63 the conversion software 502 acquires the class type of each component contained in the object scene from the XML data 511.

In accordance with the class type acquired by the process at Step S63, the conversion software loads (acquires) the class file 514 of components corresponding to each class at Step S64.

At Step S65 the conversion software 502 generates a Java (R) object corresponding to each component contained in the object scene.

At Step S66 the conversion software 502 sets the value of the attribute designated by the XML data 511 to the Java(R) object generated by the process at Step S65.

At Step S67 the conversion software 502 serializes each Java(R) object generated by the process at Step S65 and set with the value of each attribute by the process at Step S66, to the instance file (corresponding to the instance file 301 shown in FIG. 15 described above).

At Step S68 the conversion software 502 extracts source code 512 of the ECMA script of the object scene from the XML data 511, and outputs it as the script file (corresponding to the script file 303 shown in FIG. 15 described above).

At Step S69 the conversion software 502 archives the instance file serialized by the process at Step S67, the script file output by the process at Step S68, the class file group 514 of respective components contained in the object scene, and the file group 513 of text/still images and the like to be assembled with the object scene, as a scene file 292 corresponding to the object scene.

Namely, the conversion software 502 generates the scene file 292 corresponding to the object scene such as shown in FIG. 15.

At Step S70 the conversion software 502 judged whether all the scenes were selected as the object scene.

If it is judged at Step S70 that all the scenes were not selected as the object scene, the conversion software 502 returns its process to Step S62 whereat the next scene is selected from the scenes still not selected, to repeat the following processes.

Namely, the conversion software 502 executes the above-described processes from Step S63 to Step S69 for each of all the scenes, to generate the scene files 292 corresponding to all the scenes.

After the conversion software 502 generates the scene file 292 corresponding to the last scene, it judges at Step S70 that all the scenes were selected as the object file, and combines the multimedia content 516 constituted of the scene files 292 corresponding to all the files and the archive file 291 of the browser to generate the distribution software 515 and output it to the server 124.

When the server 124 distributes thereafter the distribution software 515 to the reception terminal 113 (FIG. 9) via the network 112 (FIG. 9), as described above the reception terminal 113 reproduces the distributed multimedia content 516 by using the browser corresponding to the archive file 291 of the distributed browser so that the image 521 such as shown in FIG. 29 is displayed on the display (output unit 187 shown in FIG. 12) of the reception terminal 113.

As above, in place of the above-described authoring system 441, the content producer 517 can acquire the above-described text editor 501 and conversion software 502 free of charge or at a reduced price, and can use the text editor 501 in a straightforward manner and conversion software 502 acquired in such a manner. It is therefore possible to produce the distribution software 515 containing the multimedia content 516 in the same format (format shown in FIG. 15) as that generated by the authoring system 441, without using the authoring system 441.

However, the conversion software 502 has a lower productivity of a multimedia content than that of the authoring system 441. In other words, although the authoring system 441 has specific functions of the following first to fourth functions as described above, the conversion software 502 does not have these functions.

Namely, the first function is a function of providing a WYSIWYG (What You See Is What You Get) environment.

A user interface environment capable of producing a content by visually confirming and editing final presentation, is herein called the WYSIWYG environment. If any change is made in a content, the WYSIWYG environment allows its effect to be immediately confirmed so that the effect of considerably improving the content production can be obtained.

The second function is a function of providing a display of an intelligible form such as a list and a tree of various information necessary for content production such as the configuration of a content and customizing information of an editing object component.

The third function is a function of supporting customization of components. Namely, the third function is a function of supporting an input of the attribute value of a component by using GUI components such as a text field, a check box and a slider, and checking whether a user input value is in a correct range.

The fourth function is a function of providing processes such as copy, paste, operation cancel and retry.

It is necessary that a user writes a content correctly in conformity with the predetermined text format by using the text editor 501. The text editor has the characteristics that if there is a statement miss, an error occurs during conversion. It is therefore hard to say that the text editor is software having a high productivity of a multimedia content.

It is therefore considered that the production environment using the text editor 501 and conversion software 502 is complementary with the content production environment using the authoring system 441.

The text format using XML or the like may be adopted as the format of the distribution software itself (e.g., the distribution software 242 shown in FIG. 13 and the distribution software 515 shown in FIG. 27) to be distributed by the above-described server 124. In this case, there occurs the new issues that the data size becomes large and it takes time to load data. Therefore, as described above, the distribution software distributed by the server 124 is preferably distributed as a binary format file.

As described above, in the preferred embodiment of the present invention, since the component-based architecture is adopted, a content-specific function can be built in a multimedia content more easily than a conventional method (it can be said that an extension performance is high).

Also in the preferred embodiment of the present invention, since 3D-based presentation is realized, it is possible to realize an intelligible and attractive multimedia viewing environment.

Also in the preferred embodiment of the present invention, an arbitrary component is assembled with a content on the authoring tool, each component is customized in a graphical environment, and an environment is provided which can easily control a component by the script language. It is therefore possible for designers and content creators to produce highly functional content easier than a conventional method (it can be said that productivity is high).

Further in the preferred embodiment of the present invention, the conversion software is provided which converts the format of a content written as text data into the same format as that produced by the above-described authoring system. The content producer can therefore produce and edit a content by using a general text editor. The text editor of this kind is often bundled with an OS or is often freeware or shareware, and can be acquired free of charge or at a reduced price.

Further, since this conversion software can be developed much more inexpensively than the above-described authoring system, a load of cost upon a content producer (user) can be lessened. Still further, although a specific grammar may be used for writing a content by text, if a system in conformity with open standards such as XML is adopted, the development cost of the conversion software can be further reduced and the tool easier to be used by a content producer (user) can be realized.

Furthermore, in the preferred embodiment of the present invention, since the user interface ensuring presentation consistency and using an arrow key or decision key is adopted, operations easier and more common than a conventional operation can be provided for various digital electronic home appliances including personal computers, and the same content can be distributed to various digital electronic home appliances including personal computers.

As above, the preferred embodiment of the present invention permits solving the above-described first to sixth issues.

Programs constituting various software of the preferred embodiment of the present invention are installed from a network or a recording medium.

As shown in FIG. 10, 11 or 12, the recording medium is constituted of a removable recording medium (including a magnetic disk (including a floppy disk), an optical disk (including a CD-ROM (Compact Disk-Read Only Memory), and a DVD (Digital Versatile Disk)), package media such as a semiconductor memories 151, 171 or 191, respectively storing the programs and distributed to users separately from the apparatus main body, or ROM 142, 162 or 182 or a hard disk in the storage unit 148, 168 or 188, respectively storing the programs and supplied to users in the state that ROM or hard disk is loaded in advance in the apparatus main body.

In this specification, Steps writing programs to be stored in a recording medium include obviously the processes to be executed time sequentially in the order of written Steps, or the processes to be executed in parallel or separately which are not necessarily required to be executed time sequentially.

Further, in this specification, system (excepting the authoring system 441) means a whole apparatus constituted by a plurality of apparatuses and processing units.

IDUSTRIAL APPLICABILITY

As described above, according to the present invention, it is possible to handle multimedia content. Further, according to the present invention, highly functional multimedia content can be handled in a straightforward manner.

The invention claimed is:

1. A content providing method, comprising:
forming multimedia content by collecting scenes, each scene containing a component group formed by customizing and arbitrarily combining a plurality of components operating on a browser, the scene also containing a script for operating each component; and providing, upon satisfaction of specifications, each of the components with a service via a browser;
wherein the service comprises:
reading the multimedia content and loading the component group and script contained in the scene;
managing a life cycle of each component, wherein the life cycle comprises a plurality of states for each component;
displaying one of the components in a predetermined 3-D virtual space and deleting another of the components previously displayed in the 3-D virtual space;
providing a communication service between an interpreter of the script and each component;
managing focus transition between the one of the components and another of the components; and
distributing a corresponding input from a predetermined external key to the one of the components.

2. The content providing method according to claim 1, wherein the service further comprises:
synchronously reproducing media; and
transitioning between a first scene and a second scene.

3. The content providing method according to claim 1, further comprising:
maintaining presentation consistency when the multimedia content is reproduced on the browser.

4. A computer-readable recording medium having a content providing program, the content providing program causing a computer to execute a content providing method, the method comprising:
forming multimedia content by collecting scenes, each scene containing a component group formed by customizing and arbitrarily combining a plurality of components operating on a browser, the scene also containing a script for operating each component; and
providing, upon satisfaction of specifications, each of the components with a service via a browser;
wherein the service comprises:
reading the multimedia content and loading the component group and script contained in the scene;
managing a life cycle of each component, wherein the life cycle comprises a plurality of states for each component;
displaying one of the components in a predetermined 3-D virtual space and deleting another of the components previously displayed in the 3-D virtual space;
providing a communication service between an interpreter of the script and each component;
managing focus transition between the one of the components and another of the components; and
distributing a corresponding input from a predetermined external key to the one of the components.

5. A computer-readable recording medium according to claim 4, wherein the service further comprises:
synchronously reproducing media; and
transitioning between a first scene and a second scene.

6. A computer-readable recording medium according to claim 4, the method further comprising:
maintaining presentation consistency when the multimedia content is reproduced on the browser.

7. A method for providing a browser, comprising the steps of:
reading multimedia content and loading a component group, containing a plurality of components, and a script contained in a scene;
providing, upon satisfaction of specifications, each of the components with a service wherein the service further performs the steps of:
managing a life cycle of each component in the component group, wherein the life cycle comprises a plurality of states for each component;
displaying one of the components in a predetermined 3-D virtual space and deleting another of the components previously displayed in the 3-D virtual space;
providing a communication service between an interpreter of the script and each component;
managing focus transition between the one of the components and another of the components; and
distributing a corresponding input from a predetermined external key to the one of the components.

8. A method for producing multimedia content having a collection of scenes, comprising the steps of:
forming a component group by customizing and arbitrarily combining a plurality of components operating on a browser and upon satisfaction of specifications, providing each component with a service; and
operating each component by using a script; wherein the service comprises:
reading multimedia content and loading the component group and the script contained in the scene;
managing a life cycle of each component, wherein the life cycle comprises a plurality of states for each component;
displaying one of the components in a predetermined 3-D virtual space and deleting another of the components previously displayed in the 3-D virtual space;
providing a communication service between an interpreter of the script and each component;
managing focus transition between the one of the components and another of the components; and
distributing a corresponding input from a predetermined external key to the one of the components.

9. The method for producing multimedia content according to claim 8, further comprising:
combining the multimedia content and the browser to create one application.

10. The method for producing multimedia content according to claim 8, further comprising:
controlling reading the one of the components in a distribution format and displaying the one of the components on a graphic user interface (GUI);
adding another component selected from the plurality of components, on the graphic user interface to the multimedia content;
providing the graphic user interface for customizing the added component; and
converting the multimedia content edited in the displaying, adding, and providing steps into a distributable format.

11. A computer-readable recording medium having a multimedia content producing program, the multimedia content producing program causing a computer to execute a multimedia content producing method, the method comprising:
forming a component group by customizing and arbitrarily combining a plurality of components operating on a browser upon satisfaction of specifications, and providing each component with a service; and
operating each component by using a script; wherein the service comprises:
reading multimedia content and loading the component group and the script contained in the scene;
managing a life cycle of each component, wherein the life cycle comprises a plurality of states for each component;
displaying one of the components in a predetermined 3-D virtual space and deleting another of the components previously displayed in the 3-D virtual space;

providing a communication service between an interpreter of the script and each component;

managing focus transition between the one of the components and another of the components; and distributing a corresponding input from a predetermined external key to the one of the components.

12. A method for processing multimedia content, comprising the steps of:

converting a format of multimedia content from a first format, utilizing techniques of expressing a data structure by a text, into a second format, wherein:

the multimedia content in the second format comprises a collection of scenes, each scene containing:

a component group formed by customizing and arbitrarily combining a plurality of components operating on a browser and, upon satisfaction of specifications, providing each component with a service; and a script for operating each component; and wherein the service performs the steps of:

reading multimedia content and loading the component group and the script contained in the scene;

managing a life cycle of each component, wherein the life cycle comprises a plurality of states for each component;

displaying one of the components in a predetermined 3-D virtual space and deleting another of the components previously displayed in the 3-D virtual space;

providing a communication service between an interpreter of the script and each component;

managing focus transition between the one of the components and another of the components; and distributing a corresponding input from a predetermined external key to the one of the components.

13. The method for processing multimedia content according to claim 12, further comprising:

combining the multimedia content in the second format and the browser to create an application.

14. The method for processing multimedia content according to claim 12, wherein the techniques utilized in the first format include XML.

15. A computer-readable recording medium having a multimedia content processing program, the multimedia content processing program causing a computer to execute a multimedia content processing method, the method comprising:

converting a format of multimedia content from a first format, utilizing techniques of expressing a data structure by a text, into a second format; wherein:

the multimedia content in the second format comprises a collection of scenes, each scene containing:

a component group formed by customizing and arbitrarily combining a plurality of components operating on a browser and, upon satisfaction of specifications, providing each component with a service; and a script for operating each component; wherein the service performs the steps of:

reading multimedia content and loading the component group and the script contained in the scene;

managing a life cycle of each component, wherein the life cycle comprises a plurality of states for each component;

displaying one of the components in a predetermined 3-D virtual space and deleting another of the components previously displayed in the 3-D virtual space;

providing a communication service between an interpreter of the script and each component;

managing focus transition between the one of the components and another of the components; and distributing a corresponding input from a predetermined external key to the one of the components.

16. An information processing system comprising a first information processing apparatus for producing and distributing multimedia content and a second information processing apparatus for reproducing multimedia content distributed by the first apparatus, the first and second information processing apparatuses being interconnected by a network; wherein:

the first information processing apparatus produces multimedia content containing a collection of scenes and distributes, via the network, the produced multimedia content and a browser to the second information processing apparatus as one application; and the second information processing apparatus reproduces the distributed application on the browser; wherein each of the scenes contains:

a component group formed by customizing and arbitrarily combining a plurality of components operating on a browser upon satisfaction of specifications, and providing each component with a service; and a script for operating each component; wherein the service performs the steps of:

reading multimedia content and loading the component group and the script contained in the scene;

managing the life cycle of each component constituting the component group, wherein the life cycle comprises a plurality of states for each component;

displaying one of the components in a predetermined 3-D virtual space and deleting another of the components previously displayed in the 3-D virtual space;

providing a communication service between an interpreter of the script and each component;

managing focus transition between the one of the components and another of the components; and distributing a corresponding input from a predetermined external key to the one of the components.

* * * * *